US012216922B2

(12) United States Patent
Liljestrand et al.

(10) Patent No.: US 12,216,922 B2
(45) Date of Patent: Feb. 4, 2025

(54) UPDATING ENCRYPTED SECURITY CONTEXT IN STACK POINTERS FOR EXCEPTION HANDLING AND TIGHT BOUNDING OF ON-STACK ARGUMENTS

(71) Applicant: Intel Corporation, Santa Clara, CA (US)

(72) Inventors: Hans G. Liljestrand, Raasepori (FI); Sergej Deutsch, Hillsboro, OR (US); David M. Durham, Beaverton, OR (US); Michael LeMay, Hillsboro, OR (US); Karanvir S. Grewal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 102 days.

(21) Appl. No.: 17/947,072

(22) Filed: Sep. 16, 2022

(65) Prior Publication Data
US 2023/0018585 A1  Jan. 19, 2023

(51) Int. Cl.
*G06F 3/06* (2006.01)
*H04L 9/32* (2006.01)
(52) U.S. Cl.
CPC .......... *G06F 3/0622* (2013.01); *G06F 3/0638* (2013.01); *G06F 3/0655* (2013.01); *H04L 9/32* (2013.01)
(58) Field of Classification Search
CPC .... G06F 3/0622; G06F 3/0638; G06F 3/0655; H04L 9/32
USPC ........................................................ 711/163
See application file for complete search history.

(56) References Cited

U.S. PATENT DOCUMENTS

| 9,436,847 | B2 | 9/2016 | Durham et al. |
| 10,838,878 | B2 | 11/2020 | Barnes |
| 2002/0194184 | A1 | 12/2002 | Baskins et al. |
| 2003/0023905 | A1* | 1/2003 | Boling .................. G06F 9/4812 714/34 |
| 2003/0037248 | A1 | 2/2003 | Launchbury et al. |
| 2011/0109431 | A1 | 5/2011 | Bragagnini et al. |

(Continued)

OTHER PUBLICATIONS

"Armv8.5-A Memory Tagging Extension," Arm, White Paper, Aug. 2, 2019, 9 pages, retrieved from https://developer.arm.com/documentation/102925/0100.

(Continued)

*Primary Examiner* — Christopher B Shin
(74) *Attorney, Agent, or Firm* — Alliance IP, LLC

(57) ABSTRACT

A processor is to execute a first instruction to perform a simulated return in a program from a callee function to a caller function based on a first input stack pointer encoded with a first security context of a first callee stack frame. To perform the simulated return is to include generating a first simulated stack pointer to the caller stack frame. The processor is further to, in response to identifying an exception handler in the first caller function, execute a second instruction to perform a simulated call based on a second input stack pointer encoded with a second security context of the caller stack frame. To perform the simulated call is to include generating a second simulated stack pointer to a new stack frame containing an encrypted instruction pointer associated with the exception handler. The second simulated stack pointer is to be encoded with a new security context.

25 Claims, 38 Drawing Sheets

(56) References Cited

U.S. PATENT DOCUMENTS

| | | | |
|---|---|---|---|
| 2013/0080790 A1 | 3/2013 | Pean et al. | |
| 2013/0232507 A1* | 9/2013 | Farrugia | G06F 21/52 719/313 |
| 2016/0092702 A1* | 3/2016 | Durham | G06F 9/35 713/190 |
| 2019/0004980 A1* | 1/2019 | Maor | G06F 16/10 |
| 2019/0227951 A1 | 7/2019 | Durham et al. | |
| 2019/0272159 A1 | 9/2019 | Pizlo et al. | |
| 2020/0125742 A1* | 4/2020 | Kounavis | G06F 12/1458 |
| 2020/0159676 A1* | 5/2020 | Durham | G06F 21/12 |
| 2020/0201789 A1* | 6/2020 | Durham | G06F 21/602 |
| 2021/0117341 A1* | 4/2021 | Durham | G06F 12/0895 |
| 2021/0149825 A1* | 5/2021 | Durham | G06F 9/5016 |
| 2021/0150040 A1* | 5/2021 | Durham | G06F 9/30145 |
| 2021/0218547 A1* | 7/2021 | Weiler | H04L 9/0618 |
| 2021/0224380 A1 | 7/2021 | Grocutt | |
| 2021/0240638 A1 | 8/2021 | Deutsch et al. | |
| 2021/0374047 A1 | 12/2021 | Lie et al. | |
| 2021/0389946 A1* | 12/2021 | Wilkerson | G06F 12/1009 |

OTHER PUBLICATIONS

"Pointer Authentication on ARMv8.3, Design and Analysis of the New Software Security Instructions," Qualcomm Technologies, Inc., Jan. 2017, 12 pages, retrieved from https://www.qualcomm.com/content/dam/qcomm-martech/dm-assets/documents/pointer-auth-v7.pdf.

Aman Singla, "ES6 Trampoline Function," GeeksforGeeks, Mar. 16, 2022, 8 pages, retrieved from https://www.geeksforgeeks.org/es6-trampoline-function/.

Chefmax, "AddressSanitizer," May 15, 2019, retrieved on Jan. 23, 2022 from https://github.com/google/sanitizers/wiki/Address-Sanitizer, 9 pages.

Jan Hubicka, "Unwind Library Interface," May 4, 2003, 11 pages, retrieved from https://www.ucw.cz/~hubicka/papers/abi/node25.html.

Liljestrand, Hans; "Protecting the stack with PACed canaries," article retrieved from the Internet at https://arxiv.org/pdf/1909.05747.pdf#:~:text=A%20stack%20canary%20is%20a,the%20canary%20before%20function%20return; Sep. 2019; 6 pages.

Phillips, Mitch, "AddressSanitizerAlgorithm," Oct. 3, 2017, retrieved on Jan. 23, 2022 from https://github.com/google/sanitizers/wiki/AddressSanitizerAlgorithm, 7 pages.

Serebryany, Konstantin et al, "AddressSanitizer: A Fast Address Sanity Checker," USENIX ATC 2012, retrieved on Jan. 23, 2022 from https://www.usenix.org/conference/usenixfederatedconferencesweek/addresssanitizer-fast-address-sanity-checker, 10 pages.

Sireesha Cheemakurthy, "Stack unwinding during exception handling in C++," medium.com, Mar. 21, 2020, 8 pages.

USPTO Final OA for U.S. Appl. No. 17/214,222 (11 pages) received on Feb. 14, 2023.

USPTO Non-Final OA for U.S. Appl. No. 17/213,568 (11 pages) received on Oct. 19, 2022.

USPTO Non-Final OA for U.S. Appl. No. 17/214,222 (10 pages) received on Aug. 31, 2022.

Wikipedia; "Shadow Stack" article retrieved from the Internet at https://en.wikipedia.org/w/index.php?title=Shadow_stack&oldid=997384056, page version as of Dec. 31, 2020, 2 pages.

Wikipedia; "Stack buffer overflow" article retrieved from the Internet at https://en.wikipedia.org/wiki/Stack_buffer_overflow#Stack_canaries, page version as of Jan. 13, 2021, 7 pages.

* cited by examiner

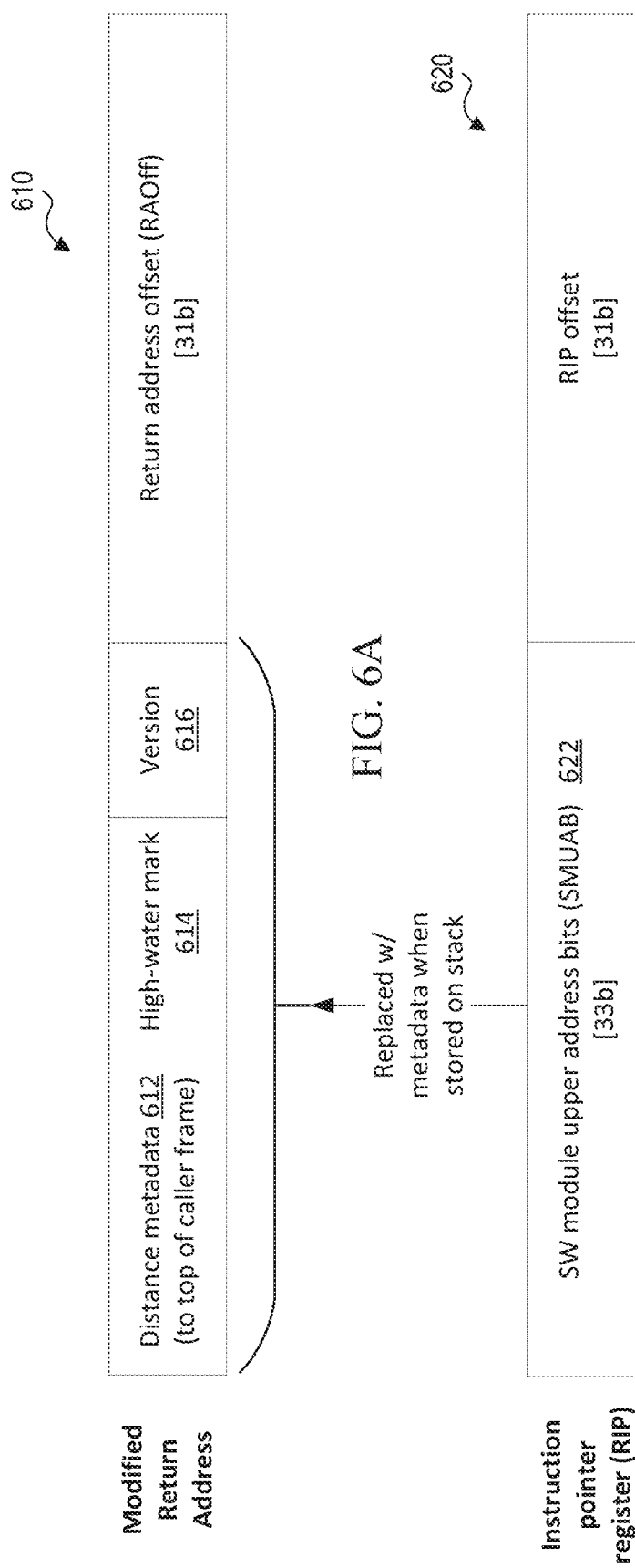

```
┌─────────────────────────────────────────────────────────────────┐
│ FETCH A SINGLE SIMULATE RETURN INSTRUCTION OF A FIRST INSTRUCTION SET │
│ ARCHITECTURE HAVING FIELDS FOR AN OPCODE INCLUDING AN OPERAND, SUCH AS A │
│         REGISTER OPERAND (REG)  1901                            │
└─────────────────────────────────────────────────────────────────┘
                              │
                              ▼
┌─────────────────────────────────────────────────────────────────┐
│ TRANSLATE THE FETCHED SINGLE SIMULATE RETURN INSTRUCTION OF THE FIRST │
│ INSTRUCTION SET ARCHITECTURE INTO ONE OR MORE INSTRUCTIONS OF A SECOND │
│          INSTRUCTION SET ARCHITECTURE  1902                     │
└─────────────────────────────────────────────────────────────────┘
                              │
                              ▼
┌─────────────────────────────────────────────────────────────────┐
│ DECODE THE ONE OR MORE INSTRUCTIONS OF THE SECOND INSTRUCTION SET │
│                   ARCHITECTURE  1903                            │
└─────────────────────────────────────────────────────────────────┘
                              │
                              ▼
┌─────────────────────────────────────────────────────────────────┐
│ RETRIEVE DATA ASSOCIATED WITH THE OPERAND (REG) AND SCHEDULE 1905 │
└─────────────────────────────────────────────────────────────────┘
                              │
                              ▼
┌─────────────────────────────────────────────────────────────────┐
│ EXECUTE THE DECODED ONE OR MORE INSTRUCTIONS OF THE SECOND      │
│ INSTRUCTION SET ARCHITECTURE TO:                                │
│ perform a simulated return from a callee function to a caller function using an input stack pointer │
│ encoded with a callee security context of a callee stack frame to generate an output (simulated) │
│ stack pointer encoded with caller security context of a caller stack frame │
│                                                                 │
│ 1907                                                            │
└─────────────────────────────────────────────────────────────────┘
                              │
                              ▼
┌─────────────────────────────────────────────────────────────────┐
│       COMMIT A RESULT OF THE EXECUTED INSTRUCTION(S)            │
│                         1909                                    │
└─────────────────────────────────────────────────────────────────┘
```

FIG. 19

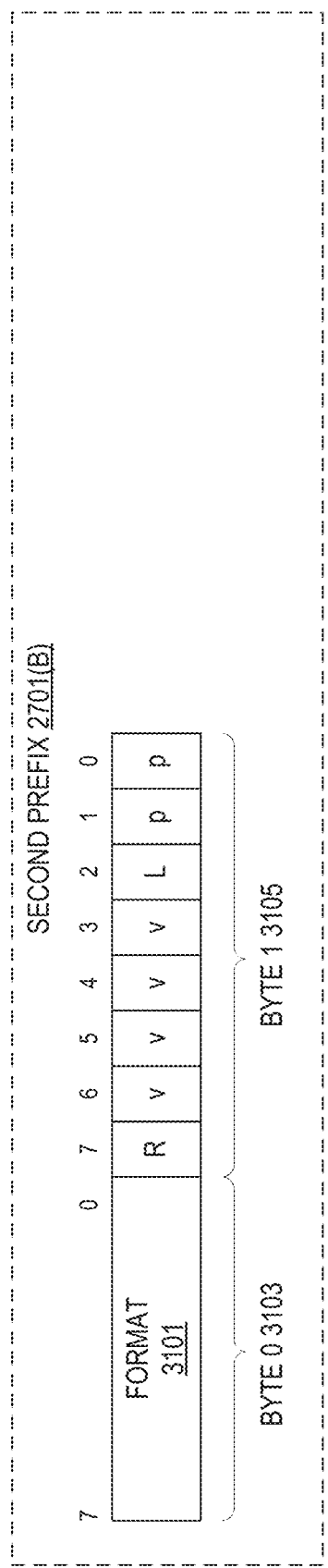
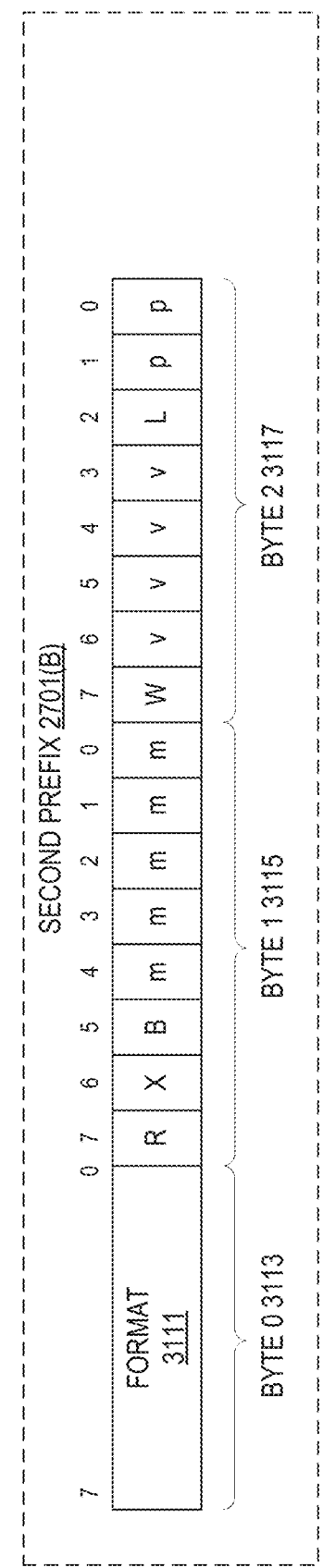
FIG. 31A
FIG. 31B

UPDATING ENCRYPTED SECURITY CONTEXT IN STACK POINTERS FOR EXCEPTION HANDLING AND TIGHT BOUNDING OF ON-STACK ARGUMENTS

TECHNICAL FIELD

This disclosure relates in general to the field of computer systems, more particularly, to updating encrypted security context in stack pointers for exception handling and tight bounding of on-stack arguments.

BACKGROUND

Memory safety issues on the stack have been a persistent cause of security vulnerabilities, both targeting adjacent data on the stack as well as control flow parameters such as the return address. Safety issues that permit a stack buffer overrun can provide read or write access to data on a caller's stack frame and the return pointer, allowing a compromised callee to subvert control of the execution environment. Even if stack pointers are isolated to access only one stack frame, some programming patterns may permit access to stacks.

BRIEF DESCRIPTION OF THE DRAWINGS

FIGS. 6A-6C illustrate an example of pointer-encoded metadata in accordance with embodiments of the present disclosure.

FIG. 19 illustrates an example method to process a simulate return (SIMRET) instruction using emulation or binary translation according to at least one embodiment.

FIGS. 31A-B illustrate examples of a second prefix.

DETAILED DESCRIPTION

Figure 1:
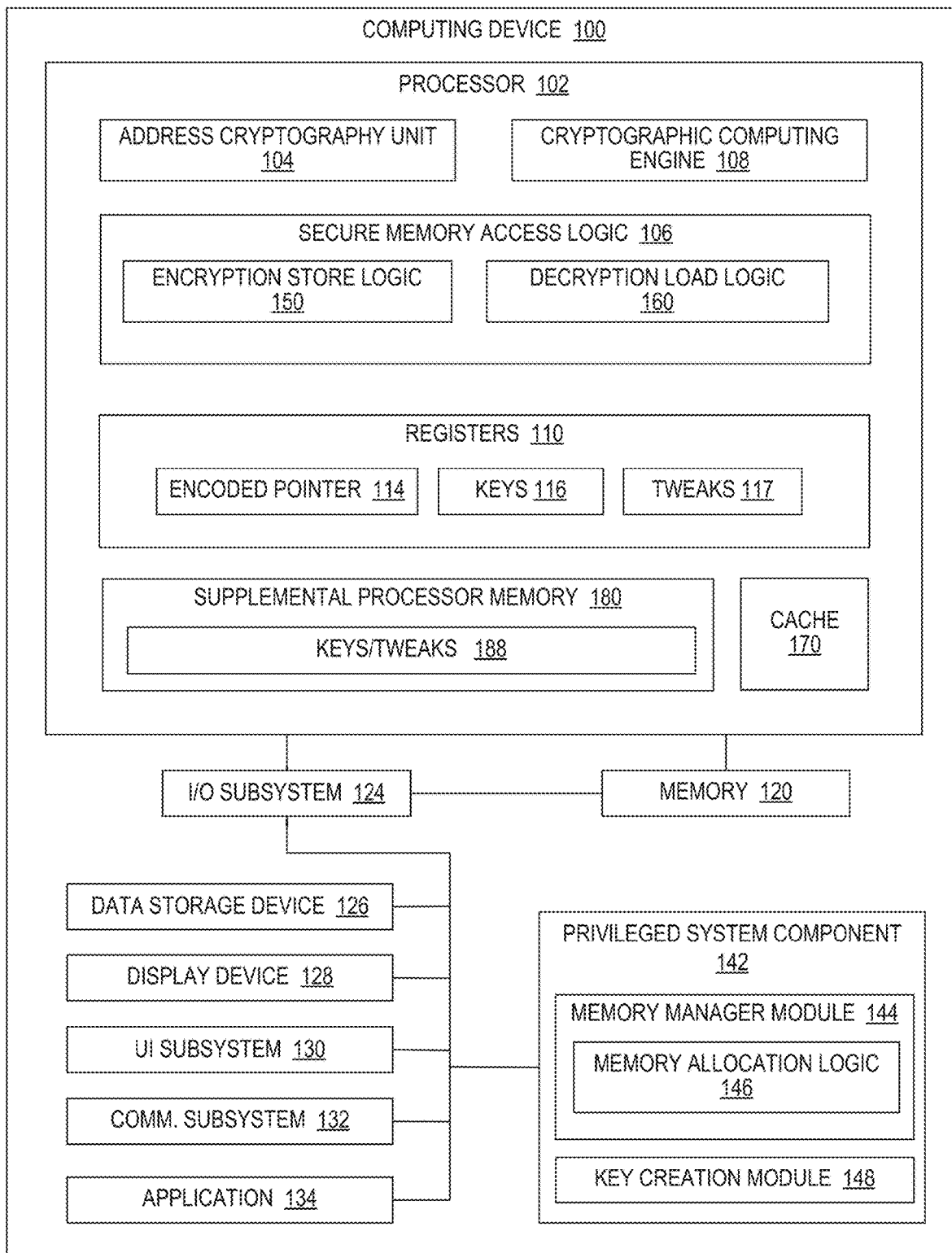
FIG. 1 is a simplified block diagram of an example computing device configured with secure memory access logic according to at least one embodiment of the present disclosure.

This disclosure provides various possible embodiments, or examples, for implementations, methods, apparatuses, architectures, and machine-readable media for updating encrypted security context in stack pointers for exception handling and tight bounding of on-stack arguments in cryptographic computing. In particular, embodiments disclosed in this application are related to allowing verified unwinding of encrypted pointers without requiring access to prior stack pointers (e.g., use of frame pointers) or generation of arbitrary encrypted stack pointers. New call and return instructions may be used to achieve the verified unwinding and pointer generation. The call and return instructions may also be used to realize stack-based function argument passing without allowing full access to the caller stack.

For purposes of illustrating embodiments that provide for updating encrypted security context in stack pointers for exception handling and tight bounding of on-stack arguments, it is important to understand the activities that may be occurring in a cryptographic computing system using cryptographically encoded stack pointers for granular stack data. The following introductory information provides context for understanding embodiments disclosed herein.

Generally, cryptographic computing may refer to computer system security solutions that employ cryptographic mechanisms for data and code protection and memory safety. Some cryptographic mechanisms may be implemented by computer system security solutions inside processor components as part of its computation. Some cryptographic computing systems may implement the encryption and decryption of pointer addresses (or portions thereof), keys, data, and code in a processor, or in a processor core, using encrypted memory access instructions. Thus, the microarchitecture pipeline of the processor core may be configured in such a way to support such encryption and decryption operations. In other cryptographic computing systems, the encryption of pointer addresses, data, and/or code may be performed via software and/or firmware of a privileged system components, such an operating system or virtual machine manager, for example.

At least some embodiments disclosed in this specification are related to pointer based data encryption and decryption in which a pointer to a memory location for data or code is encoded with a tag and/or other metadata (e.g., security context information) and may be used to derive at least a portion of tweak input to data or code cryptographic (e.g., encryption and decryption) algorithms. Thus, a cryptographic binding can be created between the cryptographic addressing layer and data/code encryption and decryption. This implicitly enforces bounds since a pointer that strays beyond the end of an object (e.g., data) is likely to use an incorrect tag value for that adjacent object. In one or more embodiments, a pointer is encoded with a linear address (also referred to herein as "memory address") to a memory location and metadata. In some pointer encodings, a slice or segment of the memory address in the pointer includes a plurality of bits and is encrypted (and decrypted) based on a secret address key and a tweak based on the metadata and/or a portion of the linear address bits that are not being encrypted. Other pointers can be encoded with a plaintext memory address (e.g., linear address) and metadata.

Known computing techniques (e.g., page tables for process/kernel separation, virtual machine managers, managed runtimes, etc.) have used architecture and metadata to provide data protection and isolation. For example, in previous solutions, a processor would use lookup tables to encode policy or data about the data for ownership, memory size, location, type, version, etc. Dynamically storing and loading metadata requires additional storage (memory overhead) and impacts performance, particularly for fine grain metadata (such as for function as a service (FaaS) workloads or object bounds information).

Cryptographic computing may make redundant the legacy modes of process separation, user space, and kernel with a fundamentally new fine-grain protection model. With cryptographic computing, protections are cryptographic, with various types of processor units (e.g., processors and accelerators) utilizing secret keys (and optionally tweaks) and ciphers to provide access control and separation at increasingly finer granularities. Further, instead of virtual machine and process separation in current systems, with cryptographic computing, individual functions may become the boundary, allowing address spaces to be shared via pointers that are encrypted, with the encrypted pointers and keys providing controlled access down to individual data objects.

In some cryptographic computing systems, encryption and decryption happens inside the processor core, within the core boundary. Because encryption happens before data is written to a memory unit outside the core, such as the L1 cache or main memory, it is not necessary to "steal" bits from the physical address to convey key or tweak information, and an arbitrarily large number of keys and/or tweaks can be supported. In other cryptographic computing systems, encryption and/or decryption of data may happen outside the core in a cryptographic engine placed, for example, in a memory controller or as a discrete hardware. In further systems, some or all of the encryption and/or decryption of addresses, data, and code may be performed in software and/or firmware, such as by a privileged software component (e.g., operating system, virtual machine manager, etc.). Generally, hardware, software, firmware or any suitable combination thereof may be used to perform the encryption and decryption of addresses, data, and code in a cryptographic computing system.

Cryptographic computing leverages the concept of a cryptographic addressing layer where the processor encrypts at least a portion of software allocated memory addresses (addresses within the linear/virtual address space, also referred to as "pointers") based on implicit and/or explicit metadata (e.g., context information) and/or a slice of the memory address itself (e.g., as a tweak to a tweakable block cipher (e.g., XOR-encrypt-XOR-based tweaked-codebook mode with ciphertext stealing (XTS)). As used herein, a "tweak" may refer to, among other things, an extra input to a block cipher, in addition to the usual plaintext or ciphertext input and the key. A tweak comprises one or more bits that represent a value. In one or more embodiments, a tweak may compose all or part of an initialization vector (IV) for a block cipher. A resulting cryptographically encoded pointer can comprise an encrypted portion (or slice) of the memory address, some bits of encoded metadata (e.g., context information), and a plaintext portion of the memory address. In some implementations, the encrypted portion may include at least some of the metadata encoded in the pointer. When decryption of an address is performed, if the information used to create the tweak (e.g., implicit and/or explicit metadata, plaintext address slice of the memory address, etc.) corresponds to the original allocation of the memory address by a memory allocator (e.g., software allocation method), then the processor can correctly decrypt the address. Otherwise, a random address result will cause a fault and get caught by the processor.

These cryptographically encoded pointers (or portions thereof) may be further used by the processor as a tweak to the data encryption cipher used to encrypt/decrypt data they refer to (data referenced by the cryptographically encoded pointer), creating a cryptographic binding between the cryptographic addressing layer and data/code encryption. In some embodiments, the cryptographically encoded pointer may be decrypted and decoded to obtain the linear address. The linear address (or a portion thereof) may be used by the processor as a tweak to the data encryption cipher. Alternatively, in some embodiments, the memory address may not be encrypted but the pointer may still be encoded with some metadata representing a unique value among pointers. In this embodiment, the encoded pointer (or a portion thereof) may be used by the processor as a tweak to the data encryption cipher. It should be noted that a tweak that is used as input to a block cipher to encrypt/decrypt a memory address is also referred to herein as an "address tweak". Similarly, a tweak that is used as input to a block cipher to encrypt/decrypt data is also referred to herein as a "data tweak".

Turning to FIG. 1, FIG. 1 is a simplified block diagram of an example computing device 100 for updating encrypted security context in stack pointers for exception handling and tight bounding of on-stack arguments according to at least one embodiment of the present disclosure. In the example shown, the computing device 100 includes a processor 102 with an address cryptography unit 104, a cryptographic computing engine 108, secure memory access logic 106, and memory components, such as a cache 170 (e.g., L1 cache, L2 cache) and optionally, supplemental processor memory 180. Secure memory access logic 106 includes encryption store logic 150 to encrypt data based on various keys and/or tweaks and then store the encrypted data and decryption load logic 160 to read and then decrypt data based on the keys and/or tweaks. Cryptographic computing engine 108 may be configured to decrypt data or code for load operations based on various keys and/or tweaks and to encrypt data or code for store operations based on various keys and/or tweaks. Address cryptography unit 104 may be configured to decrypt and encrypt a linear address (or a portion of the linear address) encoded in a pointer to the data or code referenced by the linear address. Optionally, some or all metadata encoded in the pointer may be encrypted along with the portion of the linear address that is encrypted.

Processor 102 also includes registers 110, which may include e.g., general purpose registers and special purpose registers (e.g., control registers, model-specific registers (MSRs), instruction pointer register (RSP), stack pointer register (RSP), etc.). Registers 110 may contain various data that may be used in one or more embodiments, such as an encoded pointer 114 to a memory address. The encoded pointer may be cryptographically encoded or non-cryptographically encoded. An encoded pointer is encoded with some metadata. If the encoded pointer is cryptographically encoded, at least a portion (or slice) of the address bits is encrypted. In some embodiments, keys 116 used for encryption and decryption of addresses, code, and/or data may be stored in registers 110. In some systems, tweaks 117 used for encryption and decryption of addresses, code, and/or data may be stored in registers 110.

The secure memory access logic 106 utilizes metadata about encoded pointer 114, which is encoded into unused bits of the encoded pointer 114 (e.g., non-canonical bits of a 64-bit address, or a range of addresses set aside, e.g., by the operating system, such that the corresponding high order bits of the address range may be used to store the metadata), in order to secure and/or provide access control to memory locations pointed to by the encoded pointer 114. For example, the metadata encoding and decoding provided by the secure memory access logic 106 can prevent the encoded pointer 114 from being manipulated to cause a buffer overflow, and/or can prevent program code from accessing memory that it does not have permission to access. Pointers may be encoded when memory is allocated (e.g., by an operating system, in the heap) and provided to executing programs in any of a number of different ways, including by using a function such as malloc, alloc, or new; or implicitly via the loader, or statically allocating memory by the compiler, etc. As a result, the encoded pointer 114, which points to the allocated memory, is encoded with the address metadata.

The address metadata can include valid range metadata. The valid range metadata allows executing programs to manipulate the value of the encoded pointer 114 within a valid range, but will corrupt the encoded pointer 114 if the memory is accessed using the encoded pointer 114 beyond the valid range. Alternatively or in addition, the valid range metadata can be used to identify a valid code range, e.g., a range of memory that program code is permitted to access (e.g. the encoded range information can be used to set explicit ranges on registers). Other information that can be encoded in the address metadata includes access (or permission) restrictions on the encoded pointer 114 (e.g., whether the encoded pointer 114 can be used to write, execute, or read the referenced memory).

In at least some other embodiments, other metadata (or context information) can be encoded in the unused bits of encoded pointer 114 such as a size of plaintext address slices (e.g., number of bits in a plaintext slice of a memory address embedded in the encoded pointer), a memory allocation size (e.g., bytes of allocated memory referenced by the encoded pointer), a type of the data or code (e.g., class of data or code defined by programming language), permissions (e.g., read, write, and execute permissions of the encoded pointer), a location of the data or code (e.g., where the data or code is stored), the memory location where the pointer itself is to be stored, an ownership of the data or code, a version of the encoded pointer (e.g., a sequential number that is incremented each time an encoded pointer is created for newly allocated memory, determines current ownership of the referenced allocated memory in time), a tag of randomized bits (e.g., generated for association with the encoded pointer), a privilege level (e.g., user or supervisor), a cryptographic context identifier (or crypto context ID) (e.g., randomized or deterministically unique value for each encoded pointer), etc.

For example, in some cryptographic computing systems, the address metadata can include size metadata that encodes the size of a plaintext address slice in the encoded pointer. The size metadata may specify a number of lowest order bits in the encoded pointer that can be modified by the executing program. The size metadata is dependent on the amount of memory requested by a program represented by a power, such as power of two. Accordingly, if 16 bytes are requested, which is represented as $2^4$ power, then size metadata is encoded as 4 (or 00100 in five upper bits of the pointer) and the 4 lowest bits of the pointer are designated as modifiable bits to allow addressing to the requested 16 bytes of memory. In some embodiments, the address metadata may include a tag of randomized bits associated with the encoded pointer to make the tag unpredictable for an adversary. An adversary may try to guess the tag value so that the adversary is able to access the memory referenced by the pointer, and randomizing the tag value may make it less likely that the adversary will successfully guess the value compared to a deterministic approach for generating a version value. In some embodiments, the pointer may include a version number (or other deterministically different value) determining current ownership of the referenced allocated data in time instead of or in addition to a randomized tag value. Even if an adversary is able to guess the current tag value or version number for a region of memory, e.g., because the algorithm for generating the version numbers is predictable, the adversary may still be unable to correctly generate the corresponding encrypted portion of the pointer due to the adversary not having access to the key that will later be used to decrypt that portion of the pointer.

Address decoding logic 162 verifies the encoded metadata on memory read and write operations that utilize processor instructions such as MOV, where a general purpose register is used as a memory address to read a value from memory (e.g., load) or to write a value to memory (e.g., store), as well as on other operations that involve the "use" of memory (such as arithmetic instructions with memory operands, e.g. ADD, and control transfer instructions, e.g. CALL/JMP etc.). These are considered memory operands, which may specify a location in memory at which the destination address for the control transfer is stored. The example secure memory access logic 106 is embodied as part of processor instructions (e.g., as part of the processor instruction set architecture), or microcode (e.g., instructions that are stored in read-only memory and executed directly by the processor 102). In other embodiments, portions of the secure memory access logic 106 may be embodied as hardware, firmware, software, or a combination thereof (e.g., as programming code executed by a privileged system component 142 of the computing device 100). For example, the secure memory access logic 106 may be embodied in software as an instruction set emulator (e.g., a binary instrumentation tool such as a PIN Tool) that emulates the instruction logic utilizing the encoded addresses as disclosed herein.

The example secure memory access logic 106 is embodied as part of processor instructions (e.g., as part of the processor instruction set architecture), or microcode (e.g., instructions that are stored in read-only memory and executed directly by the processor 102). In other embodiments, portions of the secure memory access logic 106 may be embodied as hardware, firmware, software, or a combination thereof (e.g., as programming code executed by a privileged system component 142 of the computing device 100). In one example, decryption load logic 160 and encryption store logic 150 can be embodied as part of existing or new load (read) and store (write) processor instructions that perform respective decryption and encryption operations to decrypt and encrypt data and/or code. Decryption load logic 160 and encryption store logic 150 verify encoded metadata on memory read and write operations that utilize processor instructions such as MOV, or that utilize new processor instructions (e.g., which may be counterparts to existing processor instructions such as MOV), where a general purpose register is used as a memory address to read a value from memory (e.g., load) or to write a value to memory (e.g., store), as well as on other operations that involve the "use" of memory (such as arithmetic instructions with memory operands, e.g. ADD, and control transfer instructions, e.g. CALL/JMP etc.). These are considered memory operands, which may specify a location in memory at which the destination address for the control transfer is stored. The example secure memory access logic 106 is embodied as part of processor instructions (e.g., as part of the processor instruction set architecture), or microcode (e.g., instructions that are stored in read-only memory and executed directly by the processor 102). In other embodiments, portions of the secure memory access logic 106 may be embodied as hardware, firmware, software, or a combination thereof (e.g., as programming code executed by a privileged system component 142 of the computing device 100). For example, the secure memory access logic 106 may be embodied in software as an instruction set emulator (e.g., a binary instrumentation tool such as a PIN Tool) that emulates the instruction logic utilizing the encoded addresses as disclosed herein.

The secure memory access logic 106 is executable by the computing device 100 to provide security for encoded pointers "inline," e.g., during execution of a program (such as a user space application 134) by the computing device 100. As used herein, the terms "indirect address" and "pointer" may each refer to, among other things, an address (e.g. virtual address or linear address) of a memory location at which other data or instructions are stored. In an example, a register that stores an encoded memory address of a memory location where data or code is stored may act as a pointer. As such, the encoded pointer 114 may be embodied as, for example, a data pointer (which refers to a location of data), a code pointer (which refers to a location of executable code), an instruction pointer, or a stack pointer. As used herein, "context information" includes "metadata" and may refer to, among other things, information about or relating to an encoded pointer 114, such as a valid data range, a valid code range, pointer access permissions, a size of plaintext address slice (e.g., encoded as a power in bits), a memory allocation size, a type of the data or code, a location of the data or code, an ownership of the data or code, a version of the pointer, a tag of randomized bits, version, a privilege level of software, a cryptographic context identifier, etc.

As used herein, "memory access instruction" may refer to, among other things, a "MOV" or "LOAD" instruction or any other instruction that causes data to be read, copied, or otherwise accessed at one storage location, e.g., memory, and moved into another storage location, e.g., a register (where "memory" may refer to main memory or cache, e.g., a form of random access memory, and "register" may refer to a processor register, e.g., hardware), or any instruction that accesses or manipulates memory. Also as used herein, "memory access instruction" may refer to, among other things, a "MOV" or "STORE" instruction or any other instruction that causes data to be read, copied, or otherwise accessed at one storage location, e.g., a register, and moved into another storage location, e.g., memory, or any instruction that accesses or manipulates memory.

The address cryptography unit 104 can include logic (including circuitry) to perform address decoding of an encoded pointer to obtain a linear address of a memory location of data (or code). The address decoding can include decryption if needed (e.g., if the encoded pointer includes an encrypted portion of a linear address and possibly metadata) based at least in part on a key and/or on a tweak derived from the encoded pointer. The address cryptography unit 104 can also include logic (including circuitry) to perform address encoding of the encoded pointer, including encryption if needed (e.g., the encoded pointer includes an encrypted portion of a linear address and possibly metadata), based at least in part on the same key and/or on the same tweak used to decode the encoded pointer. Address encoding may also include storing metadata in the noncanonical bits of the pointer. Various operations such as address encoding and address decoding (including encryption and decryption of the address or portions thereof) may be performed by processor instructions associated with address cryptography unit 104, other processor instructions, or a separate instruction or series of instructions, or a higher-level code executed by a privileged system component such as an operating system kernel or virtual machine monitor, or as an instruction set emulator. As described in more detail below, address encoding logic and address decoding logic each operate on an encoded pointer 114 using metadata (e.g., one or more of valid range, permission metadata, size (power), memory allocation size, type, location, ownership, version, tag value, privilege level (e.g., user or supervisor), crypto context ID, etc.) and a secret key (e.g., keys 116), in order to secure the encoded pointer 114 at the memory allocation/access level.

The encryption store logic 150 and decryption load logic 160 can use cryptographic computing engine 108 to perform cryptographic operations on data to be stored at a memory location referenced by encoded pointer 114 or obtained from a memory location referenced by encoded pointer 114 such as a return address stored in a stack frame. The cryptographic computing engine 108 can include logic (including circuitry, software, and/or hardware) to perform data (or code) decryption based at least in part on a tweak derived from an encoded pointer to a memory location of the data (or code), and to perform data (or code) encryption based at least in part on a tweak derived from an encoded pointer to a memory location for the data (or code). The cryptographic operations of the engine 108 may use a tweak, which includes at least a portion of the encoded pointer 114 (or the linear address generated from the encoded pointer) and/or a secret key (e.g., keys 116) in order to secure the data or code at the memory location referenced by the encoded pointer 114 by binding the data/code encryption and decryption to the encoded pointer.

Various different cryptographic algorithms may be used to implement the address cryptography unit 104 and cryptographic computing engine 108. Generally, Advanced Encryption Standard (AES) has been the mainstay for data encryption for decades, using a 128 bit block cipher. Meanwhile, memory addressing is typically 64 bits today. Although embodiments herein may be illustrated and explained with reference to 64-bit memory addressing for 64 computers, the disclosed embodiments are not intended to be so limited and can easily be adapted to accommodate 32 bits, 128 bits, or any other available bit sizes for pointers. Likewise, embodiments herein may further be adapted to accommodate various sizes of a block cipher (e.g., 64 bit, 48 bit, 32 bit, 16 bit, etc. using Simon, Speck, tweakable K-cipher, PRINCE or any other block cipher).

Lightweight ciphers suitable for pointer-based encryption have also emerged recently. The PRINCE cipher, for example, can be implemented in 3 clocks requiring as little as 799 µm² of area in the 10 nm process, providing half the latency of AES in a tenth the Silicon area. Cryptographic isolation may utilize these new ciphers, as well as others, introducing novel computer architecture concepts including, but not limited to: (i) cryptographic addressing, i.e., the encryption of data pointers at the processor using, as tweaks, contextual information about the referenced data (e.g., metadata embedded in the pointer and/or external metadata), a slice of the address itself, or any suitable combination thereof; and (ii) encryption of the data itself at the core, using cryptographically encoded pointers or portions thereof, non-cryptographically encoded pointers or portion(s) thereof, contextual information about the referenced data, or any suitable combination thereof as tweaks for the data encryption. A variety of encryption modes that are tweakable can be used for this purpose of including metadata (e.g., counter mode (CTR) and XOR-encrypt-XOR (XEX)-based tweaked-codebook mode with ciphertext stealing (XTS)). In addition to encryption providing data confidentiality, its implicit integrity may allow the processor to determine if the data is being properly decrypted using the correct keystream and tweak. In some block cipher encryption modes, the block cipher creates a keystream, which is then combined (e.g., using XOR operation or other more complex logic) with an input block to produce the encrypted or decrypted block. In some block ciphers, the keystream is fed into the next block cipher to perform encryption or decryption.

The example encoded pointer 114 in FIG. 1 is embodied as a register 110 (e.g., a general purpose register of the processor 102). The example secret keys 116 may be generated by a key creation module 148 of a privileged system component 142, and stored in one of the registers 110 (e.g., a special purpose register or a control register such as a model specific register (MSR)), another memory location that is readable by the processor 102 (e.g., firmware, a secure portion of a data storage device 126, etc.), in external memory, or another form of memory suitable for performing the functions described herein. In some embodiments, tweaks for encrypting addresses, data, or code may be computed in real time for the encryption or decryption. Tweaks 117 may be stored in registers 110, another memory location that is readable by the processor 102 (e.g., firmware, a secure portion of a data storage device 126, etc.), in external memory, or another form of memory suitable for performing the functions described herein. In some embodiments, the secret keys 116 and/or tweaks 117 are stored in a location that is readable only by the processor, such as supplemental processor memory 180. In at least one embodiment, the supplemental processor memory 180 may be implemented as a new cache or content addressable memory (CAM). In one or more implementations, supplemental processor memory 180 may be used to store information related to cryptographic computing such as keys and potentially tweaks, credentials, and/or context IDs.

Secret keys may also be generated and associated with cryptographically encoded pointers for encrypting/decrypting the address portion (or slice) encoded in the pointer. These keys may be the same as or different than the keys associated with the pointer to perform data (or code) encryption/decryption operations on the data (or code) referenced by the cryptographically encoded pointer. For ease of explanation, the terms "secret address key" or "address key" may be used to refer to a secret key used in encryption and decryption operations of memory addresses and the terms "secret data key" or "data key" may be used to refer to a secret key used in operations to encrypt and decrypt data or code.

On (or during) a memory allocation operation (e.g., a "malloc"), memory allocation logic 146 allocates a range of memory for a buffer (e.g., for heap data), returns a pointer along with the metadata (e.g., one or more of range, permission metadata, size (power), memory allocation size, type, location, ownership, version, tag, privilege level, crypto context ID, etc.). In one example, the memory allocation logic 146 may encode plaintext range information in the encoded pointer 114 (e.g., in the unused/non-canonical bits, prior to encryption), or supply the metadata as one or more separate parameters to the instruction, where the parameter(s) specify the range, code permission information, size (power), memory allocation size, type, location, ownership, version, tag, privilege level (e.g., user or supervisor), crypto context ID, or some suitable combination thereof. Illustratively, the memory allocation logic 146 may be embodied in a memory manager module 144 of the privileged system component 142. The memory allocation logic 146 causes the encoded pointer 114 to be encoded with the metadata (e.g., range, permission metadata, size (power), memory allocation size, type, location, ownership, version, tag value, privilege level, crypto context ID, some suitable combination thereof, etc.). The metadata may be stored in an unused portion of the encoded pointer 114 (e.g., non-canonical bits of a 64-bit address). For some metadata or combinations of metadata, the encoded pointer 114 may be encoded in a larger address space (e.g., 128-bit address, 256-bit address) to accommodate the size of the metadata or combination of metadata.

To determine valid range metadata, example range rule logic selects the valid range metadata to indicate an upper limit for the size of the buffer referenced by the encoded pointer 114. Address adjustment logic adjusts the valid range metadata as needed so that the upper address bits (e.g., most significant bits) of the addresses in the address range do not change as long as the encoded pointer 114 refers to a memory location that is within the valid range indicated by the range metadata. This enables the encoded pointer 114 to be manipulated (e.g., by software performing arithmetic operations, etc.) but only so long as the manipulations do not cause the encoded pointer 114 to go outside the valid range (e.g., overflow the buffer).

In an embodiment, the valid range metadata is used to select a portion (or slice) of the encoded pointer 114 to be encrypted. In other embodiments, the slice of the encoded pointer 114 to be encrypted may be known a priori (e.g., upper 32 bits, lower 32 bits, etc.). The selected slice of the encoded pointer 114 (and the adjustment, in some embodiments) is encrypted using a secret address key (e.g., keys 116) and optionally, an address tweak, as described further below. On a memory access operation (e.g., a read, write, or execute operation), the previously-encoded pointer 114 is decoded. To do this, the encrypted slice of the encoded pointer 114 (and in some embodiments, the encrypted adjustment) is decrypted using a secret address key (e.g., keys 116) and an address tweak (if the address tweak was used in the encryption), as described further below.

Similarly, the memory manager module 144 can allocate the call stack and provide a range of memory for the call stack, returns a pointer (e.g., 114) along with metadata (e.g., for the stack pointer). Code segments that are authorized to act on the call stack may then use this processor instruction to encode sub range pointers to buffers implicitly created on the stack. Compilers can automatically augment code to do this as stack operations are performed (local variables created, etc.), thus, protecting even individual data structures or individual variables on the stack. That is, the disclosed techniques enable encoding buffer sizes down to individual variable sizes (e.g., a 32-bit integer can be encoded as a pointer to a buffer of 4 bytes). In addition to the above described metadata, other types of metadata may be encoded in stack pointers, as will be further described herein. Examples can include one or more of a magic value that indicates the pointer to be a stack pointer (versus a heap pointer), a Validation Code (VC) used to detect malicious corruption, and version information used to ensure that the reused stack is encrypted differently than the previous encryption scheme with an older version.

The encoded pointer 114 is returned to its original (e.g., canonical) form, based on appropriate operations in order to restore the original value of the encoded pointer 114 (e.g., the true, original linear memory address). To do this in at least one possible embodiment, if the encoded pointer 114 is encrypted, then the encrypted portion is first decrypted. The address metadata encoded in the unused bits of the encoded pointer 114 are removed (e.g., return the unused bits to their original form). If the encoded pointer 114 decodes successfully, the memory access operation completes successfully. However, if the encoded pointer 114 has been manipulated (e.g., by software, inadvertently or by an attacker) so that its value falls outside the valid range indicated by the range metadata (e.g., overflows the buffer), the encoded pointer 114 may be corrupted as a result of the decrypting process performed on the encrypted address bits in the pointer. A corrupted pointer will raise a fault (e.g., a general protection fault or a page fault if the address is not mapped as present from the paging structures/page tables). One condition that may lead to a fault being generated is a sparse address space. In this scenario, a corrupted address is likely to land on an unmapped page and generate a page fault. Even if the corrupted address lands on a mapped page, it is highly likely that the authorized tweak or initialization vector for that memory region is different from the corrupted address that may be supplied as a tweak or initialization vector in this case. In this way, the computing device 100 provides encoded pointer security against buffer overflow attacks and similar exploits.

Referring now in more detail to FIG. 1, the computing device 100 may be embodied as any type of electronic device for performing the functions described herein. For example, the computing device 100 may be embodied as, without limitation, a smart phone, a tablet computer, a wearable computing device, a laptop computer, a notebook computer, a mobile computing device, a cellular telephone, a handset, a messaging device, a vehicle telematics device, a server computer, a workstation, a distributed computing system, a multiprocessor system, a consumer electronic device, and/or any other computing device configured to perform the functions described herein. As shown in FIG. 1, the example computing device 100 includes at least one processor 102 embodied with the secure memory access logic 106, the address cryptography unit 104, and the cryptographic computing engine 108.

The computing device 100 also includes memory 120, an input/output subsystem 124, a data storage device 126, a display device 128, a user interface (UI) subsystem 130, a communication subsystem 132, application 134, and the privileged system component 142 (which, illustratively, includes memory manager module 144 and key creation module 148). The computing device 100 may include other or additional components, such as those commonly found in a mobile and/or stationary computers (e.g., various sensors and input/output devices), in other embodiments. Additionally, in some embodiments, one or more of the example components may be incorporated in, or otherwise form a portion of, another component. Each of the components of the computing device 100 may be embodied as software, firmware, hardware, or a combination of software and hardware.

The processor 102 may be embodied as any type of processor capable of performing the functions described herein. For example, the processor 102 may be embodied as a single or multi-core central processing unit (CPU), a multiple-CPU processor or processing/controlling circuit, or multiple diverse processing units or circuits (e.g., CPU and Graphics Processing Unit (GPU), etc.).

Processor memory may be provisioned inside a core and outside the core boundary. For example, registers 110 may be included within the core and may be used to store encoded pointers (e.g., 114), secret keys 116 and possibly tweaks 117 for encryption and decryption of data or code and addresses. Processor 102 may also include cache 170, which may be L1 and/or L2 cache for example, where data is stored when it is retrieved from memory 120 in anticipation of being fetched by processor 102.

The processor may also include supplemental processor memory 180 outside the core boundary. Supplemental processor memory 180 may be a dedicated cache that is not directly accessible by software. In one or more embodiments, supplemental processor memory 180 may store the mapping 188 between parameters and their associated memory regions. For example, keys may be mapped to their corresponding memory regions in the mapping 188. In some embodiments, tweaks that are paired with keys may also be stored in the mapping 188. In other embodiments, the mapping 188 may be managed by software.

Generally, keys and tweaks can be handled in any suitable manner based on particular needs and architecture implementations. In a first embodiment, both keys and tweaks may be implicit, and thus are managed by a processor. In this embodiment, the keys and tweaks may be generated internally by the processor or externally by a secure processor. In a second embodiment, both the keys and the tweaks are explicit, and thus are managed by software. In this embodiment, the keys and tweaks are referenced at instruction invocation time using instructions that include operands that reference the keys and tweaks. The keys and tweaks may be stored in registers or memory in this embodiment. In a third embodiment, the keys may be managed by a processor, while the tweaks may be managed by software.

The memory 120 of the computing device 100 may be embodied as any type of volatile or non-volatile memory or data storage capable of performing the functions described herein. Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in memory is synchronous dynamic random access memory (SDRAM). In particular embodiments, DRAM of memory 122 complies with a standard promulgated by the Joint Electron Device Engineering Council (JEDEC), such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at www.jedec.org). Non-volatile memory is a storage medium that does not require power to maintain the state of data stored by the medium. Nonlimiting examples of non-volatile memory may include any or a combination of: solid state memory (such as planar or 3D NAND flash memory or NOR flash memory), 3D crosspoint memory, memory devices that use chalcogenide phase change material (e.g., chalcogenide glass), byte addressable nonvolatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), other various types of non-volatile random access memories (RAMs), and magnetic storage memory.

In some embodiments, memory 120 comprises one or more memory modules, such as dual in-line memory modules (DIMMs). In some embodiments, the memory 120 may be located on one or more integrated circuit chips that are distinct from an integrated circuit chip comprising processor 102 or may be located on the same integrated circuit chip as the processor 102. Memory 120 may comprise any suitable type of memory and is not limited to a particular speed or technology of memory in various embodiments.

In operation, the memory 120 may store various data and code used during operation of the computing device 100, as well as operating systems, applications, programs, libraries, and drivers. Memory 120 may store data and/or code, which includes sequences of instructions that are executed by the processor 102.

The memory 120 is communicatively coupled to the processor 102, e.g., via the I/O subsystem 124. The I/O subsystem 124 may be embodied as circuitry and/or components to facilitate input/output operations with the processor 102, the memory 120, and other components of the computing device 100. For example, the I/O subsystem 124 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 102, the memory 120, and/or other components of the computing device 100, on a single integrated circuit chip.

The data storage device 126 may be embodied as any type of physical device or devices configured for short-term or long-term storage of data such as, for example, memory devices and circuits, memory cards, hard disk drives, solid-state drives, flash memory or other read-only memory, memory devices that are combinations of read-only memory and random access memory, or other data storage devices. In various embodiments, memory 120 may cache data that is stored on data storage device 126.

The display device 128 may be embodied as any type of display capable of displaying digital information such as a liquid crystal display (LCD), a light emitting diode (LED), a plasma display, a cathode ray tube (CRT), or other type of display device. In some embodiments, the display device 128 may be coupled to a touch screen or other human computer interface device to allow user interaction with the computing device 100. The display device 128 may be part of the user interface (UI) subsystem 130. The user interface subsystem 130 may include a number of additional devices to facilitate user interaction with the computing device 100, including physical or virtual control buttons or keys, a microphone, a speaker, a unidirectional or bidirectional still and/or video camera, and/or others. The user interface subsystem 130 may also include devices, such as motion sensors, proximity sensors, and eye tracking devices, which may be configured to detect, capture, and process various other forms of human interactions involving the computing device 100.

The computing device 100 further includes a communication subsystem 132, which may be embodied as any communication circuit, device, or collection thereof, capable of enabling communications between the computing device 100 and other electronic devices. The communication subsystem 132 may be configured to use any one or more communication technology (e.g., wireless or wired communications) and associated protocols (e.g., Ethernet, Bluetooth™, Wi-Fi™, WiMAX, 3G/LTE, etc.) to effect such communication. The communication subsystem 132 may be embodied as a network adapter, including a wireless network adapter.

The example computing device 100 also includes a number of computer program components, such as one or more user space applications (e.g., application 134) and the privileged system component 142. The user space application may be embodied as any computer application (e.g., software, firmware, hardware, or a combination thereof) that interacts directly or indirectly with an end user via, for example, the display device 128 or the UI subsystem 130. Some examples of user space applications include word processing programs, document viewers/readers, web browsers, electronic mail programs, messaging services, computer games, camera and video applications, etc. Among other things, the privileged system component 142 facilitates the communication between the user space application (e.g., application 134) and the hardware components of the computing device 100. Portions of the privileged system component 142 may be embodied as any operating system capable of performing the functions described herein, such as a version of WINDOWS by Microsoft Corporation, ANDROID by Google, Inc., and/or others. Alternatively or in addition, a portion of the privileged system component 142 may be embodied as any type of virtual machine monitor capable of performing the functions described herein (e.g., a type I or type II hypervisor).

The example privileged system component 142 includes key creation module 148, which may be embodied as software, firmware, hardware, or a combination of software and hardware. For example, the key creation module 148 may be embodied as a module of an operating system kernel, a virtual machine monitor, or a hypervisor. The key creation module 148 creates the secret keys 116 (e.g., secret address keys and secret data keys) and may write them to a register or registers to which the processor 102 has read access (e.g., a special purpose register). To create a secret key, the key creation module 148 may execute, for example, a random number generator or another algorithm capable of generating a secret key that can perform the functions described herein. In other implementations, secret keys may be written to supplemental processor memory 180 that is not directly accessible by software. In yet other implementations, secret keys may be encrypted and stored in memory 120. In one or more embodiments, when a data key is generated for a memory region allocated to a particular software entity the data key may be encrypted, and the software entity may be provided with the encrypted data key, a pointer to the encrypted data key, or a data structure including the encrypted key or pointer to the encrypted data key. In other implementations, the software entity may be provided with a pointer to the unencrypted data key stored in processor memory or a data structure including a pointer to the unencrypted data key. Generally, any suitable mechanism for generating, storing, and providing secure keys to be used for encrypting and decrypting data (or code) and to be used for encrypting and decrypting memory addresses (or portions thereof) encoded in pointers may be used in embodiments described herein.

It should be noted that a myriad of approaches could be used to generate or obtain a key for embodiments disclosed herein. For example, although the key creation module 148 is shown as being part of computing device 100, one or more secret keys could be obtained from any suitable external source using any suitable authentication processes to securely communicate the key to computing device 100, which may include generating the key as part of those processes. Furthermore, privileged system component 142 may be part of a trusted execution environment (TEE), virtual machine, processor 102, a co-processor, or any other suitable hardware, firmware, or software in computing device 100 or securely connected to computing device 100. Moreover, the key may be "secret", which is intended to mean that its value is kept hidden, inaccessible, obfuscated, or otherwise secured from unauthorized actors (e.g., software, firmware, machines, extraneous hardware components, and humans).

Figure 2A:
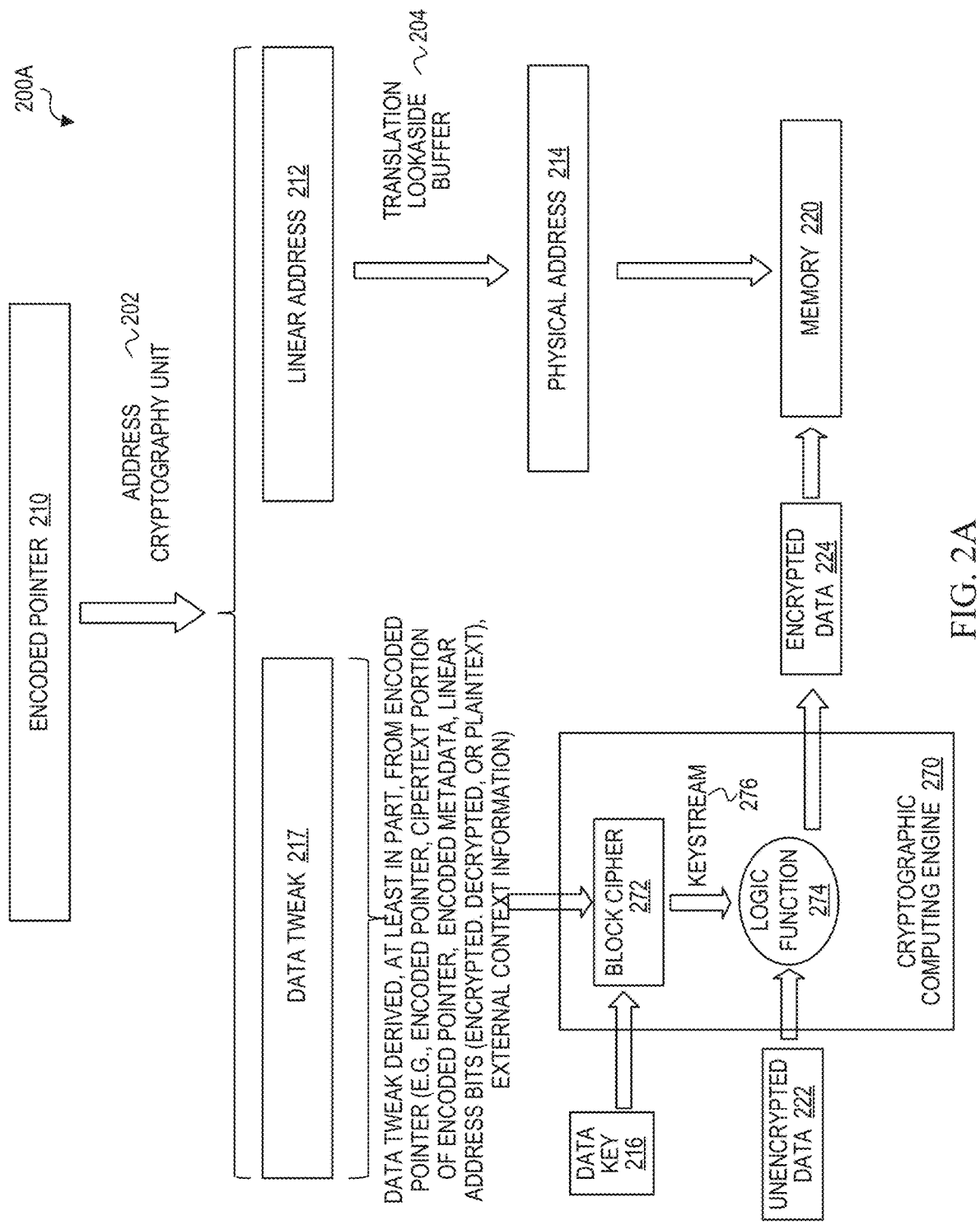
FIG. 2A is flow diagram illustrating a process of binding a generalized encoded pointer to encryption of data referenced by that pointer according to at least one embodiment of the present disclosure.

FIG. 2A is a simplified flow diagram illustrating a general process 200A of cryptographic computing based on embodiments of an encoded pointer 210. Process 200A illustrates storing (e.g., writing) data to a memory region at a memory address indicated by encoded pointer 210, where encryption and decryption of the data is bound to the contents of the pointer according to at least one embodiment. At least some portions of process 200A may be executed by hardware, firmware, and/or software of the computing device 100. In the example shown, encoded pointer 210 is an example of encoded pointer 114 and is embodied as an encoded linear address including a metadata portion. The metadata portion is some type of context information (e.g., size/power metadata, tag, version, magic value, validation code, etc.) and the linear address may be encoded in any number of possible configurations, at least some of which are described herein.

Encoded pointer 210 may have various configurations according to various embodiments. For example, encoded pointer 210 may be encoded with a plaintext linear address or may be encoded with some plaintext linear address bits and some encrypted linear address bits. Encoded pointer 210 may also be encoded with different metadata depending on the particular embodiment. For example, metadata encoded in encoded pointer 210 may include, but is not necessarily limited to, one or more of size/power metadata, a tag value, a version number, a magic value, and/or a validation code.

Generally, process 200A illustrates a cryptographic computing flow in which the encoded pointer 210 is used to obtain a memory address for a memory region of memory 220 where data is to be stored, and to encrypt the data to be stored based, at least in part, on a tweak derived from the encoded pointer 210. First, address cryptography unit 202 (e.g., the same or similar to address cryptography unit 104) decodes the encoded pointer 210 to obtain a linear address 212. If the encoded pointer 210 is partially encrypted (e.g., a portion of address bits and possibly some metadata), then decoding the encoded pointer 210 includes initially decrypting the encrypted portion. The decrypted address bits, plaintext address bits, and possibly other bits that replace metadata in the decrypted pointer can be concatenated to form linear address 212. The linear address 212 may be used to obtain a physical address 214 in memory 220 using a translation lookaside buffer 204 or page table (not shown). A data tweak 217 is derived, at least in part, from the encoded pointer 210. For example, the data tweak 217 may include the entire encoded pointer (which may or may not include an encrypted portion), one or more portions of the encoded pointer, a portion of the decoded linear address, the entire decoded linear address, some or all of the encoded metadata, external context information (e.g., context information or metadata that is not encoded in the pointer), or any suitable combination thereof.

Once the tweak 217 has been derived from encoded pointer 210, a cryptographic computing engine 270 (e.g., the same or similar to cryptographic computing engine 108) can compute encrypted data 224 by encrypting unencrypted data 222 based on a data key 216 and the data tweak 217. In at least one implementation, the cryptographic computing engine 270 includes an encryption algorithm such as a keystream generator, which may be embodied as an AES-CTR mode block cipher 272, at a particular size granularity (any suitable size). In this example, the data tweak 217 may be used as an initialization vector (IV) and a plaintext offset of the encoded pointer 210 may be used as the counter value (CTR). The keystream generator can encrypt the data tweak 217 to produce a keystream 276 and then a cryptographic operation (e.g., a logic function 274 such as an exclusive-or (XOR), or other more complex logic operations) can be performed on the unencrypted data 222 and the keystream 276 in order to generate encrypted data 224. It should be noted that the generation of the keystream 276 may commence while the physical address 214 is being obtained from the encoded pointer 210. Thus, the parallel operations may increase the efficiency of encrypting the unencrypted data. It should be noted that the encrypted data may be stored to cache (e.g., 170) before or, in some instances instead of, being stored to memory 220.

Figure 2B:
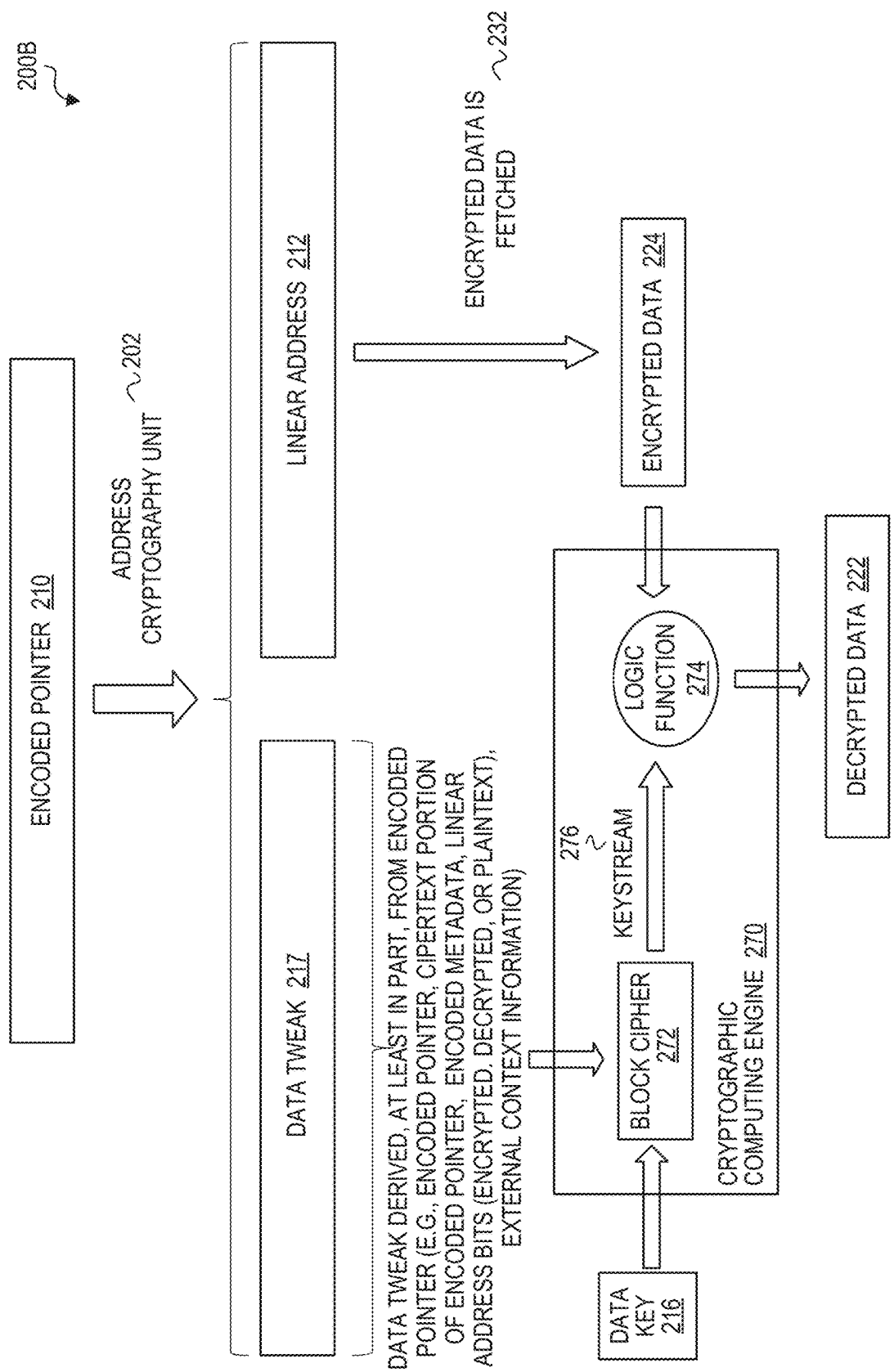
FIG. 2B is flow diagram illustrating a process of decrypting data bound to a generalized encoded pointer according to at least one embodiment of the present disclosure.

FIG. 2B is a simplified flow diagram illustrating a general process 200B of cryptographic computing based on embodiments of encoded pointer 210. Process 200B illustrates obtaining (e.g., reading, loading, fetching) data stored in a memory region at a memory address that is referenced by encoded pointer 210, where encryption and decryption of the data is bound to the contents of the pointer according to at least one embodiment. At least some portions of process 200B may be executed by hardware, firmware, and/or software of the computing device 100.

Generally, process 200B illustrates a cryptographic computing flow in which the encoded pointer 210 is used to obtain a memory address for a memory region of memory 220 where encrypted data is stored and, once the encrypted data is fetched from the memory region, to decrypt the encrypted data based, at least in part, on a tweak derived from the encoded pointer 210 (which may or may not include an encrypted portion). First, address cryptography unit 202 (e.g., the same or similar to address cryptography unit 104) decodes the encoded pointer 210 to obtain the linear address 212. If the encoded pointer 210 is partially encrypted (e.g., a portion of address bits and possibly some metadata), then decoding the encoded pointer 210 includes initially decrypting the encrypted portion. The decrypted address bits, plaintext address bits, and possibly other bits that replace metadata in the decrypted pointer can be concatenated to form linear address 212. The linear address 212 is used to fetch the encrypted data 224 from memory, as indicated at 232. It should be noted that in some cases, the encrypted data that is fetched may be an encrypted address to another memory location (e.g., return address in a stack frame). Data tweak 217 is derived, at least in part, from the encoded pointer 210 (which may or may not include an encrypted portion). In this process 200B for loading/reading data from memory, the data tweak 217 is derived in the same manner as in the converse process 200A for storing/writing data to memory.

Once the tweak 217 has been derived from encoded pointer 210, the cryptographic computing engine 270 can compute decrypted (or unencrypted) data 222 by decrypting encrypted data 224 based on the data key 216 and the data tweak 217. As previously described, in this example, the cryptographic computing engine 270 (e.g., the same or similar to cryptographic computing engine 108) includes an encryption algorithm such as a keystream generator embodied as AES-CTR mode block cipher 272, at a particular size granularity (any suitable size). In this embodiment, the data tweak 217 may be used as an initialization vector (IV) and a plaintext offset of the encoded pointer 210 may be used as the counter value (CTR). The keystream generator can encrypt the data tweak 217 to produce keystream 276 and then a cryptographic operation (e.g., the logic function 274 such as an exclusive-or (XOR), or other more complex operations) can be performed on the encrypted data 224 and the keystream 276 in order to generate decrypted (or unencrypted) data 222. It should be noted that the generation of the keystream may commence while the encrypted data is being fetched at 232. Thus, the parallel operations may increase the efficiency of decrypting the encrypted data.

Encoded Stack Pointers for Granular Stack Data and Control Flow Protections

Cryptographic computing can be utilized to address memory safety issues on the stack. Such issues have caused security vulnerabilities, targeting both adjacent data on the stack as well as control flow parameters such as the return address. Safety issues that permit a stack buffer overrun can provide read or write access to data on caller's stack frame and the return pointer, allowing a compromised callee to subvert control of the execution environment. To address these issues, cryptographic computing systems can utilize an encoded and/or encrypted stack pointer that is updated when entering or leaving stack frames. Among other encoded information, the encrypted stack pointer may contain immutable bounds constraining the operable range of that pointer to within its originating stack frame. Thus, data in each stack frame may be uniquely encrypted, and an encoded/encrypted stack pointer may only be used to access data in the frame to which it is associated. In some instances, an encrypted stack pointer can also be used as an Initialization Vector (IV) for uniquely encrypting data within the stack frame, providing data confidentiality and pseudo-integrity. The cryptographic computing systems herein provide zero-touch protections for software containing stack memory safety and security issues, hence providing legacy binary compatibility.

As used herein, a stack frame may refer to a range of contiguous linear addresses for holding state information associated with a function, as well as passing parameters and return values between functions during CALL and RET instructions.

Extra actions may be taken at the time of a CALL or RET instruction for entry and exit to a function. At CALL time, an instruction set architecture (ISA) may require software to have the Stack Pointer register (RSP) set to the bottom of the caller's frame. After pushing the return address onto the stack, the processor can treat the value of the stack pointer as the upper boundary for the new frame. References made in the callee's frame may generally not exceed this threshold. Alternative embodiments may grow stacks towards higher addresses, in which case the value of the stack pointer after pushing the return address onto the stack could be treated as the lower boundary for the new frame, and other aspects of this invention that are dependent on the direction of stack growth could be similarly reversed.

The upper boundary of the frame can be encoded into the callee's stack pointer prior to completion of the CALL instruction. The upper bits of the stack pointer can be used to store the upper boundary. These bits are available because the majority of the stack pointer bits never change; on Windows a typical stack limit is 64 MB, on Linux 8 MB per process. These static bits may be stored off to the side in a register shared for the entire stack. The current value of the stack pointer is pushed onto the stack to be used later in the RET instruction and to unwind the stack.

Figure 3:
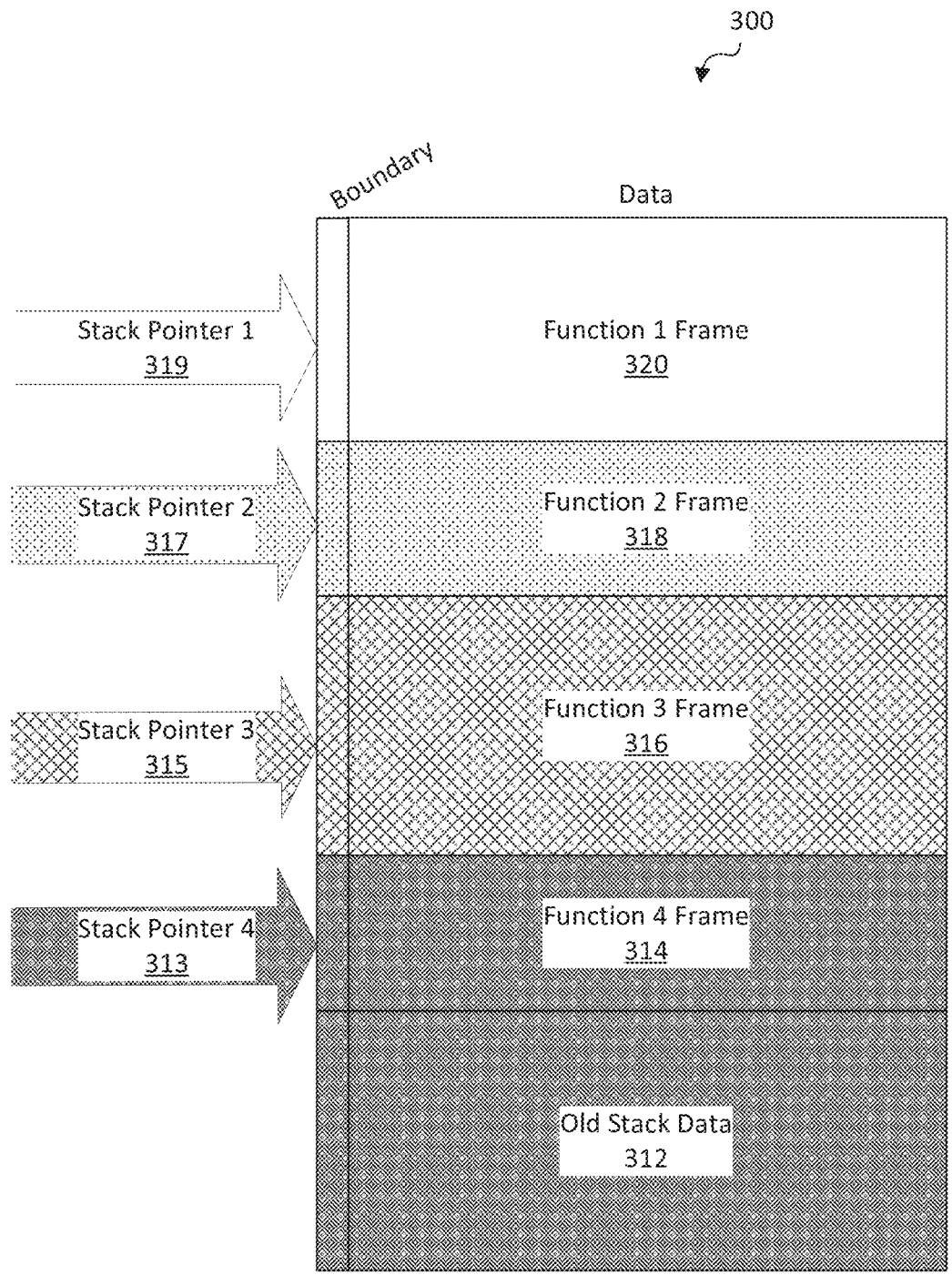
FIG. 3 illustrates example frames on a stack and corresponding encoded stack pointers in accordance with one or more embodiments of the present disclosure.

FIG. 3 illustrates example frames (314, 316, 318, 320) on a stack 300 and corresponding encoded stack pointers (313, 315, 317, 319) in accordance with embodiments of the present disclosure. In the example shown, Function 1 calls Function 2, which calls Function 3, which calls Function 4, and each Function stores its own data on the stack 300 in respective frames. Each frame has a unique corresponding stack pointer, and the stack pointer is bounded to its corresponding frame. For instance, in the example shown, the stack pointer 319 corresponds to frame 320 for Function 1, the stack pointer 317 corresponds to frame 318 for Function 2, the stack pointer 315 corresponds to frame 316 for Function 3 and the stack pointer 313 corresponds to frame 314 for Function 4. There also exists old stack data 312 from a previous function call.

The stack pointers may be encoded as described herein and may contain boundary information for the frame. In some instances, the encoded stack pointer may be used as an initialization vector (IV) for encryption of the frame data; that is, data in each frame may be uniquely encrypted based on its corresponding encoded stack pointer such that it is only accessible using the frame's corresponding stack pointer. In the example shown in FIG. 3, for instance, the Function 1 may access frame data in frame 320 using the encoded stack pointer 319; however, other functions may not access the data in frame 320 as the pointers 313, 315, 317 will decode in such a way that does not allow access to the data in frame 320. In the example shown, Function 4 may overwrite the old stack data 312 as needed, but may not access the old stack data 312 as the corresponding pointer(s) to the old stack data 312 is no longer available (e.g., has been destroyed).

Figure 4A:
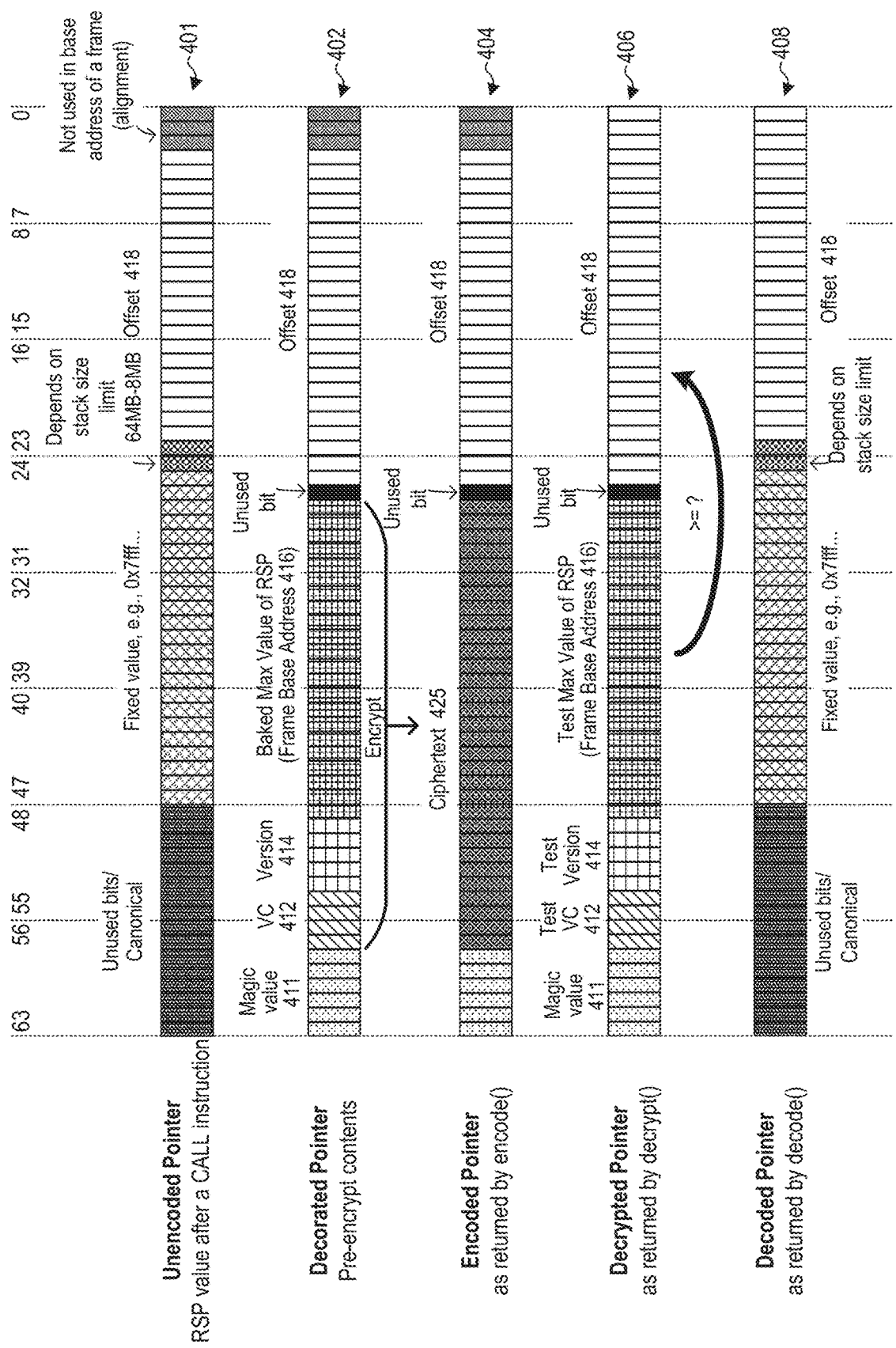
FIGS. 4A-4B illustrate example stack pointer formats that may be used in certain embodiments of the present disclosure.

FIG. 4A illustrates example stack pointer formats that may be used in certain embodiments of the present disclosure. Stack-frame granular encryption is realized by fixing the upper bits of the stack pointer register (RSP) on execution of a call (e.g., CALL) instruction. This ensures that any pointers based on RSP (e.g., pointers to local variables or the frame pointer) that are within bounds correctly decrypt data within the frame. On execution of a return (e.g., RET) instruction, the fixed part (e.g., base address) of the RSP is rolled back to the previous frame's value based on metadata (e.g., distance metadata) encoded in the return address.

In accordance with embodiments of the present disclosure, an encoded or decorated stack pointer (e.g., 402) may be constructed from an unencoded stack pointer (e.g., 401). As shown, the canonical/non-canonical reserved range of the pointer, e.g., bits 48-63, can be used in the decorated pointer, as this pointer may only be handled in architectural registers and these changes do not include widening the memory bus.

Accordingly, in certain embodiments (e.g., as shown), the topmost bits of the decorated pointer 402 may include a magic value 411 (e.g., in 6 bits as shown) that can be used to indicate this pointer is an encoded stack pointer (i.e., identifying the encoded pointer as being distinct from other types of encoded pointers) and may encode other information. In addition to the magic value, depending on the encoding scheme, a fixed or computed Validation Code (VC) 412 may also be encoded in the decorated pointer 402 (e.g., in the next 4 bits as shown). The VC 412 may be used to detect malicious corruption of the pointer, for example. The VC 412 may also provide resistance from replay in some instances. Further, version information 414 may be incorporated in the decorated pointer as well (e.g., in next 5 bits as shown), for example, to mitigate call trees being extremely repetitive. Because the same base addresses of stack frames will be reused many times in a program, additional entropy may be added by the version information to ensure that the reused stack is encrypted differently than the previous encryption scheme with an older version.

Additionally, a baked maximum value/max RSP value 416 may be encoded in the decorated pointer 402 (e.g., in 22 bits as shown). This value may include or indicate the address of the top of the frame recorded after the CALL instruction has finished executing (e.g., RSP max 602 in FIG. 6C). The address at the top of the frame is also the base address 416 or RSP base of the particular stack frame and typically indicates a location in the stack frame containing a return address to an instruction in the caller function. Including this baked value in the encoding of the pointer may prohibit the pointer from accessing a higher address than the top of current frame, preventing stack pointers created in this frame from accessing data in prior frames. As the program executes, this value may be reduced such that the current frame can only access its own space and below; that is, passed pointers from prior frames can only open their frames and below. The base address of the frame may also be used as a source of variance for stack data encryption in some instances.

An encoded pointer can then be generated from the decorated pointer. In some embodiments, for example, the encoded pointer (e.g., 404) contains the same contents of the decorated pointer (e.g., 402), but with certain bits of the decorated pointer (e.g., the VC, version information, and baked maximum value of 402) being encrypted to prevent user software from tampering with the pointer's encoded data. The encryption may be performed using a block cipher, in some embodiments. Generally, a block cipher may refer to an encryption algorithm that uses a symmetric key to encrypt a block of data in a way that provides confidentiality with properties such as bit diffusion and confusion that are important for preventing an adversary from predictably manipulating the decrypted address slice. At least some block cipher embodiments include an initialization vector (IV), which may include a fixed-size input that is random, pseudorandom, or nonrepeating, depending on the particular block cipher requirements. The encryption thus diffuses encrypted information across all bits in the ciphertext portion of the encoded pointer. The encryption can be performed as previously described herein, for example, using an address key and/or an address tweak that includes at least some of the plaintext bits in the decorated pointer that are not being encrypted. In some embodiments, the block size may be too small to fit the entirety of the pointer elements that need to be made immutable. The pointer elements or portions thereof that do not fit may be kept as plaintext in the encoded pointer and passed as a tweak to the block cipher.

The encoded pointer 404 may then be loaded into the stack pointer register (RSP). Software may subtract from the offset region 418 of the pointer and perform conventional pointer arithmetic to access data stored on the stack frame. Some or all of the fixed ciphertext portion 425 in the encoded pointer 404 represents the security context. For example, the security context may include only the frame base address 416. In another example, the security context may include the frame base address 416 along with one or more other items of metadata such as version 414, VC 412, and/or magic value 411. All or part of the fixed ciphertext portion 425 or of the decrypted ciphertext can be used in a tweak to encrypt (e.g., when storing) and decrypt (e.g., when loading) the contents of the stack frame associated with the encoded pointer. In other embodiments, all or part of the encoded metadata, baked maximum value, and/or plaintext fixed value may be used in a tweak to encrypt the contents of the stack frame associated with the encoded pointer.

The encoded pointer 404 may be decrypted and decoded to obtain a decoded pointer. The ciphertext portion 425 of the encoded pointer 404 is decrypted to yield a decrypted pointer 406. The original address (e.g., decoded pointer 408) can be reconstructed by replacing the baked max value and other topmost bits with the topmost bits of the actual linear address that are stored in a separate configuration or shared register.

In some embodiments, the pointer's format can be adjusted so that version information is encoded in the upper bits of the plaintext portion of the pointer. These bits may be incorporated as additional IV bits in the data encryption, or as tweak bits if tweakable encryption is used. In some embodiments, a pointer authentication code (PAC) could be included in the space originally allocated to the version information in the encrypted/ciphertext region of the pointer as shown in FIG. 4A. However, in other embodiments, a PAC may occupy a different set of bits. A pointer authentication code may include a message authentication code (MAC) embedded in a region of the pointer. The pointer authentication code may be computed over the address portion of the pointer, and may also incorporate context information in certain instances.

Figure 4B:
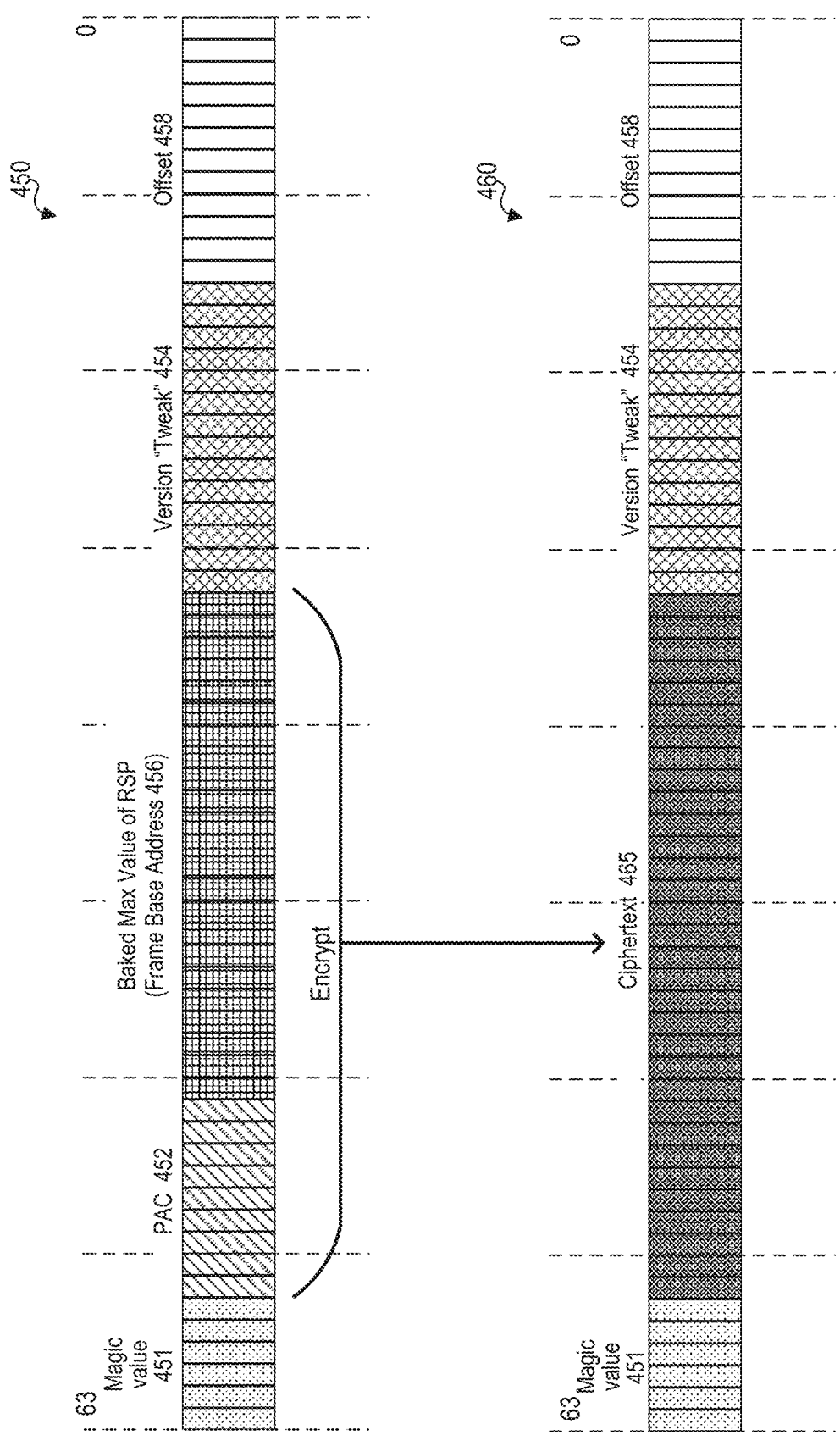

FIG. 4B illustrates another example encoding of a pointer in accordance with embodiments of the present disclosure. In particular, the example decorated pointer 450 of FIG. 4B includes both a PAC 452 and version information 454 as described above, but with each having more bits allocated to them, potentially increasing their efficacy. Further in the example shown, the PAC 452 occupies the upper region of a ciphertext portion 465 of the encoded pointer 460 while the version information 454 occupies the upper bits of the plaintext portion of the encoded pointer 460.

In some scenarios, certain of the lower bits of the pointer may be duplicated in the upper bits. Accordingly, in some embodiments, the baked maximum value portion may be used to store bits that do not change in the offset portion 458 of the pointer.

Figure 5A:
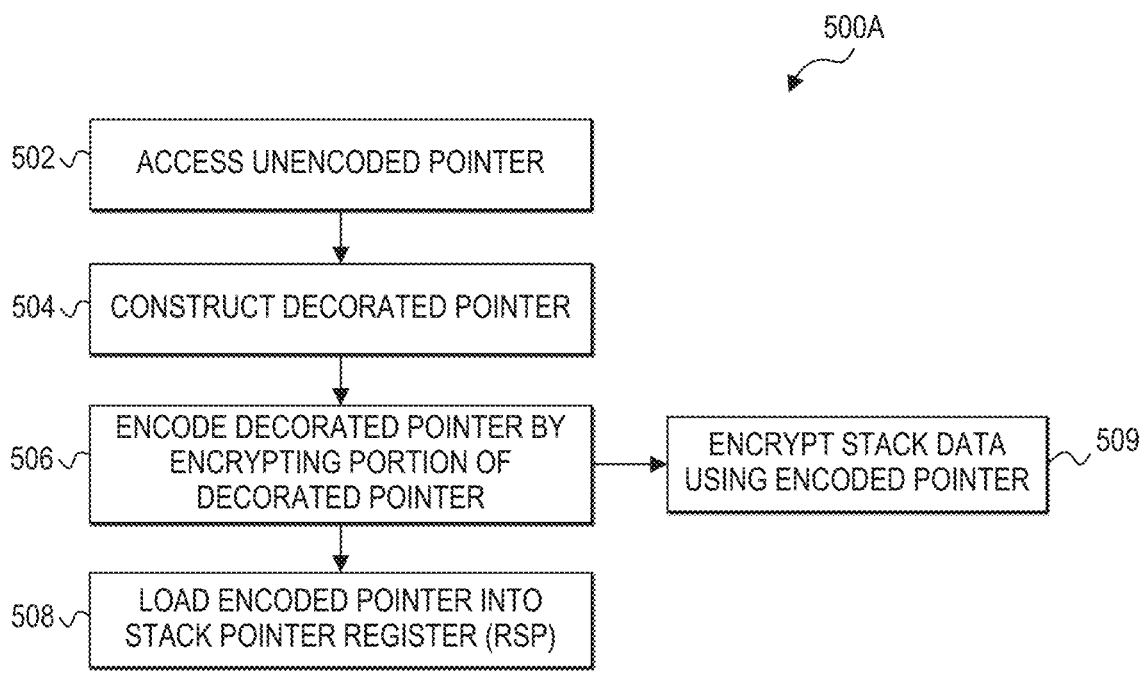
FIGS. 5A and 5B are flow diagrams of example processes for using stack pointers (e.g., those in FIGS. 4A-4B) according to at least one embodiment of the present disclosure.
Figure 5B:
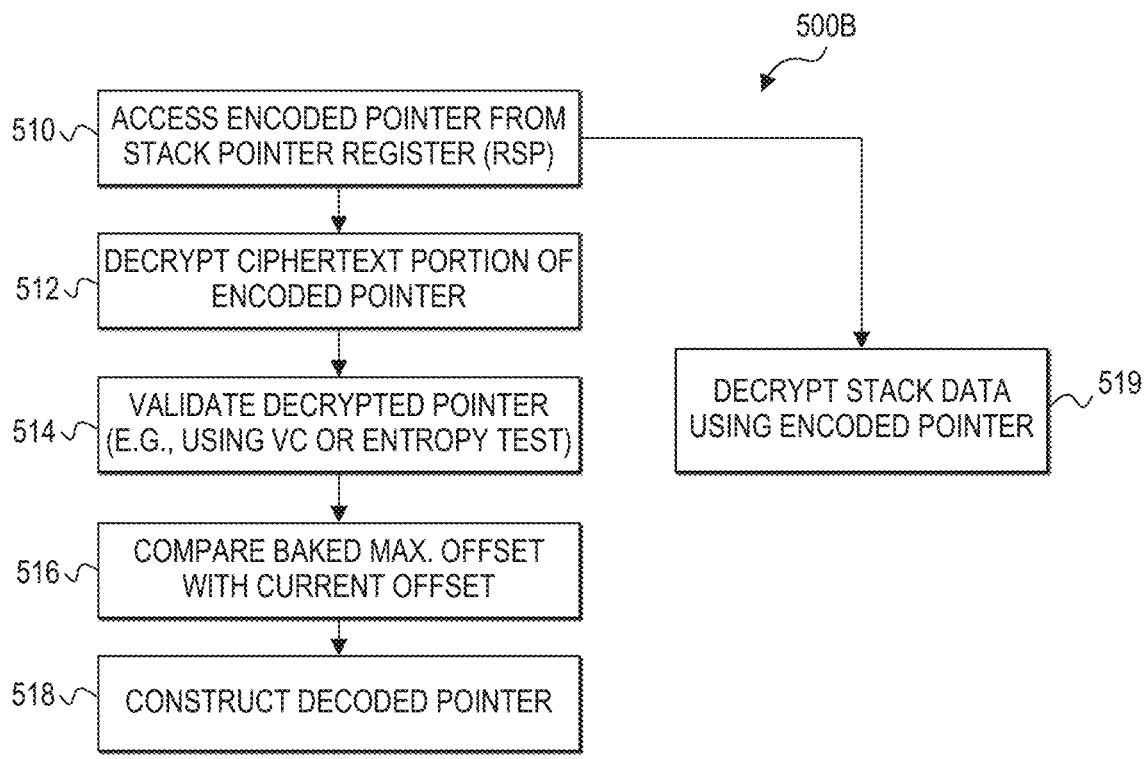

FIGS. 5A-5B illustrate flow diagrams of example processes 500A, 500B for using stack pointers (e.g., those in FIGS. 4A-4B) in accordance with embodiments of the present disclosure. One or more aspects or operations of the example processes may be implemented by processor circuitry, such as execution circuitry. The example processes may include additional or different operations, and the operations may be performed in the order shown or in another order. In some cases, one or more of the operations shown in FIGS. 5A-5B are implemented as processes that include multiple operations, sub-processes, or other types of routines. In some cases, operations can be combined, performed in another order, performed in parallel, iterated, or otherwise repeated or performed another manner.

When data is to be stored in a stack frame, e.g., based on a CALL instruction, a stack pointer may be generated and encoded according to the example process 500A. At 502, an unencoded pointer (e.g., the unencoded pointer 401 of FIG. 4A) is accessed or otherwise obtained after generation. At 504, a decorated pointer (e.g., the decorated pointer 402 of FIG. 4A) is constructed. The contents of the decorated pointer may be as described above with respect to FIGS. 4A-4B, in some embodiments. For example, the decorated pointer may include a magic value, VC, PAC, version information, and/or baked maximum value of the RSP as described above. At 506, the decorated pointer is encoded by encrypting at least a portion of the decorated pointer, resulting in an encoded pointer (e.g., the encoded pointer 404 of FIG. 4A). The encryption may be performed using a block cipher, such as an AES-based block cipher, in some embodiments. At 508, the encoded pointer is loaded into the stack pointer register (RSP).

In some embodiments, data may be encrypted using all or part of an encoded pointer at 509. The encryption can be performed in a similar manner as described above with respect the FIG. 2A, in some embodiments. For example, a portion of the encoded pointer may be used as a tweak or initialization vector (IV) for encryption of the data to be stored in the corresponding frame of the stack. The portion may include the upper portion of the pointer, including the ciphertext portion. The data encryption may ensure confidentiality and pseudo-integrity in the cases where boundary checking cannot be used to verify the validity of a reference. Confidentiality may be provided by the data encryption, whereas integrity may be provided because invalid writes will write data with the incorrect IV, thereby uncontrollably corrupting data. Lacking control will reduce an adversary's ability of obtaining desirable results and increase the chance of crashing a program. The encoding of the pointer, using the address and version as a tweak, may ensure unique confidentiality properties for each stack frame.

Later, the encoded stack pointer may be used to access stack data, and the example process 500B may be used to decode the encoded stack pointer. At 510, the encoded pointer (e.g., the encoded pointer 404 of FIG. 4A) is accessed from a stack pointer register. At 512, the ciphertext portion of the encoded pointer is decrypted to yield a decrypted pointer (e.g., the decrypted pointer 406 of FIG. 4A). The decryption process can be performed in a similar manner as described above with respect to FIG. 2B, in some embodiments.

At 514, the decrypted pointer is validated. For example, VC or PAC information in the decrypted pointer may be validated. For instance, in some implementations, the Validation Code (VC) or PAC of the decrypted pointer may be tested to ensure mutation has not occurred. This is because an attacker flipping bits of the ciphertext of the encoded pointer without knowledge of the key will cause decryption of the pointer ciphertext to be uncontrollably garbled. That is, if the encrypted portion of the pointer is mutated in any way (e.g., by an adversary), the decrypted data should be uncontrollably random and thus, the validation will fail. In some cases, the VC may be set to all zeroes, and if any decoded VC value includes a one then it may be determined that the pointer was altered and should be deemed invalid. In some cases, the VC or PAC may include a MAC. In such cases, a hash or sum of the other fields in the encrypted slice of the pointer may be generated (e.g., the version and Max RSP fields). The same calculation is performed when decorating and decrypted the pointer. If the MAC does not match when decrypting the pointer, then this pointer must have been altered and should be deemed invalid.

In some embodiments, an entropy test may also be used to determine if some bits with expected low entropy have been garbled. While the above approaches for validation involve bits taken from the pointer to authenticate the pointer, there is a way to leave those bits available for other use and still detect corruption. For instance, the pointer can be examined to determine if the encrypted fields (after decryption) seem like they are garbled. Again, if an attacker tried to modify the ciphertext, all of the fields would be uncontrollably random when decrypted. Algorithms that measure randomness, or "entropy" can be used to determine if the decrypted ciphertext has too high of an entropy. If so, then it could be an indication the pointer was altered and may be determined to be invalid.

At 516, the baked maximum offset in the decrypted pointer may be compared to the offset of the decrypted pointer. If the current offset is higher than the maximum, an exception may be generated for invalid access, implying the stack pointer is trying to access beyond the upper bounds of the current stack frame.

In some embodiments, the amount of data being accessed by the current instruction may be added to the current offset in the decrypted pointer prior to comparing it to the baked maximum offset. Some embodiments may allow read-only access to the return address of a frame referenced by a pointer to that frame for software compatibility purposes. Some embodiments may detect read accesses to return address storage locations and actually load the unencoded return addresses even if those storage locations contain encoded forms of the return addresses or non-address metadata. Some embodiments may use a particular type of memory load instruction or a prefix applied to an existing type of memory load instruction to indicate that the unencoded return address should be loaded from the return address storage location, and ordinary memory load instructions could read the encoded return address from that location. For example, an exception handler search routine may use an unencoded return address to look up information in a table indexed by code locations, whereas a setjmp routine may load an encoded return address to be stored in a buffer for later use by a longjmp routine. Some embodiments may generate a fault if a decorated pointer 402 is dereferenced that has a baked maximum offset lower than the baked maximum offset in the current RSP value, since that may indicate use of a stale pointer referencing a stack frame that is no longer valid.

If no faults are generated by 514 or 516, then a decoded pointer (e.g., the decoded pointer 408 of FIG. 4A) is reconstructed at 518. This may include restoring a fixed value portion of the pointer. For example, the fixed value portion of the stack pointer may be restored from the shared register. The decoded pointer may then be passed to the memory pipeline as the address for handling the memory access event, e.g., for accessing stack data. On a RET instruction, the caller's value of the stack pointer may be popped from the stack.

In some embodiments, the stack frame data may be encrypted using the encoded stack pointer as described above. In such embodiments, the stack frame data may be decrypted at 519 using the encoded stack pointer. For example, the portion of the encoded pointer used in encrypting the data may be used as an IV for decrypting the data as well. The decryption process can be performed in a similar manner as described above with respect to the FIG. 2B, in some embodiments.

Some embodiments may check for a pointer in the format of an encoded pointer (e.g., similar to 404) being passed as the destination of an indirect jump instruction, e.g., as may occur in a longjmp software routine, and adjust its operation to match the effects of pushing the provided encoded pointer onto the stack and executing a return instruction. In alternative embodiments, software routines that may pass an encoded pointer 404 to indirect jump instructions may be modified to instead push the encoded pointer 404 onto the stack and execute a return instruction.

Return Pointer Encoded Unwind Information

The above suggests pushing the caller's value of the stack pointer onto the stack during the CALL instruction and popping on the RET instruction. This can consume space on the stack that legacy compilers are not expecting, potentially introducing compatibility issues. Accordingly, in some embodiments, the size of the caller's frame (e.g., absolute or relative to the bottom of the stack) can be encoded in the upper bits of the return address (RA) pointer. This does not consume additional stack resources and hence, does not alter the layout of the stack.

In some embodiments, the distance to a previous stack frame base recorded in the return vector on a CALL as the distance to the previous (caller's) frame's base (2—16 bytes) may be a smaller number than the base encoding itself, whose size is dependent on the entire stack size. Only the caller's frame distance may need to be stored because the next frame will have a different base and the data encryption provides confidentiality as the next frame will be encrypted differently, given its data will be encrypted with a different encoded base frame in the RSP (confidentiality preserved). Data integrity will also provide detection of tampering in this case too.

Metadata Encoded in Stack Pointers

In some embodiments, the return address can be used to encode the frame metadata and/or caller RSP in order to maintain legacy code compatibility by not modifying the call stack as the return address is compatible with legacy software binaries application binary interface (ABI) where it is already part of the call stack. For example, unused bits (e.g., the non-canonical bits in a 64-bit linear address) in the return address may be used to indicate the offset to the top of the caller's stack frame as described below. From this offset, the processor may calculate the correct caller stack pointer on a return (RET) instruction, allowing the processor to use the correct base encoded cryptographic stack pointer for the caller's frame when returning from a function call.

Some embodiments may rely on constraints of typical ABI-defined code models to make additional bits in return addresses available for use to store metadata such as a high-water mark. For example, the typically-used "small" code model defined in the ABI requires that the code and globals for a software module fit within a 2 GiB region. That region may be required to be 2 GiB-aligned.

Figure 6C:
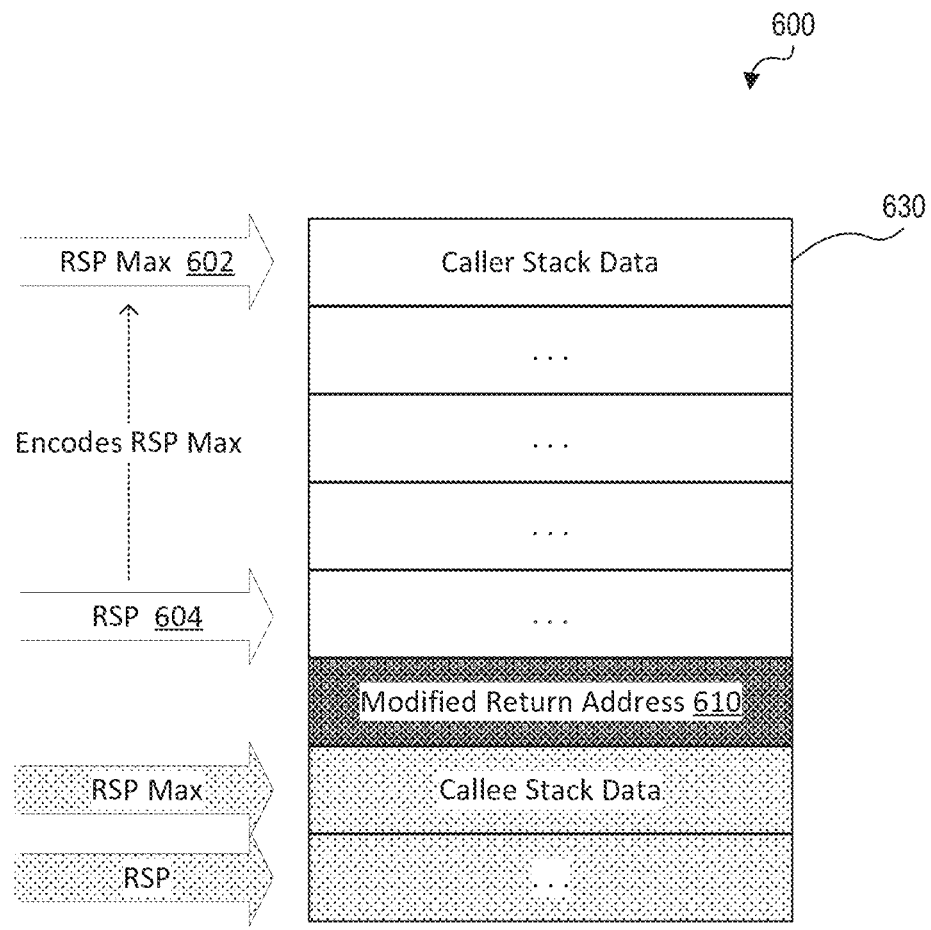

FIGS. 6A-6C illustrate an example of pointer-encoded metadata in accordance with embodiments of the present disclosure. In particular, FIGS. 6A-6B show example formats for a modified return address 610 and instruction pointer register (RIP) contents 620 that are 2 GiB-aligned, while FIG. 6C shows an example stack 600 that uses encoded stack pointers and return addresses encoded with metadata (e.g., modified return address 610). In certain embodiments, certain bits (e.g., the upper 33 bits) in the return addresses may be used to store metadata (e.g., distance metadata 612 representing the distance to the top of caller frame (e.g., the distance from the modified return address 610 to the top of caller frame 630 of the stack 600), high-water mark 614 (described above), and version information 616 in 610), since only 31 bits are required to store a return address offset within a 2 GiB code region. In some cases, the 33 upper bits of the return address could be obtained from the current program counter in the RIP register during function returns. For example, data in the 33 upper bits (software module upper address bits (SMUAB) 622) of the RIP 620 may be replaced and used for the metadata region in the modified return address 610 that is stored on the stack. Additional operations may be needed when returning from one software module to a different one, since they may reside in different 2G-aligned regions.

Updating Encrypted Security Context in Stack Pointers for Exception Handling

Typically, non-cryptographic stack protection has focused on integrity of specific data (e.g., the return address) and/or detection-only (e.g., stack canaries). Integrity and detection-only approaches without encryption, however, do not prevent other data from being read or such approaches may detect modification only on use. For example, non-cryptographic stack protection approaches typically have mechanisms to trivially skip enforcement where needed. Thus, non-cryptographic mechanisms provide only relatively weak probabilistic protection without cryptographic isolation. Capability systems provide security by explicitly managing bounds by updating the stack capability on function call to explicitly manage bounds. Such capability systems, however, require fundamental changes to program structures to achieve the desired security. Thus, while many existing stack protection mechanisms may provide some security for the stack, such systems are fundamentally deficient as they are bypassable in certain scenarios to allow access to any data in any stack frame needed to achieve a particular function, such as stack unwinding during exception handling.

Cryptographic stack protection, as previously described herein, provides encrypted stack pointers that utilize call and return instructions to demarcate function activations and encode the active security context into the stack pointer to provide cryptographic isolation between stack frames that are used, for example, during a function call. Additionally, existing legacy binaries can be protected without the need for recompilation or binary instrumentation.

Although cryptographic computing provides significant protections for stack data against buffer overruns and control flow parameters, certain scenarios continue to present memory safety issues in the stack. Some common programming patterns, break the one-to-one mapping between calls and returns. This can result in a stack pointer that needs access to another stack frame. Exception handling is one such programming pattern. Exceptions may occur during runtime as the result of an anomaly or abnormal condition that a program encounters during execution, and that are beyond the ability of the program to control. Exception handling is the special processing performed by a program to respond to the occurrence of exceptions. This special processing may be performed by executing an exception handler, which may vary with different programming languages.

Exception handling processes may perform call stack unwinding for a program in which one or more function entries are removed from a function call stack. An exception handler that performs exception handling processing will essentially store the current execution state in memory, which is rolled back in order to access previous frames to look at this exception handler and those prior frames. Specifically, when an exception occurs in code using a stack frame, the local objects stored in the stack frame are destroyed in reverse order in which they were constructed until an exception handler is found. For example, if function A calls function B, function B calls function C, and an exception occurs in function C (e.g., function C throws an exception), then a call stack unwinding begins. The function C entry is removed from the call stack if function C does not contain the exception handler for the thrown exception. The next prior function entry in the call stack, function B, is searched for the exception handler and is removed if the exception handler is not found. This continues until the exception handler is found in a function entry. If the next prior function, function A, contains the exception handler, then the exception processing code associated with the found exception handler is executed. During the unwinding, a return instruction is not executed. Rather, the current stack frame is removed (e.g., objects of the function are destroyed) and the unwinding process moves to the prior function frame in the stack to search for the exception handler. Based on the unwinding process that may happen when an exception occurs, a stack pointer could be given approved access to other stack frames that are not otherwise approved for and in fact, are prevented from, accessing.

Figure 7:
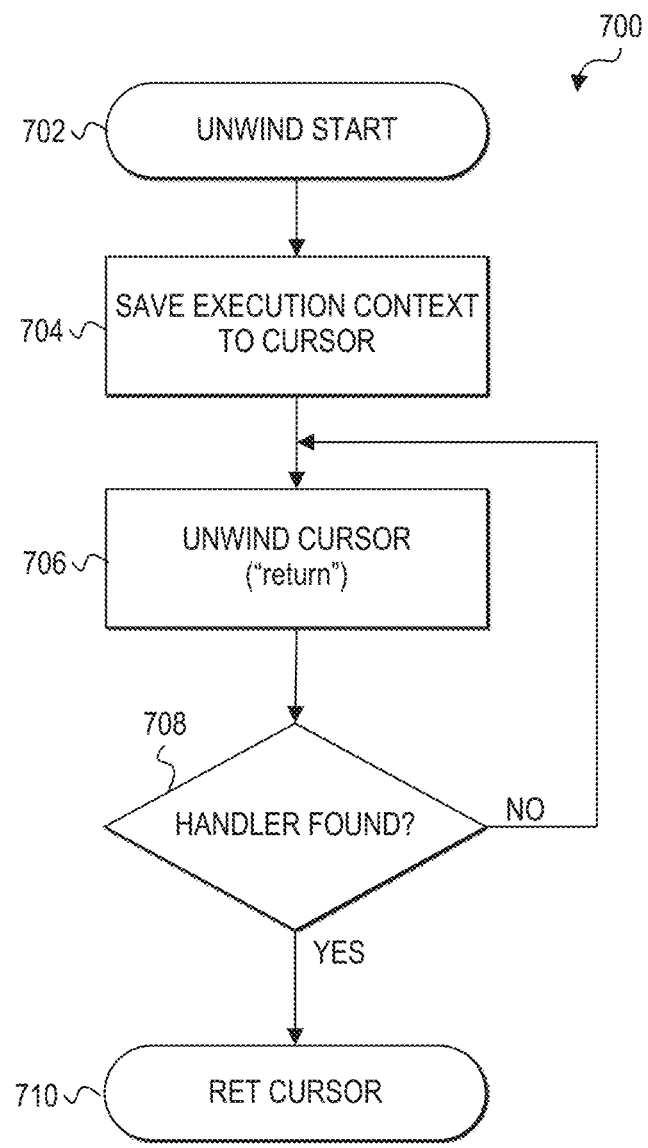
FIG. 7 is a high-level flow diagram of an unwinding process that may be associated with unwinding an unencrypted program call stack upon the occurrence an exception in a called function.

FIG. 7 is a flow diagram illustrating one unwinding process 700 that is commonly used for unencrypted stacks and stack pointers in response to the occurrence of an exception. The unwinding process 700 is representative of the Itanium Application Binary Interface (ABI) for C++ programming language, commonly used on Linux systems. The ABI starts an unwinding process in response to an exception being thrown. The ABI uses an abstract cursor data structure to hold the execution context (e.g., register values) of a process, as indicated at 704, while the process performs a two-stage non-destructive unwind of the program call stack. The first phase is a search to try and find the correct handler. The second phase invokes a handler (if found) or cleanup code. The first phase is similar to the second phase but does not invoke cleanup code, nor typically the found handler. After initializing the execution context at 704, a while loop is entered at 706 and 708 to unwind until the correct handler is found. At 706, the stack pointer to the current frame is modified to point to the prior stack frame. This enables the process to unwind one stack frame.

Information is obtained to enable an interface routine (e.g., personality routine in Itanium ABI) that is specific to the particular programming language being used. At 708, the information is used to determine whether a particular function contains an exception handler for the particular exception that was thrown. In some implementations, a table may be provided with metadata that indicates which exception handlers are present in a function. The interface routine may use the information from 706 to walk the table to search for an appropriate exception handler in the function for the particular exception that was thrown.

If an appropriate handler is not found, then a cleanup routine is invoked in the second phase to run destructors to destroy the objects of the function. In this case, the context is initialized again and at 706, the stack pointer to the current frame is modified to point to the next prior stack frame. This enables the process to again unwind one stack frame, determine information for the interface routine, and provide the information to the interface routine to search for an appropriate exception handler in the function corresponding to the current stack frame.

If an appropriate handler is found at 708, the cleanup routine is not run. Instead, the instruction pointer is reset, which may be done in interface routine (using unwind set instruction pointer). The unwinding process resets all the registers to the correct values and resumes execution from there. At 710, the final jump is destructive, in that a stack pointer register (RSP) is set directly to free intermediate frames and invoke a return (e.g., "RET" instruction) to set the instruction pointer register (RIP) to the entry point of the identified handler. The handler is typically either a cleanup routine that runs destructors for local objects, or a catch block that handles the exception.

When cryptographic computing is implemented, however, the data in each stack frame is encrypted and bound to respective stack pointers for the frames. In a cryptographic computing system, call stack unwinding as shown in FIG. 7 is not configured to handle encrypted stack data bound to pointers that reference the stack data. Whereas non-encrypted stack security solutions can simply bypass the protections that they have in place to do a multi-frame jump, a cryptographic computing system with encrypted stack data (and encrypted return addresses) needs the proper cryptographic state at each prior frame during a call stack unwinding process in order to correctly decrypt the data, such as return addresses, needed during the unwinding.

A cryptographic computing system for updating security context in stack pointers for exception handling as disclosed herein can resolve many of the aforementioned issues (and more). In one or more embodiments, new instructions are provided to allow verified unwinding of cryptographically encoded stack pointers without requiring access to prior stack pointers (e.g., use of frame pointers) or generation of arbitrary cryptographically encoded stack pointers. One or more embodiments disclosed herein accommodate non-destructive unwinding using two new instructions that update the security context of a stack pointer in a register operand ("REG") without modifying the stack pointer register (RSP) or the instruction pointer register (RIP). Specifically, the new instructions replicate the CALL instruction and RET instruction behavior, but use REG as the stack pointer and the value REG points to as the return address. The new instructions, however, do not actually branch but rather, perform a simulated branch. For example, a simulate return ("SIMRET") instruction simulates a normal return instruction from a callee function that is cryptographically protected. Similarly, a simulated call ("SIMCALL") instruction simulates a normal call instruction from a callee function that is cryptographically protected. The SIMRET instruction is repeated until an appropriate exception handler is found. When the unwinder function executes the identified exception handler, SIMCALL is used to generate a valid return address for the unwinder data structure so that a regular RET instruction may be used to enter the exception handler.

As an extension, the SIMCALL instruction could also have variants that do not modify any return addresses and that use an immediate operand. This embodiment can be useful in preventing the introduction of possibly exploitable instructions in most other uses cases that do not require a register operand but can instead use a statically determined constant value as an immediate operand.

A cryptographic computing system configured to update security context in stack pointers for exception handling as disclosed herein can provide numerous advantages. For example, such a system maintains security without relying on specific program behavior. In addition, stronger security properties are provided for cryptographically encoded stack pointers as in-memory storage of prior stack pointers or the ability to generate arbitrary cryptographically encoded stack pointers is not needed. Moreover, by replicating the behavior of a typical CALL instruction and using the actual return address during the call stack unwinding, possible integrity checks can be incorporated, and additional metadata does not need to be exposed to the application or unwinder library.

Figure 8:
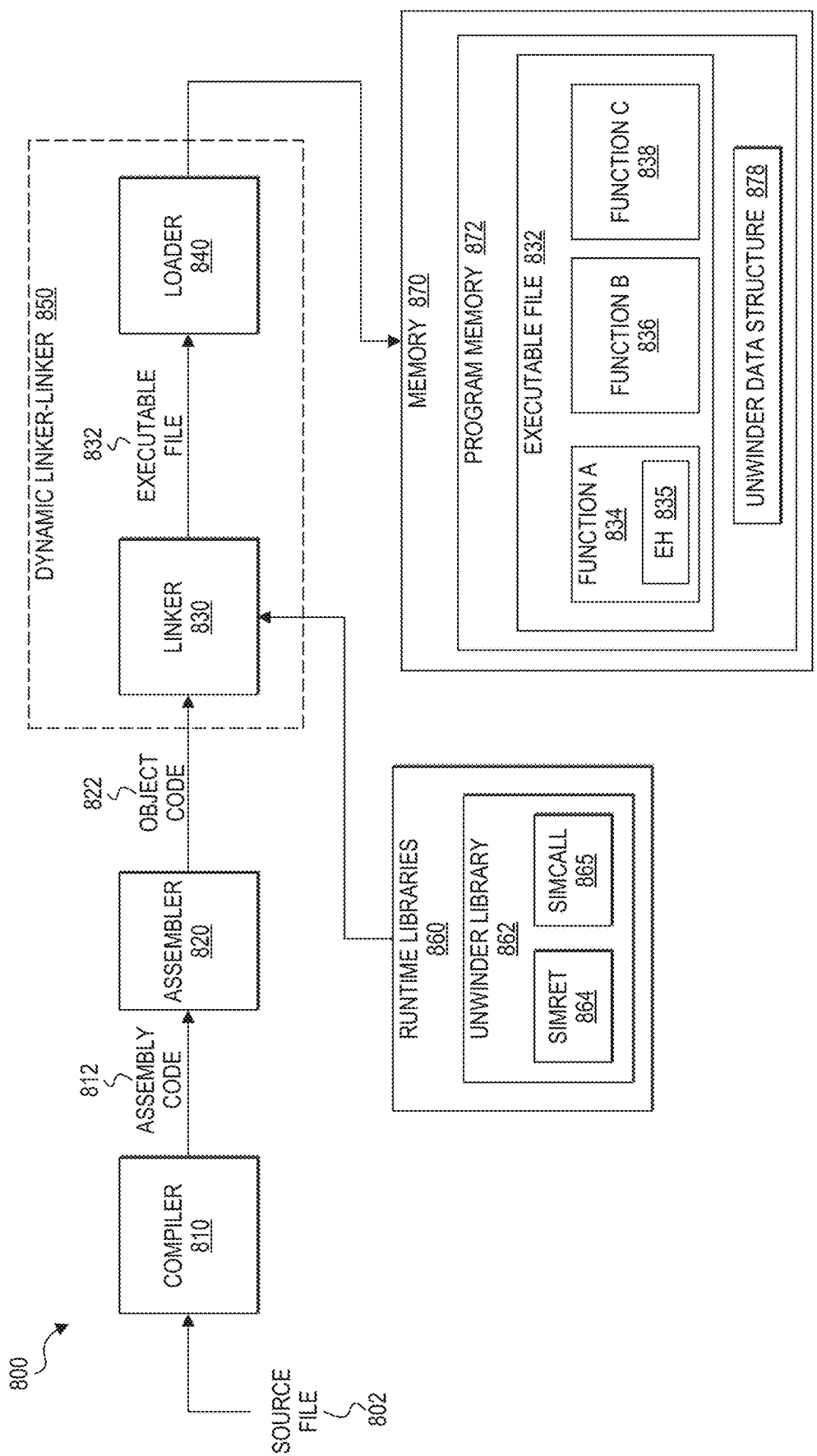
FIG. 8 is a block diagram illustrating a process for generating and loading an executable file according to at least one embodiment.

Turning to FIG. 8, FIG. 8 is a block diagram illustrating a process for generating and loading an executable file with an unwinder library that enables non-destructive stack winding of encrypted stack data according to at least one embodiment. Various components are provided to generate an executable file 832 including a compiler 810, an assembler 820, runtime libraries 860, a linker 830, and a loader 840. Compiler 810 reads a source file 802, which may be written in a high-level language (e.g., C, C++, Rust, etc.), and translates it into an equivalent program in machine language or assembly code 812. Assembler 820 translates the assembly code 812 into machine code, also referred to as object code 822. The object code 822 may be in the form of binary code. In other scenarios, an interpreter may be used to directly execute instructions without previously translating the instructions into object code or machine code.

Linker 830 and loader 840 may be separate components or may be combined as a dynamic linker-loader 850. The dynamic linker-loader 850 may be embodied as part of a virtual machine manager (VMM) or an operating system, for example. Dynamic linker-loader 850 may be part of a trusted execution environment (TEE), virtual machine, processor, or any other suitable hardware, firmware, software, or any suitable combination thereof securely connected to or in communication with a computing device (e.g., 100). In some scenarios, linker 830 (or the dynamic linker-loader 850) links object modules of a program to form a single executable file 832, which can include object code 822 and any shared libraries from runtime libraries 860. In particular, an unwinder library 862 containing code for performing an unwinder process configured with new instructions SIMRET 864 and SIMCALL 865, may be linked with object code 822 to form executable file 832. Either static linking (before execution) or dynamic linking (during runtime) may be used. For static linking, the unwinder library 862 may be copied into the executable file 832. The executable file 832 may be loaded into program memory 872 of memory 870 by loader 840 (or the dynamic linker-loader 850). In this case, a larger chunk of program memory 872 in memory 870 is needed to store executable file 832. Dynamic linking may involve a name or identifier of the unwinder library 862 being placed in the executable file 832 so that the unwinder library 862 may be shared with concurrently executing programs. During execution, when an exception occurs and the unwinder library is invoked, dynamic linker-loader 850 links the unwinder library 862 to executable file 832.

By way of example, executable file is illustrated with three functions and an exception handler. Executable file 832 includes function A 834, function B 836, and function C 838. Function A 834 contains an exception handler (EH) 835. When an exception occurs and the unwinder library 862 is invoked, a cursor data structure 878 is created to store execution state that enables simulate return and simulate call instructions (e.g., SIMRET 864 and SIMCALL 865).

Figure 9:
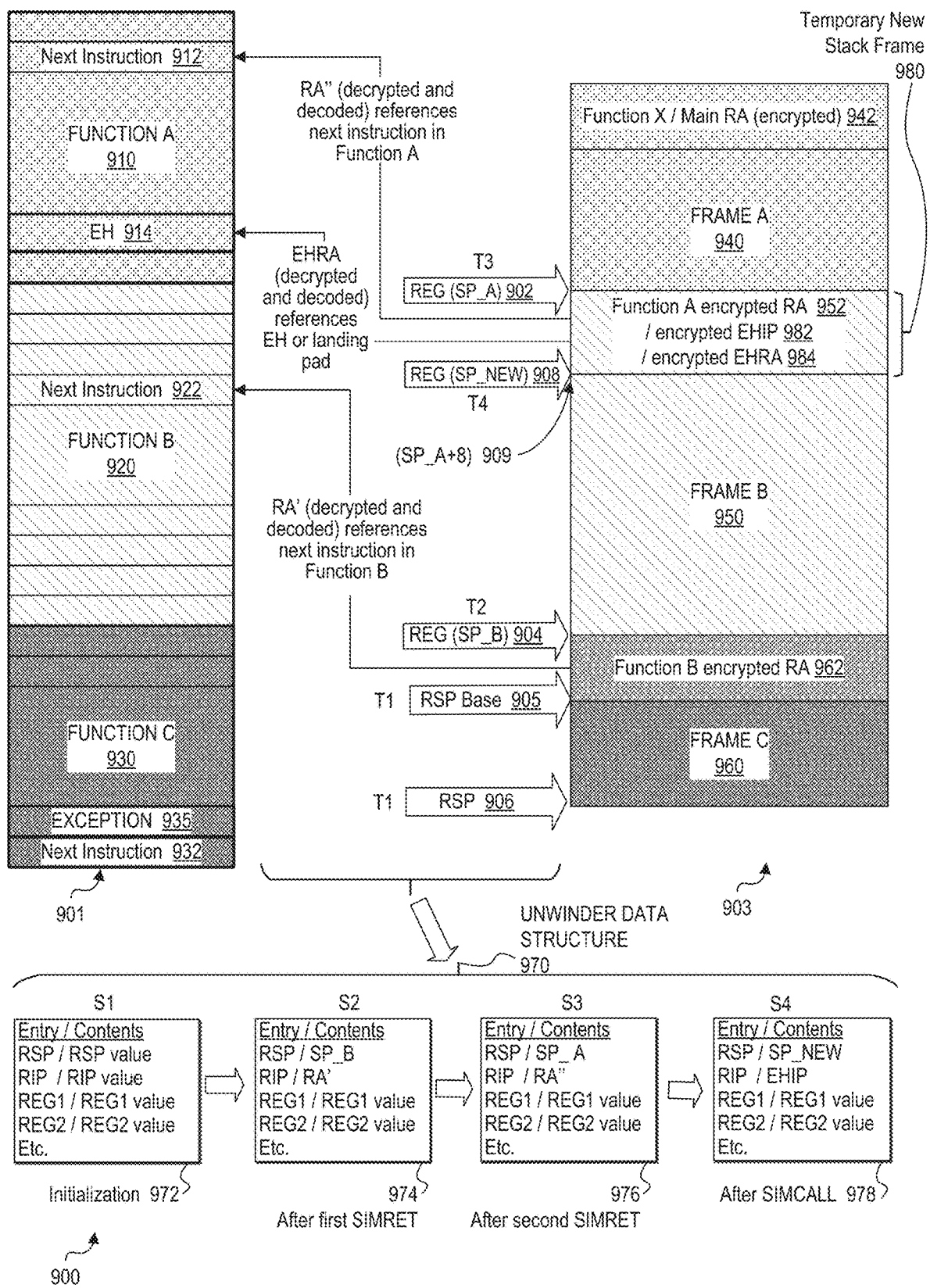
FIG. 9 is a block diagram illustrating an example scenario of an unwinding process in response to an exception occurrence for a stack protected with cryptographic computing according to at least one embodiment.

FIG. 9 is a block diagram of an example scenario of an unwinding process 900 of encrypted stack frames in a stack 903 and cryptographically encoded stack pointers according to one or more embodiments. In this example, stack 903 illustrates a downward growing stack where the top (or beginning) of each stack frame holds a return address to the prior stack frame, and a bottom (or end) of each stack frame corresponds to the last data (e.g., variable, return address, etc.) stored in that stack frame. However, it should be apparent that the embodiments described herein could be implemented with an upward growing stack.

FIG. 9 illustrates the execution of selected executable instructions 901 of a program including a Function A 910 with a corresponding stack Frame A 940, a Function B 920 with a corresponding stack Frame B 950, and a Function C 930 with a corresponding stack Frame C 960. Function A 910, Function B 920, and Function C 930 of the selected executable instructions 901 represent possible examples of respective Functions A 834, Function B 836, and Function C 838 of executable file 832 in FIG. 8. In this scenario, Function A 910 called Function B 920, Function B 920 called Function C 930, and an exception 935 was thrown in Function C 930. Frame A 940 includes an encrypted return address 942 to the function or main program that called Function A 910. Frame B 950 includes an encrypted return address 952 for Function A, pointing to the next instruction 912 in Function A 910 to be executed when execution control is returned to Function A 910. Frame C 960 includes an encrypted return address 962 for Function B, pointing to the next instruction 922 in Function B 920 to be executed when execution control is returned to Function B 920.

Various registers are also illustrated in FIG. 9. The registers may contain encoded stack pointers (e.g., encoded memory addresses) as previously described herein with respect to FIGS. 4A and 4B, for example. In FIG. 9, a stack pointer register (RSP) 906 contains the last address of Frame C 960 at the time T1 the exception 935 was thrown. In addition, RSP base 905 represents a base register that contains the base address of Frame C 960 at time T1 when the exception is thrown. During the unwinding process, RSP 906 may be updated to point to the end of other stack frames. Similarly, RSP base 905 may be updated to point to the base of other stack frames as the stack frames are unwound.

FIG. 9 also illustrates other encoded stack pointers (SPs) 902, 904, and 908, which may be generated at different times during the unwinding process. For example, an encoded stack pointer, SP_B 904, may be generated by a SIMRET instruction in a first unwinding to Frame B 950 at time T2. An encoded stack pointer, SP_A 902, may be generated by a SIMRET instruction in a second unwinding to Frame A 940 at time T3. An encoded stack pointer, SP_NEW 908, may be generated by a SIMCALL instruction after an exception handler is found and the unwinding has stopped at time T3. Encoded stack pointers 902 and 904 may be generated in an arbitrary register that is used as a register operand (REG) in SIMRET instructions. Similarly, encoded stack pointer 908 may be generated in the same (or different) arbitrary register, which is used as a register operand for the SIMCALL instruction. The encoded stack pointers 902, 904, and 908 are generated to update unwind contexts with stack pointer register values that preserve the cryptographic state during the unwinding process. The encoded stack pointers generated by the SIMRET and SIMCALL instruction, however, generate the encoded stack pointers in an arbitrary register instead of the RSP and are referred to herein as "simulated stack pointers".

It should be noted that the various stack pointers and return addresses in FIG. 9 may be configured in the same or similar manner as previously described herein, and the encryption/decryption and encoding/decoding may be performed in the same or similar manners as previously described herein. For example, the stack pointers (e.g., 902, 904, 905, 906, 908) in FIG. 9 may be configured in the same or similar manner as encoded pointers of FIG. 4A or 4B. The return addresses (e.g., 942, 952, 962, 984) in FIG. 9 may be configured in the same or similar manner as a modified return address 610 of FIG. 6A. Additionally, an instruction pointer holds the memory address of (e.g., points to) an instruction. When stored in a RIP, an instruction pointer points to the next instruction to be executed in the currently executing program and may have any suitable configuration (e.g., memory address, linear address, cryptographically encoded pointer, unencrypted encoded pointer, instruction pointer register 620 of FIG. 6B, etc.). When stored at the base address of a stack frame in one or more embodiments described herein, an instruction pointer can be embodied as a memory address (e.g., linear address, etc.), a return address, a modified return address, or any instruction address having any suitable encoding and/or encryption. It should be appreciated that the particular configuration of stack pointers, return addresses, and instruction pointers could be formed in a myriad of different ways, and these are simply examples of possible configurations to implement one or more embodiments described herein.

FIG. 9 also illustrates four possible states S1, S2, S3, and S4 of the unwind context during the example unwinding process 900. The register values associated with each state may be stored in an unwinder data structure 970 (e.g., cursor). The unwinder data structure 970 may be created during the unwinding process to maintain a simulated execution state resulting from each execution of a simulate return instruction and a simulate call instruction during the unwinding process. The unwinder data structure includes entries (e.g., RSP, RIP, REG1, REG2, etc.) in which actual register values (e.g., RSP value, RIP value, REG1 value, REG2 value, etc.) are initially stored by the unwinding process as shown at S1 in FIG. 9, and updated before each SIMRET instruction is executed. When SIMRET and SIMCALL instructions are executed, however, simulated stack pointer register values (e.g., SP_A, SP_B, SP_NEW) and simulated instruction pointer register values (e.g., RA', RA", etc.) are generated and stored in the RSP and RIP entries, respectively, as shown at S2, S3, and S4. The simulated execution states during an example unwinding process include initialization 972 (e.g., the start of the unwinding process) shown at S1, a first SIMRET instruction 974 shown at S2, a second SIMRET instruction 976 shown at S3, and a SIMCALL instruction 978 shown at S4. FIG. 9 will be referenced in the description of the high-level unwinding flow of FIG. 10.

Figure 10:
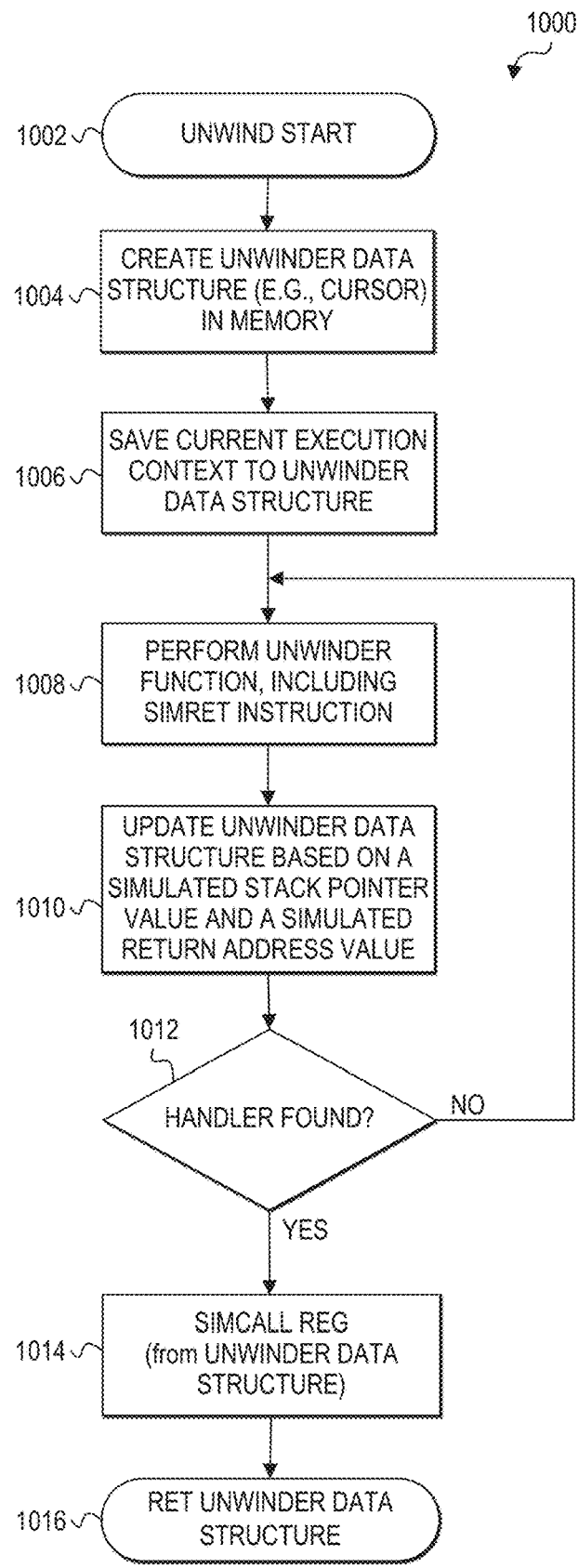
FIG. 10 is a high-level flow diagram of an unwinding process that may be associated with a simulated unwinding of an encrypted program call stack upon the occurrence an exception in a called function according to at least one embodiment.

FIG. 10 is a high-level flow diagram illustrating an unwinding flow 1000 for unwinding encrypted stack frames and cryptographically encoded stack pointers in response to the occurrence of an exception in a cryptographic computing system according to at least one embodiment. A set of operations corresponds to activities of FIG. 10. An unwinder library (e.g., 862), or portions thereof, may utilize at least a portion of the set of operations. At least some of the operations of flow 1000 perform a simulate return ("SIMRET") instruction to simulate a normal return from a callee function that is cryptographically protected based on one security context to a caller function (or main program) that is cryptographically protected based on another security context. At least one other operation of flow 1000 performs a simulated call ("SIMCALL") instruction to simulate a normal call from a caller function that is cryptographically protected to a callee function that is to be cryptographically protected. A computing device 100 may comprise means such as processor 102, for performing the operations. In an embodiment, one or more operations of flow 1000 may be performed by unwinder library (e.g., 862) linked to an executable file (e.g., 832).

The flow 1000 may be initiated in response to the occurrence of an exception (e.g., 935) in a called function (e.g., 930) of a program (e.g., 901). The number of iterations that may be performed within flow 1000 depend, at least in part, on the number of nested functions that have been called and the location of an exception handler (e.g., 914) that corresponds to the exception that has occurred. Although any number of functions may be nested within a program and an exception handler may be located in any of the nested functions, for ease of illustration, flow 1000 will be described based on the example scenario illustrated in FIG. 9.

Flow 1000 may begin at 1002, where an unwinding process starts in response to an exception (e.g., 935) being thrown in the currently active function (e.g., 930). At 1004, a data structure (e.g., 970) is created in memory to hold the unwind context, a portion of which is generated during the simulate return and simulate call instruction executions (e.g., in an arbitrary register operand). The portion of the unwind context that is updated using the SIMRET and/or SIMCALL instructions may also be referred to herein as the 'simulated state.'

At 1006, the current execution state is saved to the unwinder data structure (e.g., initialization 972). In one example, all registers at the time of the unwinding start are stored in the unwinder data structure. In particular, the contents of a stack pointer register (e.g., RSP 906) and an instruction pointer register (RIP) are saved to the unwinder data structure as an RSP entry and RIP entry, respectively. In this example, the contents of the RSP entry at initialization correspond to a stack pointer to the top of Frame C (e.g., 960) encoded with the RSP base (e.g., 905) of Frame C. The contents of the RIP entry at initialization correspond to the address of the next instruction (e.g., 932) in the active function (e.g., 930) that caused the exception or possibly the address of the instruction that caused the exception. The encrypted return address (e.g., 962) is stored at the base address (e.g., RSP base 905) for the current stack frame (e.g., 960). The base address may be encoded as security context in a frame pointer and in the RSP (e.g., 906). A separate register may hold the frame pointer that points to the beginning (or first entry) of the current stack frame. The return address points to the next instruction (e.g., 922) to be executed in the caller function (e.g., 920) when a return is executed from the active callee function (e.g., 930).

In some implementations, a simulate return (SIMRET) instruction may also be executed along with saving the current execution state at 1006. In other implementations, a SIMRET instruction is not executed when the initial execution state is saved. These alternative implementations may depend on the particular approach that is implemented to save the current execution state at 1006.

After initializing the unwinder data structure (e.g., 972) with the current actual execution state at 1006, a loop is entered at 1008-1012 to unwind the cryptographically protected stack frames using a simulated execution state until the correct exception handler is found. At 1008, an unwinder function can be invoked in which a simulate return (SIMRET) instruction is executed. Initially, the unwinder function may perform unwinding operations to effectively unwind the RSP to an encoded stack pointer that points to the end the caller stack frame (e.g., 950). After performing the unwinding operations, the unwinder function can update unwind context in the unwinder data structure. In particular, RSP entry in the unwind context can be updated with the value of the new encoded stack pointer in the RSP, which points to the end of the caller stack frame (e.g., Frame B 950). Because the unwinder function is unaware of the security context (e.g., base address) encoded in the RSP, unwinding the stack frame results in a stack pointer that includes a correct offset and an incorrect security context (e.g., base address). For example, the resulting stack pointer in the RSP includes an offset corresponding to the end of the caller stack frame (e.g., 950), but is encoded with the security context (e.g., RSP base 905 and optionally other metadata) of the callee stack frame (e.g., 960). It should be noted that, when the RSP entry is updated with the new RSP value, the unwinder function may also update other state registers (e.g., RIP, REG1, REG2, etc.).

Once the unwind context is updated, the unwinder function can use a SIMRET instruction to generate the correct security context (e.g., base address of caller stack frame 950) for the stack pointer value that is stored in the RSP entry of the unwinder data structure. The SIMRET instruction includes a register operand (REG) that is loaded with the contents of the RSP entry in the unwind context (not shown in FIG. 9). Alternatively, the SIMRET instruction operand could be embodied as an immediate value or a memory location. It should be noted that the encoded stack pointer in the REG operand may point to the end (top) of the caller stack frame (e.g., 950) and thus, may be offset by 8 bytes to the encrypted return address (e.g., 962) of the current callee stack frame (e.g., 960).

Generally, the SIMRET instruction uses the REG operand to generate a cryptographically encoded stack pointer (also referred to herein as a 'simulated stack pointer') for the prior stack frame (e.g., Frame B 950) associated with the caller function (e.g., Function B 920), while preserving the cryptographic state. To do this, initially the REG operand (e.g., with encoded security context that includes RSP base 905) is decrypted and possibly decoded as previously described herein with respect to FIGS. 1, 2B, and 4A-4B, for example. Decrypting the encoded stack pointer in the REG operand includes decrypting the security context, which produces a base address (e.g., RSP base 905) of the callee stack frame (e.g., 960). A linear address can be generated from the base address of the callee stack frame. The linear address is used to access the encrypted RA (e.g., 962) stored in the callee frame (e.g., 960). The encrypted RA points to the next instruction in the caller function (e.g., 920) to be executed upon a return from the callee function (e.g., 930). The encrypted RA is loaded and decrypted. The decryption of the encrypted RA (e.g., 962) may be based, at least in part, on a tweak derived, at least in part, from the encoded stack pointer in the REG operand. In some examples, at least a portion of the security context encoded in the stack pointer in the REG operand may be used as the tweak or as part of the tweak to decrypt the return address (e.g., 962). The security context may include, for example, the base address of the callee stack frame (e.g., 960) and possibly other metadata associated with the stack frame as shown and described with reference to FIGS. 4A-4B. In some scenarios, a key may also be used in the decryption (and encryption).

Metadata obtained from the decrypted return address (e.g., distance metadata 612 representing the distance to the beginning of a caller frame as shown in FIG. 6) may be used to modify the contents of the REG operand to contain a simulated stack pointer (e.g., SP_B 904) that is encoded with the correct security context and that references the top of the prior/caller stack frame (e.g., Frame B 950). For example, a calculation can be performed to determine the base address of the caller stack frame. The calculation can include adjusting the base address of the callee stack frame based on the distance metadata. The resulting base address of the caller stack frame can be encoded in the stack pointer in the REG to produce the simulated stack pointer (e.g., SP_B 904) containing the correct security context for the caller frame (e.g., 950). In one or more embodiments, the simulated stack pointer (e.g., SP_B 904) is generated in REG without modifying the RSP.

At 1010, the unwind context in the unwinder data structure is updated with a simulated stack pointer value and possibly a simulated return address value. For example, the unwinder function (or another function) can use the simulated stack pointer generated by the SIMRET instruction in the REG operand to update the RSP entry in the unwinder data structure. The updated RSP entry then contains a new simulated RSP value (e.g., SP_B 904) pointing to the end (or top) of the prior frame (e.g., 950). The RIP entry in the unwinder data structure may also be updated with a simulated RIP value, which may be the decrypted and decoded return address (e.g., linear address RA') corresponding to the address containing the next instruction (e.g., 922) to be executed in the caller function (e.g., Function B 920). Before updating the RIP entry in the unwinder data structure, the unwinder function can generate the simulated RIP value by decoding the decrypted RA, generated by the SIMRET instruction, to obtain the decoded return address pointing to the next instruction (e.g., 922) to be executed in the caller function (e.g., 920) that called the current active function (e.g., 930). The decoded return address (e.g., RA') may be for example, a linear address. To decode the decrypted RA, the unwinder function may replace the metadata with zeros, or another appropriate value. In other embodiments, updating the RIP in the unwind context may be done via software. Updating unwind context in the unwinder data structure with new simulated register values as shown at (6) effectively unwinds the unwind context shown at (3) from the callee function and stack frame (e.g., 930 and 960) to a prior/caller function and stack frame (e.g., 920 and 950), while preserving the cryptographic state.

At 1012, the decrypted and decoded return address (e.g., linear address RA'), now stored in the unwinder data structure as shown at (6), can be used to determine whether the current function (e.g., Function B 920) contains a correct execution handler for the thrown exception (e.g., 935). In some implementations, a table may be provided with metadata that indicates which exception handlers are present in a function. The interface routine may use the decrypted and decoded return address (e.g., linear address RA') to walk the table to search for an appropriate exception handler in the current function (e.g., Function B 920) for the particular exception that was thrown.

If the exception handler is not present in the current function (e.g., Function B 920), then flow passes back to 1008 to invoke the unwinder function again. After performing appropriate unwinding operations, the unwinder function may update the unwind context in the unwinder data structure. In particular, the RSP entry in the unwind context can be updated with the value of the new encoded stack pointer in the RSP, which points to the end (or top) of the next caller stack frame (e.g., Frame A 940). As previously described, the new encoded stack pointer resulting from the unwinding operations of 1008, includes an offset corresponding to the end (e.g., last stored variable) of the caller stack frame (e.g., 940), but is encoded with the security context (e.g., base address and optionally other metadata) of the callee stack frame (e.g., 950). The unwinder function may also update other state registers (e.g., RIP, REG1, REG2, etc.).

Once the unwind context is updated, the unwinder function can use a SIMRET instruction again, to generate the correct security context (e.g., base address of caller stack frame 940) for the updated stack pointer value that is stored in the RSP entry of the unwinder data structure. Before the SIMRET instruction is executed, the REG operand is loaded with the updated stack pointer value in the RSP entry in the unwind context (not shown in FIG. 9). It should be noted that the encoded stack pointer in the REG operand may point to the end (top) of the caller stack frame (e.g., 940) and thus, may be offset by 8 bytes to the encrypted return address (e.g., 952) of the current callee stack frame (e.g., 950).

The SIMRET instruction uses the REG operand to generate a cryptographically encoded stack pointer to the prior stack frame (e.g., Frame A 940) associated with the caller function (e.g., Function A 910) that called the current function (e.g., Function B 920), while preserving the cryptographic state. To do this, initially the REG operand (e.g., with the encoded security context that includes the base address of stack frame B 950) is decrypted and decoded, as previously described herein with respect to FIGS. 1, 2B and 4A-4B, for example. Decrypting the stack pointer in the REG operand includes decrypting the security context, which produces a base address of the callee stack frame (e.g., 950). A linear address can be generated from the base address of the callee stack frame. The linear address is used to access the encrypted RA (e.g., 952) stored in the current frame (e.g., 950). The encrypted RA points to the next instruction in the caller function (e.g., 910) to be executed upon a return from the callee function (e.g., 920). The encrypted RA is loaded and decrypted. The decryption of the encrypted RA (e.g., 952) may be based, at least in part, on a tweak derived, at least in part, from the REG operand. In some scenarios, a key may also be used in the decryption (and encryption). As previously described, at least a portion of the security context encoded in the stack pointer in the REG operand may be used as the tweak or as part of the tweak to decrypt the return address (e.g., 952). The security context may include, for example, the base address of the callee stack frame (e.g., 950) and possibly other metadata associated with the stack frame as shown and described with reference to FIGS. 4A-4B. Metadata obtained from the decrypted return address (e.g., distance metadata 612 representing the distance to the top of a caller frame as shown in FIG. 6). As previously described herein, metadata may be used to modify the contents of the REG operand to contain a simulated stack pointer (e.g., SP_A 902) that is encoded with the correct security context and that references the top of the prior stack frame (e.g., Frame A 940). In one or more embodiments, the simulated stack pointer (e.g., SP_A 902) is generated in REG without modifying the RSP.

At 1010, the unwind context in the unwinder data structure is updated with a simulated stack pointer value and possibly a simulated return address value. For example, the unwinder function (or another function) can use the simulated stack pointer generated by the SIMRET instruction to update the RSP entry in the unwinder data structure. The updated RSP entry then contains a new simulated RSP value (e.g., SP_A 902) pointing to the end of the prior frame (e.g., 940). The RIP entry in the unwinder data structure may also be updated with a simulated RIP value, which may be the decrypted and decoded return address (e.g., linear address RA") corresponding to the address containing the next instruction (e.g., 912) to be executed in the prior function (e.g., Function A 910). Before updating the RIP entry in the unwinder data structure, the unwinder function can generate the simulated RIP value by decoding the decrypted RA, generated by the SIMRET instruction, to obtain the decoded return address pointing to the next instruction (e.g., 912) to be executed in the caller function (e.g., 910) that called the current callee function (e.g., 920). The decoded return address (e.g., RA") may be for example, a linear address. As previously described, to decode the decrypted RA, the unwinder function may replace the metadata with zeros, or another appropriate value. In other embodiments, updating the RIP in the unwind context may be done via software. Updating unwind context in the unwinder data structure with new simulated register values as shown at (9) effectively unwinds the unwind context shown at (6) from the callee function and stack frame (e.g., 920 and 950) to a prior/caller function and stack frame (e.g., 910 and 940).

At 1012, the decrypted and decoded return address (e.g., linear address RA"), now stored in the unwinder data structure as shown at (9), can be used to determine whether the current function (e.g., Function A 910) contains a correct execution handler for the thrown exception (e.g., 935). The interface routine may use the decrypted and decoded return address (e.g., linear address RA") to walk the table to search for an appropriate exception handler in the current function (e.g., Function A 910) for the particular exception that was thrown.

If an appropriate handler is not found, then flow passes back to 1008 to invoke the unwinder function again, as previously described. If an appropriate handler (e.g., 914) is found at 1012, however, then no further operations to unwind the current function and associated stack frame to a prior function and stack frame are performed. Instead, the unwinder function uses a SIMCALL instruction and other appropriate operations to preserve the cryptographic state of the stack while enabling the identified exception handler (e.g., 914) to be invoked.

When the exception handler is found, the current simulated stack pointer (e.g., SP_A 902) generated by the last SIMRET instruction has been stored in the unwinder data structure (e.g., 976) and may still be contained in the REG operand used by SIMRET instructions. The current simulated stack pointer points to the end of the stack frame (e.g., SP_A 902 pointing to the end of Frame A 940) corresponding to the function where the exception handler (e.g., 914) was found and is encoded with the correct security context for that stack frame. Before the SIMCALL instruction is executed, the current simulated stack pointer (e.g., SP_A 902) is manipulated to point to a different location than the end of the current stack frame (e.g., 940). For example, the simulated stack pointer may be incremented (or decremented depending on the direction the stack grows) by 8 bytes (e.g., (SP_A+8) 909), or other suitable number of bytes, to point to a new base address of a temporary, new stack frame (e.g., 980). In some examples, the new base address may point to the only slot that will be used in the temporary new stack frame.

The modified simulated stack pointer (e.g., SP_A+8) can be used to encrypt and store an instruction pointer to the exception handler (or to a landing pad of the exception handler) at the new base address. This modified simulated stack pointer is still encoded with the security context (e.g., base address, optionally metadata) of the prior stack frame (e.g., 940) corresponding to the function in which the exception handler was found. In one example, the instruction used to store the exception handler instruction pointer (EHIP) may be a cryptographic computing instruction that uses the modified simulated stack pointer (e.g., SP_A+8) as a destination operand. Accordingly, the modified simulated stack pointer may be decrypted and decoded to get the linear address of the new base in the stack memory. The EHIP may be encrypted before being stored based, at least in part, on a tweak derived, at least in part, from the modified simulated stack pointer. In one example, the tweak may include at least a portion of the security context associated with the prior stack frame (e.g., 940) and included in the modified simulated stack pointer (e.g., SP_A+8). A key may also be used in the encryption (and decryption) of the EHIP. In some scenarios, the new base address may correspond to the base address of the last stack frame (e.g., stack frame B 950) that was unwound by the unwinder function. Thus, the encrypted EHIP (e.g., 982) potentially may overwrite existing data (e.g., encrypted RA 952) at the base address of the last stack frame to be unwound.

At 1014, a simulated call (SIMCALL) instruction is executed. The SIMCALL instruction includes a register operand (REG) that is loaded with the modified simulated stack pointer (e.g., SP_A+8), which points to the encrypted EHIP (e.g., EHIP 982) at the new base address in stack. Alternatively, the SIMCALL instruction operand could be embodied as an immediate value or a memory location where the encrypted EHIP is stored. In this example, the SIMCALL instruction is executed to recode the modified simulated stack pointer (e.g., SP_A+8) in the unwinder data structure against an on-stack return address (e.g., EHIP 982). The SIMCALL instruction is used to update the unwind context in the unwinder data structure to match expected values that an actual return instruction would observe if an actual return instruction transferred the execution into the execution handler. The SIMCALL instruction also encodes the execution handler instruction pointer (e.g., EHIP 982) as a return address and encrypts the encoded return address based on the recoded stack pointer (e.g., SP_NEW 908).

When SIMCALL is executed, the modified caller stack pointer (e.g., SP_A+8) in REG is decrypted and decoded to obtain a linear address to the memory location in stack where the encrypted EHIP (e.g., 982) is stored. Next, the linear address is used to access and load the encrypted EHIP stored at the linear address. The encrypted EHIP can be decrypted based, at least in part, on a tweak derived, at least in part, from the modified simulated stack pointer stored in the REG. In some scenarios, a key may also be used in the decryption (and encryption).

Next, the new base address of the new stack frame can be determined. The new base address of the new stack frame is indicated by the offset in the modified simulated stack pointer (e.g., SP_A+8). The new base address can be used to recode the modified simulated stack pointer into a new simulated stack pointer (e.g., SP_NEW 908) with the correct security context for the new stack frame. The new simulated stack pointer is generated by updating the encoded base address in the modified simulated stack pointer (e.g., SP_A+8) to the new base address indicated by the offset in the modified simulated stack pointer. Thus, the new simulated stack pointer points to the beginning of the new, temporary frame (e.g., 980), and is encoded with the correct security context (e.g., the base address of new stack frame 980 and optionally metadata). The new simulated stack pointer (e.g., 908) encoded with the new base address and optionally other metadata can be encrypted. For example, the new base address (and other metadata, if any) encoded in the new stimulated stack pointer may be encrypted as the security context.

Distance metadata indicating the distance between the new base address and the base address of the prior stack frame corresponding to the function where the exception handler was located can be determined and used to encode the EHIP as a valid return address. First, a distance can be calculated between the base address of the prior stack frame (e.g., stack frame A 940) and the new base address of the new stack frame (e.g., 980). The base address of the prior stack frame corresponds to the base address encoded as security context in the modified simulated stack pointer. The new base address of the new stack frame is indicated by the offset in the modified simulated stack pointer (e.g., SP_A+8). To generate a valid return address to the exception handler (e.g., 914), or to a landing pad of the exception handler, distance metadata representing the calculated distance can be encoded in the decrypted EHIP to form a valid exception handler return address (EHRA). The EHRA can then be encrypted based, at least in part, on a tweak derived, at least in part, from the new simulated stack pointer (e.g., SP_NEW 908) to produce an encrypted EHRA. The encrypted EHRA can then be stored at the linear address previously determined from the new stack pointer (SP_NEW 908).

The unwind context in the unwinder data structure can be updated after the SIMCALL instruction has completed. For example, the RSP entry of the unwinder data structure can be updated with the new simulated pointer value (e.g., 908). The RIP entry of the unwinder data structure can be updated with the encrypted EHRA (e.g., 984).

At 1016, the contents of the RSP register may be replaced with the new stack pointer (e.g., SP_NEW 908) from the unwinder data structure (e.g., 978) after which a regular return (RET) instruction may be performed to cause the process to jump to the exception handler.

Figure 11:
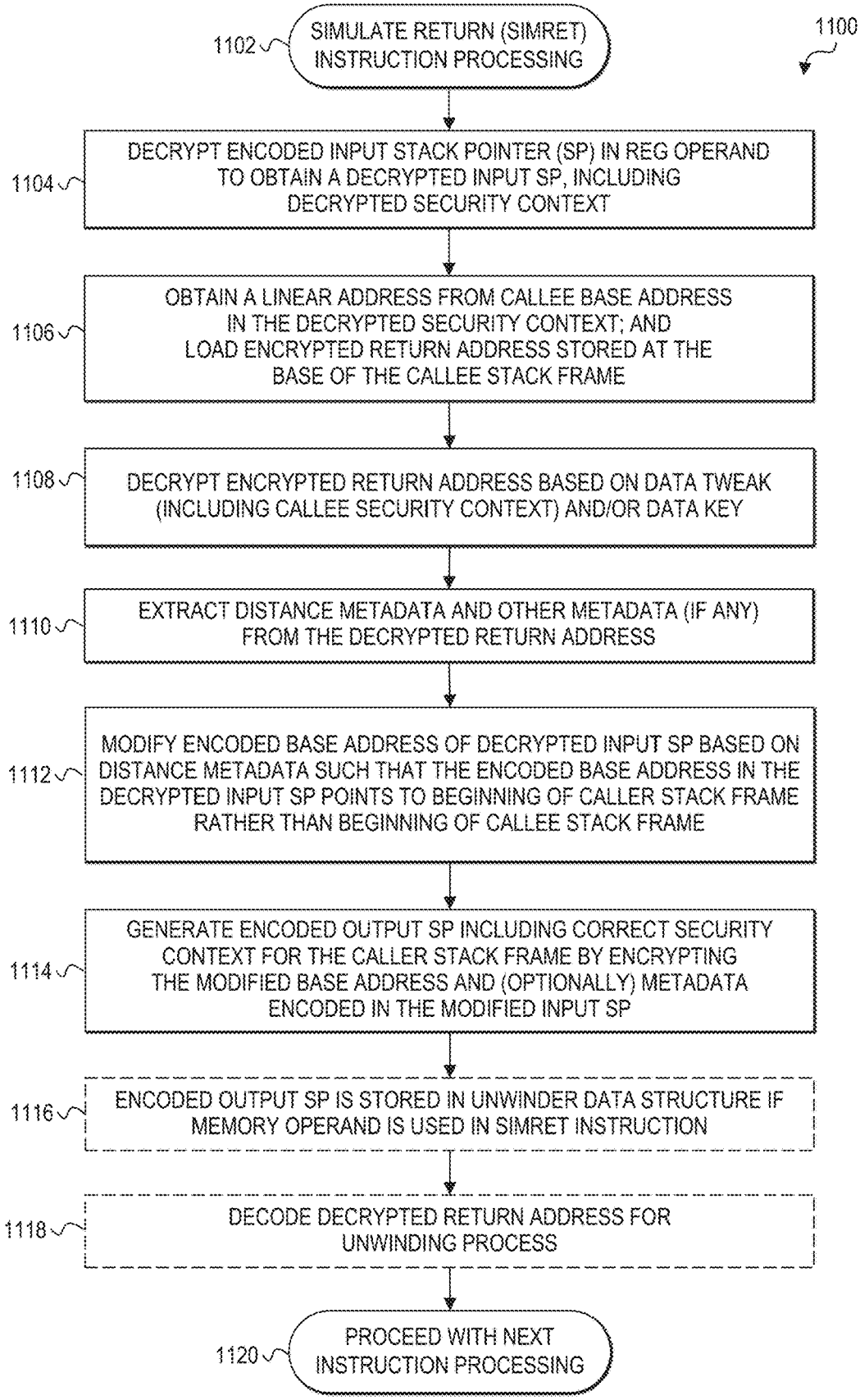
FIG. 11 is a flow diagram of example processing of a simulate return (SIMRET) instruction according to at least one embodiment.

FIG. 11 is a flow diagram of example processing of a simulate return (SIMRET) instruction. For example, a processor core as shown in FIG. 24B, a core of processor 102 in FIG. 1, a pipeline as detailed below, etc., performs this method. When a simulate return (SIMRET) instruction is to be executed by a processor, simulate return instruction processing begins at 1102. The simulate return instruction can include an operand (e.g., REG) that contains an encoded input stack pointer (SP) for a caller stack frame associated with a caller function. In one example, the encoded input SP may have the same or similar configuration as encoded pointer 404 of FIG. 4A or encoded pointer 460 of FIG. 4B.

In some examples, SIMRET is executed in an unwinding process, which is initiated when an exception occurs in a function of a program. The encoded input SP is loaded into REG from an unwinder data structure (e.g., 878, 970) before the SIMRET instruction is invoked. The encoded input SP may represent the actual current state of the stack pointer register (RSP) in an unwinding process. Because the unwinding process is unaware of security context encoded in an RSP, unwinding a callee stack frame to a caller stack frame produces a stack pointer that includes a correct offset for the caller stack frame and an incorrect security context for the caller stack frame. For example, the security context incorrectly includes the base address of the callee stack frame. Additionally, the callee security context may be encrypted in a ciphertext portion (e.g., 425, 465 of FIGS. 4A and 4B) of the input SP.

At 1104, the encoded input stack pointer in REG is decrypted to obtain a decrypted input SP. In an example, an address key and/or an address tweak at least partially derived from the encoded input SP (e.g., plaintext bits) may be used in a cryptographic algorithm such as a tweakable block cipher to decrypt the ciphertext portion of the encoded input SP. Decrypting the ciphertext portion can produce a base address of the callee stack frame and possibly other metadata associated with the callee stack frame. It should be appreciated, however, that the particular address key, address tweak, and type of cryptographic algorithm for encrypting/decrypting a fixed portion of a stack pointer may vary depending on particular needs and implementations, including the particular configuration of the pointer such as which metadata is encoded in the pointer, the location of the metadata encoded in the pointer, and which portion of the pointer is encrypted.

At 1106, the callee base address produced by decrypting the ciphertext portion of the input SP can be used to obtain a linear address of the base of the callee stack frame. Once the linear address is generated, the linear address can be used to load an encrypted return address stored at the base of the callee stack frame.

The encryption/decryption of the return address (and other data) in the callee stack frame may be bound to the callee security context associated callee stack frame. The callee security context may include the base address of the callee stack frame and optionally, one or more metadata items (e.g., version, VC, PAC, etc.) encoded in the input stack pointer and specific to the callee stack frame.

At 1108, the encrypted return address may be decrypted based, at least in part, on a data tweak derived, at least in part, from the encoded input SP. In one example, decryption may be performed to decrypt the encrypted return address as previously described herein with respect to FIG. 2B. In one example, a data tweak derived from the encoded input SP may include some or all of the encoded security context associated with the callee stack frame. The data tweak may include, for example, some or all of a ciphertext portion (e.g., 425, 465) of the encoded input SP, some or all of a decrypted base address (e.g., 416, 456) produced by decrypting the ciphertext portion of the encoded input SP, some or all of decrypted metadata items (e.g., 412, 414, 452) produced by decrypting the ciphertext portion of the encoded input SP, some or all of unencrypted metadata items (e.g., 411, 451, 454) encoded in the input SP, any other metadata not contained in the encoded input SP, or any suitable combination thereof. In at least some examples, the decryption may also be based on a data key (e.g., specific to the function, the program, the data, etc.). It should be appreciated that the particular data key, data tweak, and type of cryptographic algorithm for encrypting/decrypting data (e.g., return address, local variables, arguments, etc.) stored in a stack frame may vary depending on particular needs and implementations, including the particular configuration of the stack pointer.

The decrypted return address may have any suitable configuration including, for example, the configuration of a modified return address 610 as shown in FIG. 6A. In this configuration, the return address is encoded with distance metadata (e.g., 612) indicating the distance from the location of the encrypted return address in the stack (e.g., at the base address of current callee stack frame) to the beginning (or bottom) of the caller stack frame (e.g., base address of prior stack frame in the stack). In some examples, other metadata to be encoded in the stack pointer for the prior caller stack frame may also be encoded in the decrypted return address.

At 1110, distance metadata is extracted from the decrypted return address. Other metadata that is encoded in the return address, if any, may also be extracted. For example, version information (e.g., 616) may be extracted from the decrypted return address.

At 1112, the distance metadata and optionally, other metadata extracted from the decrypted return address are used to update the callee security context in the decrypted input SP with a caller security context associated with the caller stack frame. The distance metadata extracted from the decrypted return address is used to modify the base address in the decrypted input SP. In one example, the base address of the decrypted input SP in the REG may be updated by adding or subtracting the distance value represented by the distance metadata (e.g., depending on the direction the stack grows) to compute the base address at the beginning of the caller stack frame. This update changes the base address encoded in the decrypted input SP in the REG register so that instead of pointing to the beginning (or base) of the callee stack frame, the modified encoded base address in the decrypted input SP in the REG register points to the beginning (or base) of the immediately prior caller stack frame. In addition, any metadata (e.g., version information 616) extracted from the decrypted return address may be used to update the corresponding metadata field in the decrypted input SP in the REG register.

At 1114, an encoded output stack pointer (SP) that points to the top (or end) of the immediately prior caller stack frame is generated in the REG register by encrypting the caller security context in the decrypted input SP in the REG register. For example, the modified base address (e.g., pointing to the beginning of the prior caller stack frame) and encoded metadata items if any (e.g., updated version information, other updated metadata or unchanged metadata that is typically encrypted in the ciphertext portion) can be encrypted using an address key and/or an address tweak as previously described with reference decrypting the encoded input SP at 1104.

In some embodiments, a SIMRET instruction with a register operand (REG) may finish at 1114. In this case, the unwinder process can store the encoded output SP in the unwinder data structure. In another embodiment, the SIMRET instruction may include a value or a memory address as an operand. If the operand in the SIMRET instruction is a memory address of the RSP entry in the unwinder data structure, for example, then the unwind context can be directly updated during the SIMRET instruction execution. For example, the encoded output SP to the prior caller stack frame, which is generated at 1114, can be stored in the memory operand, which in some cases could be the RSP entry in the unwinder data structure.

The encoded output SP to the prior caller stack frame, which is generated at 1114, is stored in the REG operand. In some embodiments the REG operand is a register. In these embodiments, once the SIMRET instruction is finished, the unwind process may update an RSP entry in an unwinder data structure using the encoded output SP stored in the REG register. In other embodiments, as indicated at 1116, the REG operand may be a memory operand and directly update the RSP entry in the unwinder data structure in memory.

In some embodiments of the SIMRET instruction, the decrypted return address generated at 1108 may be decoded by the unwinder process to obtain a decoded address that references the next instruction to be executed in the caller function. In an alternative embodiment of the SIMRET instruction, as indicated at 1118, the decrypted return address may be decoded during the execution of the SIMRET instruction to obtain a decoded address that references the next instruction to be executed in the caller function. In one example, the decoding may be performed by simply zeroing out the upper bits in the decrypted return address that store metadata (e.g., distance metadata, high-water mark, version of modified return address 610). In other implementations where part of the return address needs to be restored, any suitable mechanism to restore address bits in the decrypted return address may be used to generate the decoded return address. Once generated, the decoded return address can be used by the unwinding process, which invokes an exception handling search routine to search for an appropriate exception handler. The decoded return address may also be part of the unwind context to be stored in the unwinder data structure. In one example, the unwinding process stores the decoded return address in the unwinder data structure.

At 1120, the processor proceeds with processing a next instruction.

Figure 12:
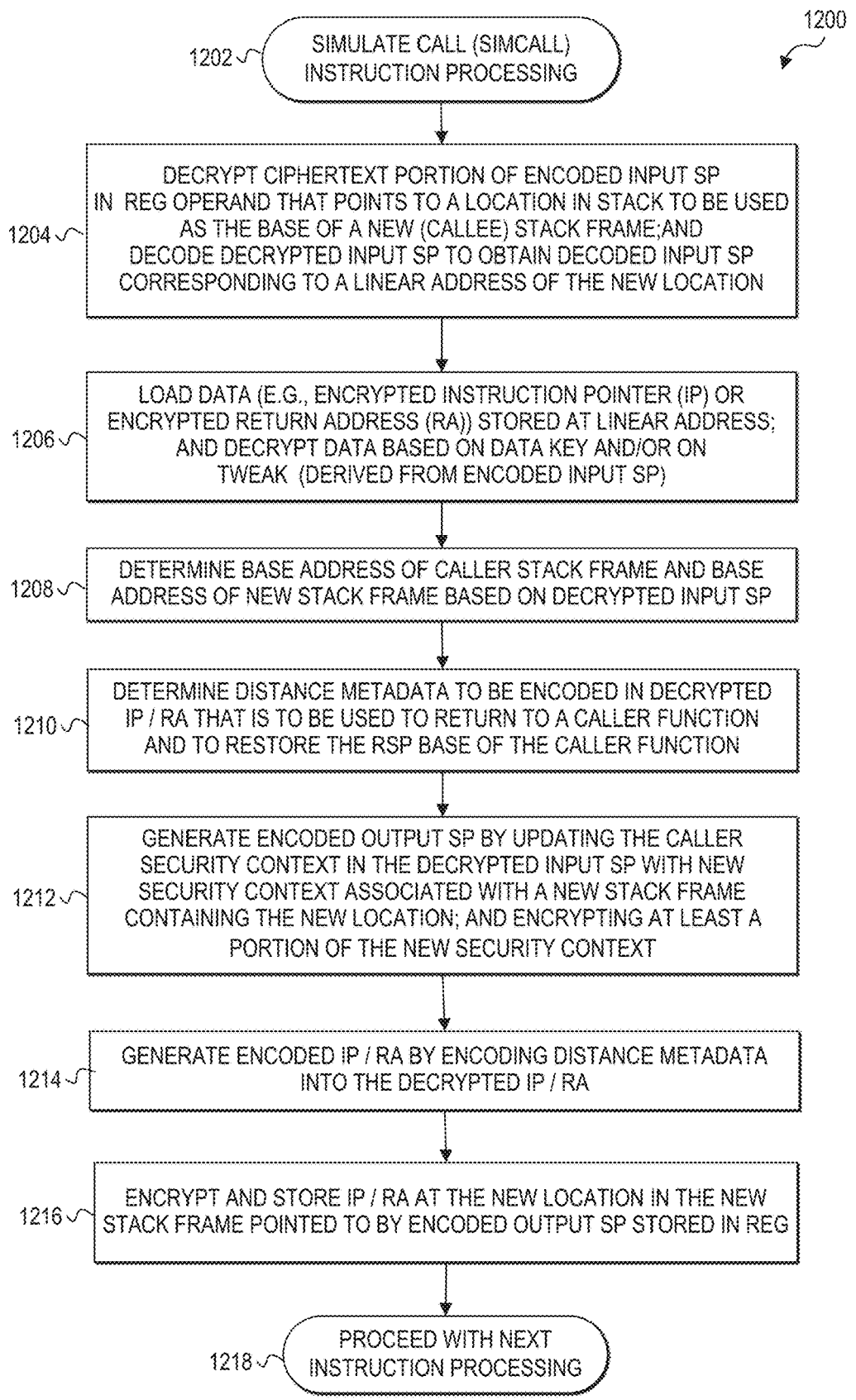
FIG. 12 is a flow diagram of example processing of a simulate call (SIMCALL) instruction according to at least one embodiment.

FIG. 12 illustrates an example of a method 1200 performed by a processor to process a simulate call (SIMCALL) instruction. For example, a processor core as shown in FIG. 24B, a pipeline as detailed below, a core of processor 102 in FIG. 1, etc., performs this method. When a simulate call (SIMCALL) instruction is to be executed by a processor, simulate call instruction processing begins at 1202.

The simulate call instruction can include an operand (e.g., REG) that contains an encoded input stack pointer (SP) that points to a location in stack memory. The location pointed to by the encoded input SP may be used as the base of a new (callee) stack frame that contains an encrypted return address or instruction pointer to an instruction in a prior (caller) function or main program. The input SP includes an offset that is used to determine a base address of the referenced location and is encoded with a security context of a caller stack frame. The security context may include a base address of the caller stack frame and possibly other metadata. In one example, the encoded input SP may have the same or similar configuration as encoded pointer 404 of FIG. 4A or encoded pointer 460 of FIG. 4B.

In one or more examples, an input SP may be generated prior to executing a SIMCALL instruction. In one or more examples, an encoded stack pointer to a caller stack frame may be manipulated using pointer arithmetic to point to the new base of the new stack frame. The resulting stack pointer that is used as the input SP is also referred to herein as a 'modified caller stack pointer'. The particular number of bytes to increment (or decrement, depending on the direction the stack grows) the offset of the encoded caller stack pointer may vary depending on the code that invokes the SIMCALL instruction. The number of bytes may be a predefined number (e.g., 8 bytes, 16 bytes, etc.) or may be based on some criteria (e.g., number of bytes equal to the size of arguments to be passed by the caller stack frame, etc.). In some scenarios, (e.g., an unwinding process), the encoded caller stack pointer may be a simulated stack pointer that is generated by a SIMRET instruction and manipulated to point to a new base of a temporary new stack frame in the next available slot in the stack. In other examples where the SIMCALL instruction is used to facilitate argument passing, the number of bytes may vary based on the size of the arguments being passed, as will be further described herein (e.g., FIGS. 14A-16C).

In some examples, the SIMCALL instruction may be executed in an unwinding process that is initiated in response to an exception occurring in the most recently called function of an executing program. The SIMCALL instruction may be executed after one or more stack frames have been unwound based on updating a simulated execution state (e.g., using one or more SIMRET instructions) and after an appropriate exception handler has been found in a prior caller function (or main program) corresponding to the current simulated execution state. Once an appropriate exception handler is found, the unwinding process stops performing operations to unwind the stack frame and instead, stores an instruction pointer or address for the exception handler in an RIP entry of an unwinder data structure. An exception handler (EH) instruction pointer may point to, for example, a landing pad associated with the exception handler or the exception handler itself.

The unwinding process may obtain the EH instruction pointer from the unwinder data structure and store the EH instruction pointer from the unwinder data structure in the stack memory at the new location referenced by a modified caller stack pointer (modified caller SP). The modified caller SP for the new location may be computed, in one example, by adding a selected number of bytes (e.g., 8 bytes or another number of bytes) to the encoded output stack pointer generated by the last execution of a SIMRET instruction (e.g., at 1114). The encoded output stack pointer is the stack pointer of the current unwind context, and may be stored in the unwinder data structure and the REG register. Since the encoded output stack pointer was generated during the last SIMRET instruction before the exception handler was found, the encoded output stack pointer points to the end (or top) of a caller stack frame associated with the function containing the identified exception handler. The encoded output stack pointer is also stored in the RSP entry of the unwinder data structure.

In other examples as will be further described herein (e.g., FIGS. 14A-16C), the SIMCALL instruction may be executed before a regular (or modified) CALL instruction. Such uses can protect caller stack frame data, other than stack-based arguments, from access by a callee function. Accordingly, although FIG. 12 will be described with reference to the use of SIMCALL in an unwinding process, it should be noted that the flow described in FIG. 12 is also applicable to other uses of SIMCALL including, but not necessarily limited to, the use of SIMCALL prior to invoking a function (e.g., via a CALL instruction).

At 1204, a ciphertext portion of the encoded input SP in REG is decrypted to obtain a decrypted input stack pointer (SP). The decrypted input SP is decoded to obtain a decoded input stack pointer, which corresponds to a linear address. In some examples, the encoded input SP in REG is the modified caller SP that is generated by an unwinding process to reference a new location in the stack memory where an encrypted instruction pointer associated with an exception handler in the caller function is stored prior to the SIMCALL instruction execution. In other examples, the encoded input SP is generated based on the size of arguments being passed to reference a new location in the stack memory where an encrypted return address (RA) for the next instruction to be executed in the caller function is stored. The decrypting and decoding of the input SP in REG to obtain a linear address may be performed as previously described herein (e.g., FIGS. 1, 2A, 2B, 4A, 4B), and may vary depending on the particular configuration of the pointer including which metadata is encoded in the pointer, which portion of the pointer is encrypted, and the particular tweaks and/or keys that are used for decrypting the encrypted portion (or ciphertext portion) of the pointer.

At 1206, data stored at the linear address obtained in 1204 is loaded from stack memory. In some examples, such as when SIMCALL is invoked in an unwinding process (e.g., at 1014), the loaded data is an encrypted instruction pointer (or address) that is associated with an exception handler of a caller function that has been unwound. For example, the loaded data may include an encrypted EH address or an encrypted landing pad for the EH. In other examples, such as invoking SIMCALL in techniques used to pass arguments as will be further described herein, the data is expected to be an encrypted instruction pointer embodied as an encrypted return address (without encoding) that points to the next instruction in a caller function to be executed when control is returned to the caller function after a callee function is called and subsequently executes a return to the caller function. The loaded data may be decrypted based on a data key (e.g., specific to the function, the program, the data, etc.) and/or a tweak derived from the encoded input SP. The tweak may be derived as previously described herein including, for example, the tweak being derived from the encoded input SP and containing at least a portion of the security context of the encoded input SP.

At 1208, a base address of the caller stack frame and a base address of the new stack frame can be determined based on the decrypted input SP. For example, the caller security context included in the decrypted input SP can include the base address of the associated caller stack frame (e.g., 416, 456). The base address of the new stack frame can be determined based on an offset (e.g., 418, 458) included in the input SP.

At 1210, distance metadata that is to be stored in the decrypted instruction pointer (or decrypted return address) is determined. Storing the distance metadata in an instruction pointer effectively changes the instruction pointer format to the format of a return address. The instruction pointer (or return address) with the encoded distance metadata can be used to return control to the caller function and to restore the stack pointer register (RSP) base of the caller stack frame when a return instruction is executed based on the new location where the encrypted instruction pointer (or encrypted return address) is stored. In this example, a distance may be calculated as the difference between the base address of the new stack frame (e.g., location of the encrypted IP or RA) and the base address of the caller stack frame as determined at 1208. The distance metadata can be any suitable value (e.g., in bits, bytes, etc.) that represents the calculated distance.

At 1212, an output stack pointer (SP) encoded with the correct security context is generated to reference the new location (or base) of the new stack frame where the encrypted instruction pointer (or return address) with correct distance metadata encoding will be stored. Since the base address in the security context of the decrypted input SP is the base address belonging to the caller stack frame, the security context needs to be updated with new security context associated with the new stack frame. For example, the offset of the input SP can become the base address in the security context of the output SP (e.g., output SP base=input SP base+input SP offset). Thus, the output SP is encoded with security context containing the base address of the new stack frame. This can be achieved in one example by updating the base address of a decrypted input SP with the base address plus offset of the decrypted input SP. Other metadata specific to the new stack frame may also be encoded. Next, at least a portion of the new security context (e.g., base address and other metadata) in the decorated (or unencrypted) output SP can be encrypted to generate the encoded output SP. The encoding and encrypting may be performed as previously described herein (e.g., FIGS. 1, 2A, 4A, 4B, 9, 10), and may vary depending on the particular type of encoding used in the stack pointer. Thus, the encoded output SP points to the same new location, but is encoded with new security context (e.g., base address for new stack frame and possibly metadata specific to the new stack frame) associated with the new stack frame. The actual RSP can remain unchanged.

At 1214, an encoded instruction pointer (or a valid return address) is generated from the decrypted instruction pointer (or decrypted return address) previously loaded at 1206. The decrypted instruction pointer (or decrypted return address) is encoded with the distance metadata.

At 1216, the instruction pointer (or encrypted return address) with the proper encoded distance metadata, is encrypted and stored in the new location of the new stack frame based on the newly-generated encoded output SP, which may be stored in the REG register. The encoded instruction pointer (or encoded return address) may be encrypted based on a data key and/or on a tweak derived, at least in part, from the encoded output SP, as previously described herein. In particular, at least a portion of the security context (encrypted or decrypted) of the encoded output SP may be used as part or all of the tweak.

At 1218, the processor proceeds with processing a next instruction.

Tight Bounding of On-Stack Arguments

In some scenarios, a stack pointer of a first stack frame may have access to a second stack frame when the stack pointer cannot be bound at time-of-call. For example, function arguments that are passed via a caller's stack may prevent the binding of a stack pointer at the time-of-call. Consequently, the unbound stack pointer may not be cryptographically isolated from other frames in the stack.

Common calling convention uses the caller's stack frame to pass arguments to the callee. This is often used when passing large objects. Such arguments are accessed using the caller's stack or frame pointer tied to the callee's security context. When a callee attempts to access data in a prior stack frame, the hardware assumes that, if the requested data is stored in the prior frame, then the caller is attempting to pass the arguments to the callee through the call. Because the hardware does not know which entries in the caller's stack frame are arguments that the caller intends to pass (or make available) to the callee, the hardware allows the callee to have access to the caller's entire frame. This access could lead to corruption and/or data leakage of the local variables of the caller.

Furthermore, an application binary interface (ABI)/calling convention only mandates where the arguments are in relation to the callee frame record. The arguments are not required to be written using specific instructions (e.g., PUSH) or immediately before the call. Consequently, detection of stack-based arguments is not feasible by only inspecting the instruction stream.

To accommodate stack-based argument passing, some existing solutions allow plaintext access to a parent frame of a stack pointer. This can be realized by retrieving the frame base address from the decorated/decrypted pointer (e.g., 402, 406) and then loading the return address from the stack, which in turn allows the hardware to calculate the caller's frame size and to verify the bounds.

Various embodiments for tight bounding of on-stack arguments are disclosed herein to address the above issues (and more). Some embodiments disclosed below may be implemented with minor hardware extensions or minimal instrumentation that avoids plaintext access to the caller but allows stack-based argument passing. Specifically, some embodiments described below also enable the use of the SIMRET and SIMCALL instructions, or variations thereof, to realize stack-based function argument passing without allowing full access to the caller stack. Thus, in embodiments described below, stack-frame protection granularity can be further restricted by limiting access to the caller stack even while allowing stack-based argument passing Turning to FIG. 13, FIG. 13 illustrates an example stack 1300 in which stack frame access is limited by a trampoline call according to at least one embodiment. Generally, embodiments allow access to a caller stack frame (e.g., 1320) to be limited by adding an intermediate trampoline branching instruction to the caller code (e.g., a function, a main program) for each regular CALL instruction such that arguments from the caller code are passed through a pseudo frame (e.g., 1330) created by the CALL instruction. For example, before writing arguments of a branching instruction onto the stack, a pseudo stack frame (e.g., 1330) is entered in the stack via an added intermediate trampoline branching instruction. Because the trampoline branching instruction is specific to the caller function, the correct RSP offsets are known and the original caller's stack frame (e.g., 1320) can be read to prepare the stack-based arguments (e.g., 1334) to be stored on the pseudo stack frame (e.g., 1330). The inserted trampoline branching instruction executes a trampoline code segment that includes the original branching instruction to the callee. The result is that the callee has access to the pseudo stack frame for the stack-based arguments prepared by the caller, but will not have access to the caller's stack frame.

Using trampoline branching instructions advantageously does not require hardware changes. Additionally, inserting a trampoline code segment does not require any changes to existing stack-based pointer functionality previously described herein. Thus, compatibility with legacy code can be maintained while still improving the security of instrumented code by eliminating access to the caller's stack frame. Generally, program code may be "instrumented" by adding new instructions to the program such that the original code in the program is changed. If code instrumentation has not been applied to a certain portion of the program code, then that portion of the code can be referred to as "uninstrumented" code.

To implement embodiments using trampoline code segments, a compiler (e.g., compiler 810 of FIG. 8) an insert a trampoline branching instruction and code segment into compiled code (e.g., assembly code) in response to the compiler detecting a CALL instruction. For example, the compiler may be modified to detect a regular CALL instruction to the callee in a source file and to insert an intermediate trampoline branching instruction into the outputted assembly code prior to the original CALL instruction to the callee. Additionally, in cases where the compiler would have otherwise inserted extra bytes of padding (e.g., 8 bytes) to maintain the stack alignment when issuing the call, the compiler may be able to omit that padding since the extra call instruction maintains alignment by pushing an extra 8-byte return address. Thus, such cases would incur zero memory overhead.

The trampoline branching instruction inserted by the compiler executes an added trampoline code segment (or pseudo function), which causes the pseudo stack frame 1330 to be created. The trampoline code segment then executes the original branching instruction to the intended function, which eventually executes a return instruction to the next instruction to be executed in the trampoline code segment. The trampoline code segment then returns to the original caller function and associated caller stack frame 1320. The following provides an example pseudocode implementation of an instrumented branching instruction to insert an in-line trampoline code segment (or pseudo function) according to some embodiments:

| | |
|---|---|
| CALL 1f; enter the pseudo-frame | (1) |
| JMP 2f; continue execution after exiting the pseudo-frame | (2) |
| 1: | (3) |
| SUB $8, %RSP; may not be needed in some cases, or it could be combined with other stack frame adjustment instructions | (4) |
| PUSHQ <on-stack arg 2> | (5) |
| PUSHQ <on-stack arg 1> | (6) |
| PUSHQ <on-stack arg 0> | (7) |

```
CALL f; call the intended function                                    (8)
ADD $24, %RSP; pop args from stack and possible stack frame           (9)
  adjustment
RET; exit pseudo-frame and return to JMP instruction after           (10)
  "CALL f"
2:                                                                   (11)
; [continue executing code in caller...]                             (12)
```

In the above pseudocode, lines (5)-(8) represent an uninstrumented CALL instruction to a callee function f, where arguments are pushed onto a stack frame of a caller in lines (5)-(7) and then the callee function is called on line (8). In an embodiment, a compiler (e.g., compiler 810) detects an uninstrumented CALL instruction, such as lines (5)-(8) and inserts other code around the CALL to enable the creation of a trampoline execution flow (or pseudo execution flow) and associated pseudo stack frame. Specifically, the added code may include lines (1)-(4) and (9)-(12). For example, a trampoline CALL instruction is added at line (1) to branch to the code beginning at line (3). Line (4) may subtract an 8-byte offset from the stack pointer, unless stack-alignment can be maintained by combining other stack adjustment instructions. Because the caller stack frame 1320 is still accessible by the trampoline code, lines (5)-(7) effectively push the caller's arguments onto the pseudo stack frame 1330 as shown in stack-based arguments 1334. The original CALL instruction is executed from the trampoline code at line (8) to call function f. In the callee function f, arguments in the prior stack frame, which is now the pseudo stack frame 1330, can be accessed. Arguments in earlier stack frames such as caller stack frame 1320, however, cannot be accessed by callee function f.

When a return instruction is executed in the callee (e.g., function f), another return instruction is executed at line (10) to return to the next instruction to be executed in the original caller (e.g., at line (2)). After the callee function returns, the caller function can pop the pseudo stack frame 1330. The pseudo stack frame can be popped, e.g., as shown at line (9), before the extra RET instruction at line (10). The extra RET instruction can be inserted to reactivate the caller's main stack frame 1320. The pseudo stack frame is popped so that the encoded stack pointer in the RSP register is in the correct position for the RET instruction at line (10). The RET instruction jumps back to the instruction (e.g., at line (2)) after the CALL instruction that created the pseudo stack frame. Thus, at line (2), a JMP can be executed to the location at line (11) after this extra RET at line (10) to skip over the trampoline code segment and begin executing the caller code again at line (12). Alternatively, the trampoline code segment can be out-of-line, in which case the JMP can be omitted.

The example stack 1300 of FIG. 13 may be created when code is instrumented to add a trampoline code segment to restrict access to arguments being passed from a caller to a callee, as shown in the above pseudocode for example. The resulting stack frames can include caller stack frame 1320, pseudo stack frame 1330, and callee stack frame 1340. If one or more other nested functions have been called prior to the caller associated with the caller stack frame 1320 being called, then one or more ancestor frames 1310 corresponding respectively to the one or more other nested functions may also be provided in the stack 1300.

A trampoline return address (plus distance) 1332 is inserted at the bottom of the pseudo stack frame 1330, and a callee return address plus distance 1342 is inserted at the bottom of the callee stack frame 1340. An RSP 1306 points to the top of callee stack frame 1340, and the RSP base points to the callee return address (plus distance) 1322 at the bottom of the callee stack frame 1340. A return address load 1302 by the inserted return instruction at line (10) loads the return address (plus distance) 1332.

Each of the stack frames in stack 1300 can be encrypted differently, as indicated by the different patterns. For example, caller stack frame 1320 may be encrypted using a first security context, pseudo stack frame 1330 may be encrypted using a second security context, and callee stack frame 1340 may be encrypted using a third security context. The security context may correspond to different encodings in the pointers for each frame, and encryption may be performed as previously described herein for example, with respect to FIGS. 1 and 2A.

Caller local variables to be used for generating argument values as well as arguments passed on the stack to the caller may be accessed by the trampoline code segment, and the stack-based arguments 1334 may be encrypted using the security context of the pseudo stack frame 1330. In some scenarios, one or more values to be used as values for stack-based arguments 1334 may be available in registers in plaintext by the time the processor begins executing line (5). In this case, the one or more arguments can be encrypted using the pseudo stack frame security context (e.g., RSP for the pseudo stack frame 1330) and stored in the pseudo stack frame 1330. In other scenarios, one or more arguments may not be loaded in registers but instead may be stored in the caller stack frame 1320 in memory. As previously discussed herein, hardware allows a callee function to access the caller function's stack frame in order to obtain arguments being passed (or made available) by the caller. For example, as part of accessing a prior stack's data, the processor internally computes the proper encrypted RSP state for the caller context. The processor then uses the caller context when accessing the memory in the caller memory range.

Accordingly, the trampoline code segment, which is effectively a callee of the caller function associated with caller stack frame 1320, can load the arguments from caller stack frame 1320 and hardware will access appropriate security context (e.g., encrypted RSP state for the caller stack frame 1320) to decrypt the arguments from the caller stack frame 1320, encrypt the arguments based on the pseudo stack frame security context (e.g., encrypted RSP state for the pseudo stack frame 1330), and then store the encrypted arguments as stack-based arguments 1334 in pseudo stack frame 1330.

Once the call is made to the original callee (e.g., at line (9) of the pseudocode above), the trampoline code segment is effectively the caller of the original callee. The original callee, therefore, can access the pseudo stack frame 1330 to load arguments (e.g., processor internally computes encrypted RSP state for pseudo stack frame 1330), decrypt the arguments, and encrypt the arguments with callee security context (e.g., encrypted RSP state for callee stack frame 1340), and store the encrypted arguments in callee stack frame data 1344, if needed. The original callee, however, cannot access the caller stack frame 1320, since the caller stack frame is more than one frame back.

As shown in FIG. 13, sidebars 1352 and 1356 indicate which data can be accessed and decrypted correctly by the callee via the RSP (e.g., 1356), and which data cannot be accessed by the callee (e.g., 1352). Thus, the callee can only access its own stack frame 1340 and the stack-based arguments 1334 of the pseudo stack frame 1330, but cannot access the prior caller stack frame 1320.

As shown in FIG. 13, the callee return address (plus distance) 1342 is indicated as being "protected." The callee RA (plus distance) 1342 is located at the RSP base address 1304 in the callee stack frame 1340. Since the RSP 1306 also contains the base information of the callee stack frame 1340, regardless of where in the callee stack frame 1340 the RSP 1306 is pointed, the hardware can identify the location of the return address (plus distance) 1342 by examining the contents of the RSP 1306 itself. Thus, when an access request is made for some data contained in the callee stack frame 1340, the RSP is used to calculate an offset to the address of the targeted data. The hardware can perform a check to ensure that the address of the targeted data being accessed is not the storage location of the callee RA+distance 1342. The hardware allows only legitimate accesses to the storage location of the callee RA+distance 1342, such as a RET instruction. Thus, the hardware can prevent a malicious actor from attempting to access and manipulate a return address.

Another possible optimization is to reserve a bit in the return address or other metadata storage to indicate whether any on-stack arguments have been passed. If not, no access would be allowed into the caller's frame using pointers relative to the stack frame marked in that way, and it would be unnecessary to perform an extra CALL instruction in the caller. A new or modified instruction for setting the indicator bit can be implemented. For example, a prefix to the CALL instruction could be defined for that purpose.

Figure 13A:
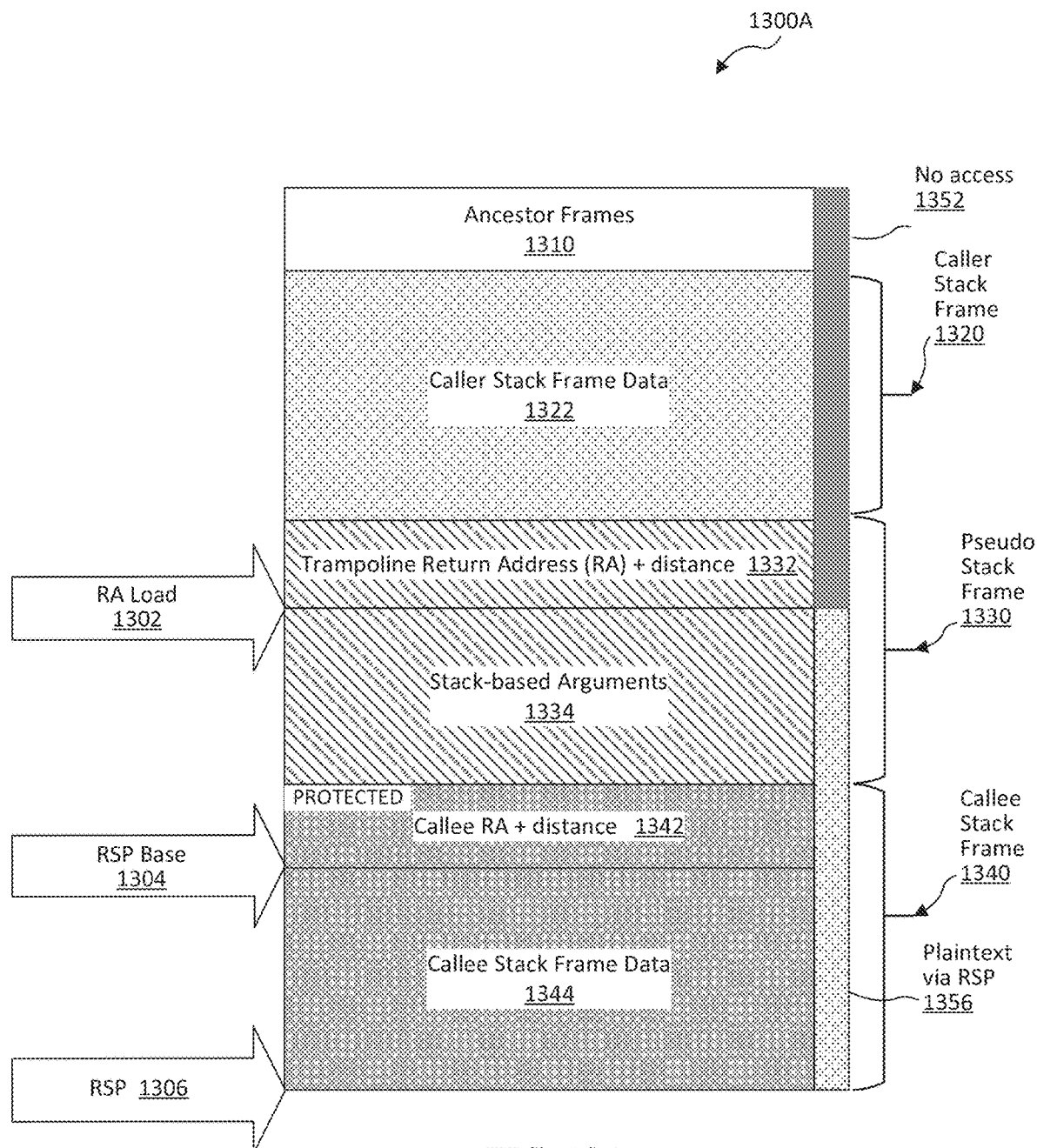
FIG. 13A illustrates an example stack having stack frame access limited by a trampoline call according to at least one embodiment.
Figure 13B:
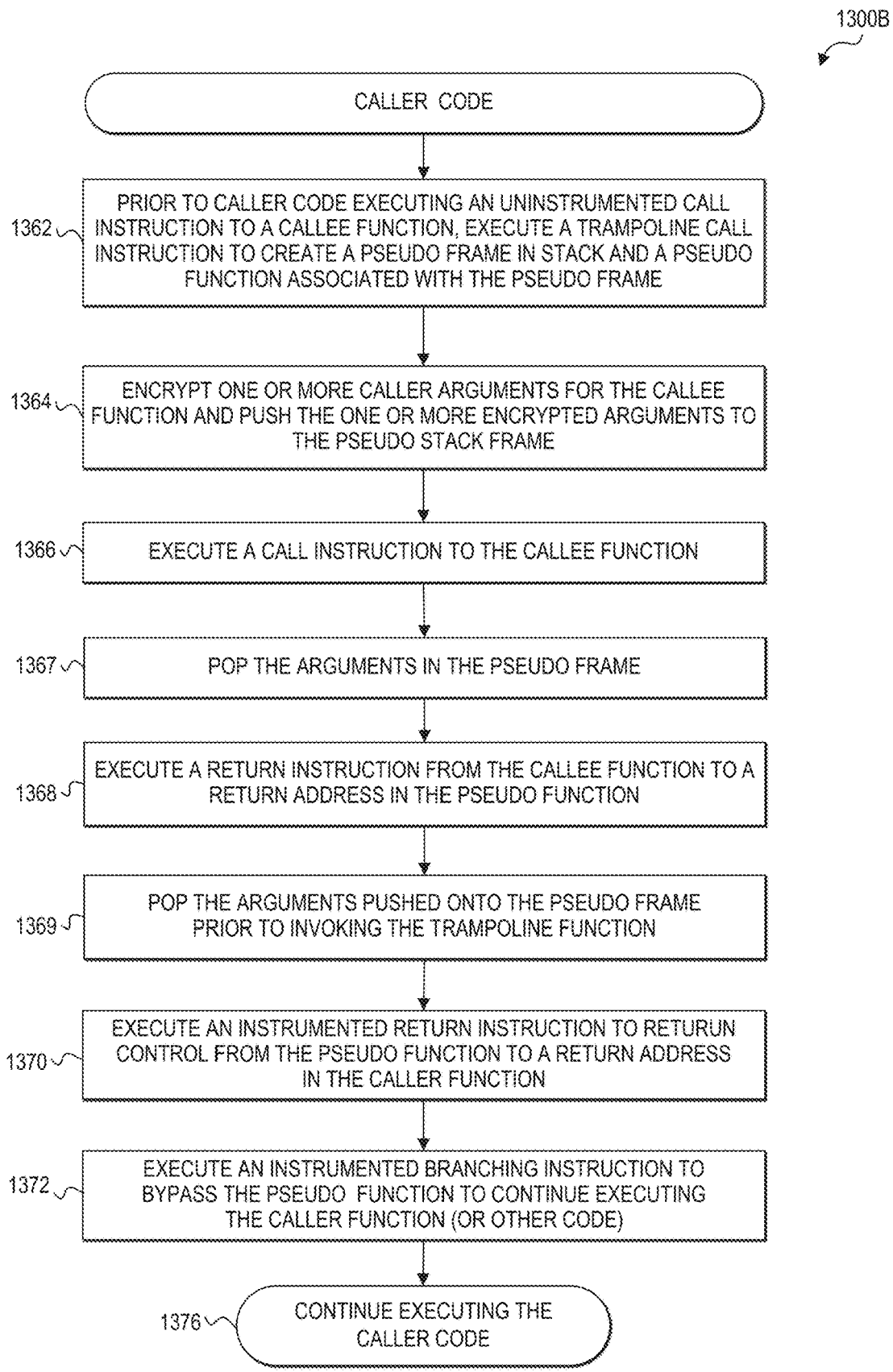
FIG. 13B is a flow diagram for creating a pseudo stack frame associated with a pseudo function to include a branching instruction according to at least one embodiment.

FIG. 13B is a flow diagram of a process 1300B for creating a pseudo stack frame 1330 as shown in FIG. 13A according to at least one embodiment. A set of operations corresponds to activities of FIG. 13B. A program (e.g., application 134, executable file 832, etc.) or portions thereof, may utilize at least a portion of the set of operations. At least one of the operations of process 1300B performs a trampoline call instruction, which may be a normal call instruction ("CALL"), to selected caller code associated with an expected uninstrumented call instruction. The and a pseudo frame in stack. In at least one embodiment, the caller stack frame may be cryptographically protected with a first security context, the pseudo stack frame may be cryptographically protected with a second security context, and the callee stack frame may be cryptographically protected with a third security context. A computing device 100 may comprise means such as processor 102, for performing the operations.

Process 1300B may be performed by a selected portion of a program that calls other functions (e.g., caller code). Prior to the caller code executing an uninstrumented CALL instruction to a callee function, at 1362, a trampoline call instruction (e.g., instrumented instruction) may be executed to create a pseudo frame in stack and a pseudo function associated with the pseudo frame. The pseudo function may be defined between a pseudo function name inserted by a compiler and another instrumented instruction (e.g., RET instruction) inserted by the compiler to branch out of the pseudo function. The trampoline call instruction may effectively branch to code within the caller code that includes the uninstrumented CALL instruction to the callee function and other instructions to push arguments to be passed to the callee function from the caller function. The trampoline call instruction may be any suitable branching instruction that creates a cryptographically protected pseudo stack frame. In one example, a CALL instruction may be used.

When the trampoline call instruction is executed, a pseudo stack pointer is generated from the caller stack pointer in the RSP. For example, a ciphertext portion (e.g., caller security context) in the caller stack pointer in the RSP may be decrypted and then updated with pseudo security context that includes a base address pointing to the pseudo return address (e.g., at 1332). The pseudo security context can then be encrypted to generate the (encoded) pseudo stack pointer in the RSP. In at least one embodiment, the (encoded) pseudo stack pointer in the RSP may be copied to the RSP base as the pseudo base stack pointer.

The CALL instruction also writes a return address using the pseudo stack pointer in the RSP. The CALL instruction can obtain the return address from the RIP and encode the return address with distance metadata indicating the distance from the memory address to which RSP is pointing to the caller base address. The CALL instruction can also use the pseudo stack pointer in the RSP to encrypt the encoded return address and store the encrypted return address at the base address of the pseudo stack frame.

At 1364, within the pseudo function, the pseudo stack pointer in the RSP is used to encrypt one or more arguments to be stored in the stack beginning with the next available slot in stack after the base address of the pseudo stack frame (e.g., 1342) containing the pseudo return address.

After the arguments are encrypted and pushed to stack, at 1366, the uninstrumented CALL instruction is executed. A callee stack pointer is generated from the pseudo stack pointer in the RSP. For example, the ciphertext portion (e.g., pseudo security context) in the pseudo stack pointer in the RSP may be decrypted and then updated with callee security context that includes a base address pointing to callee return address (e.g., 1342). The callee security context can then be encrypted to generate the (encoded) callee stack pointer in the RSP.

The CALL instruction also writes a return address using the callee stack pointer in the RSP. The CALL instruction can obtain the return address from the RIP and encode the return address with distance metadata indicating the distance from the memory address to which RSP is pointing to the pseudo base address. The CALL instruction can also use the callee stack pointer in the RSP to encrypt the encoded return address and store the encrypted return address at the base address of the callee stack frame.

After the callee function returns, at 1367, the arguments in the pseudo stack frame are popped. This is performed prior to executing a return to a return address in the pseudo function.

Once the callee function has completed and the arguments in the pseudo frame have been popped, the callee stack pointer in the RSP points back to the pseudo (or trampoline) return address (e.g., 1332). At 1368, a return ("RET") instruction may be executed from the callee function to a return address in the pseudo function. The callee return address (e.g., 1342) may be loaded, decrypted, and decoded to obtain the return address to be executed in the pseudo function. The distance metadata encoded in the return address may be obtained from the decrypted return address. The distance metadata may be used to determine the pseudo security context to be used to generate the correct pseudo stack pointer in the RSP.

At 1369, the encrypted arguments that are pushed onto the pseudo frame (e.g., at 1364) are popped from the pseudo frame. By popping the arguments from the pseudo frame, the resulting callee stack pointer in the RSP points to the return address in the pseudo stack frame.

The return address in the pseudo stack frame may point to another return instruction to pass control from the pseudo function back to the caller function. At 1370, an instrumented RET instruction may be executed from the pseudo function to a return address in the caller function. The pseudo return address (e.g., 1332) may be loaded, decrypted, and decoded to obtain the return address to be executed in the caller function. The distance metadata encoded in the return address may be obtained from the decrypted return address. The distance metadata may be used to determine the caller security context to be used to generate the correct caller stack pointer in the RSP.

At 1372, the next instruction to be executed in the caller code is an instrumented branching instruction (e.g., JMP, etc.) to bypass the pseudo function with the uninstrumented CALL instruction, which have already been executed.

Figures 14A, 14B:
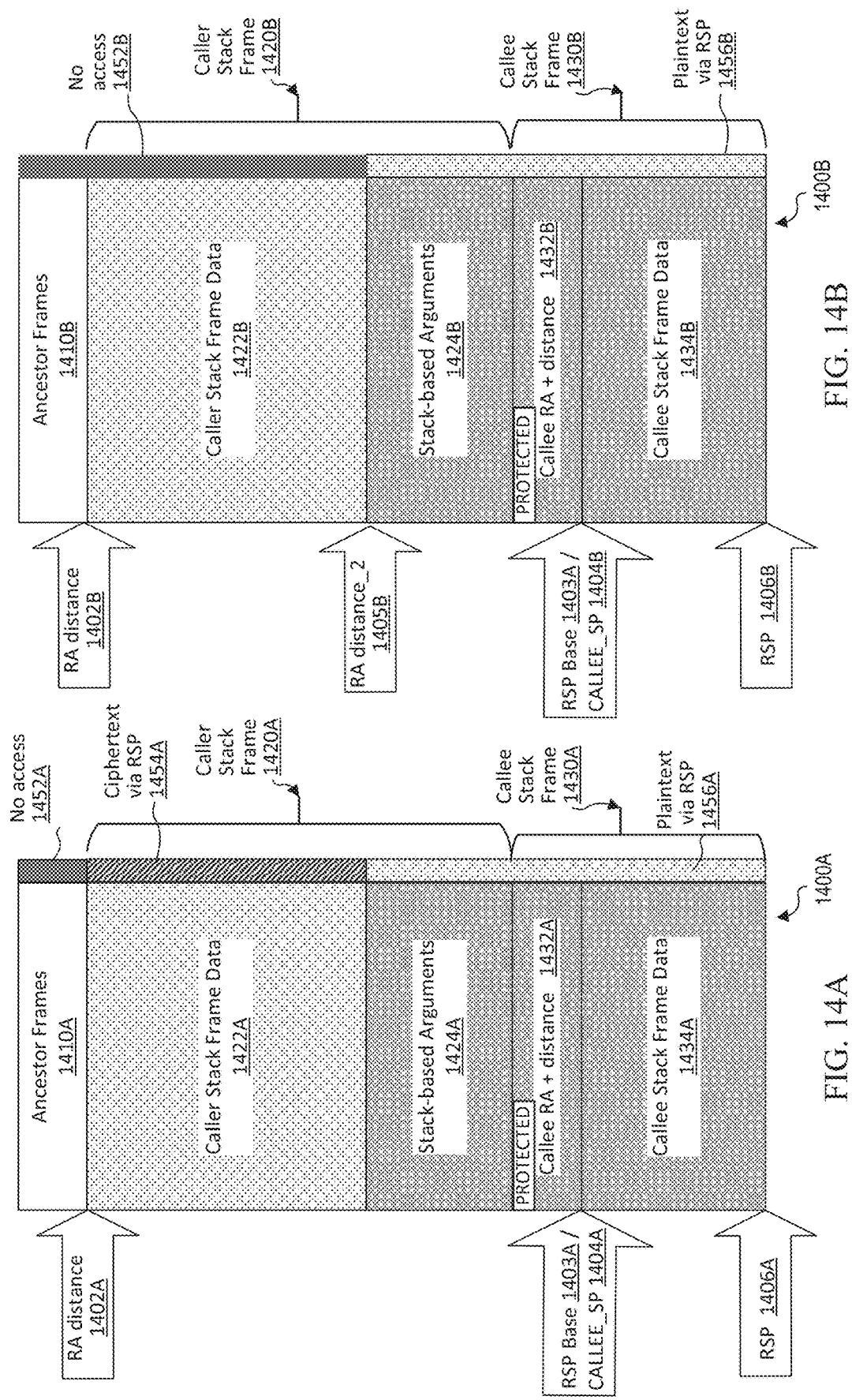
FIGS. 14A and 14B illustrate stacks using a call instruction to allow a caller to generate a stack pointer that encrypts data for callee stack pointer according to at least one embodiment.

FIGS. 14A and 14B illustrate stacks in which data stored in a callee stack frame is encrypted using a simulated stack pointer generated by a SIMCALL instruction, as previously described herein, according to at least one embodiment. Generally, both FIGS. 14A and 14B illustrate embodiments in which the SIMCALL instruction, described above, allows a caller function to generate a simulated callee stack pointer (referred to herein as "CALLEE_SP") prior to invoking a callee function. In one example, the caller knows where the arguments are to be placed and therefore knows the base address. The caller can generate a copy of its own stack pointer with the expected base address and then use SIMCALL to convert the generated stack pointer with expected base address to the CALLEE_SP. The CALLEE_SP can be used by the callee function to decrypt on-stack arguments.

Embodiments using a SIMCALL instruction to enable encryption of arguments using a simulated stack pointer for an eventual callee stack frame advantageously prevent plaintext access to the caller stack frame above the arguments. To maintain legacy compatibility, a specific bit could be set in the encoded RSP to indicate that the specific RSP either has no stack-based arguments or has encrypted the arguments to the callee's RSP and, therefore, does not need to provide plaintext access to the caller's frame.

FIG. 14A illustrates an example stack 1400A that may be created when a SIMCALL is used to generate an output stack pointer that serves as a simulated callee stack pointer to enable a caller function to encrypt arguments it passes to a callee function before the callee function is invoked. When a caller function is invoked, a caller stack frame 1420A is allocated and caller stack frame data 1422A can be stored in the caller stack frame. If one or more other nested functions have been called prior to the caller function being called, then one or more ancestor frames 1410A corresponding respectively to the one or more other nested functions may also be provided in the stack 1400A.

When the caller function associated with the caller stack frame 1420A begins to prepare arguments to be passed to a callee function, the caller function can execute a SIMCALL instruction, as previously described herein. Because the caller knows where the arguments will be stored in the caller stack frame, the caller can calculate the expected base address of the callee stack frame. The caller can generate a modified caller stack pointer based on a copy of its own stack pointer, encoded with caller security context, that references the expected base address of the callee stack frame. The modified caller stack pointer can be stored in a register (e.g., REG) used as the REG operand in the SIMCALL instruction.

In this embodiment, the output stack pointer produced by the SIMCALL instruction serves as a simulated callee stack pointer (e.g., CALLEE_SP) 1404A. The simulated callee stack pointer points to the slot corresponding to the expected base address of the new (callee) stack frame and is encoded with new (callee) security context. Prior to calling the callee function, the caller function can use the simulated callee stack pointer to encrypt and store stack-based arguments 1424A that are to be passed (or made available to) the callee function. The simulated callee stack pointer (or CALLEE_SP) 1404A can be used to directly encrypt data (e.g., the stack-based arguments 1424A) for the eventual callee stack pointer to be stored in RSP 1406A. For example, a data tweak derived from the simulated callee stack pointer that includes at least a portion of the callee security context can be used by a cryptographic algorithm to encrypt the stack-based arguments. A data key may also be used to perform the encryption. Accordingly, the arguments to be passed to the callee can be encrypted based at least in part on the callee security context and, therefore, can be decrypted by the callee function using the callee security context rather than the caller security context.

Although the stack-based arguments 1424A may technically be written to the caller stack frame 1420A, the encryption context of the caller stack frame 1420A transitions from a caller security context to a callee security context beginning at the first stored stack-based argument. Thus, in the caller stack frame 1420A, the caller stack frame data 1422A is encrypted differently than the stack-based arguments 1424A.

When the callee function is called by the caller function, a callee stack frame 1430A can be allocated immediately following the stack-based arguments 1424A in the caller stack frame 1420A. Also, an encoded callee stack pointer can be generated in stack pointer register (RSP) 1406A. In some embodiments, the CALL instruction can be modified to set the RSP to the CALLEE_SP. The RSP 1406A can be encoded with the callee security context. A callee return address (plus distance) 1432A is inserted at the bottom of the callee stack frame 1430A and callee stack frame data 1434A is stored on top of the callee return address. The RSP 1406A is a register that holds an encoded callee stack pointer that points to the top of callee stack frame 1430A at the next available slot in stack and that changes as data is pushed or popped from the stack. The RSP base 1403A is a register that holds an encoded callee base stack pointer that points to the callee return address (plus distance) 1432A at the bottom of the callee stack frame 1430A and may include distance metadata encoding that indicates the distance from the RSP base 1403A to the bottom of the caller stack frame 1420A, as indicated by RA distance 1402A. The callee security context, which is derived from the RSP 1406A and corresponds to the callee security context of CALLEE_SP 1404A, can be used to encrypt data in the callee stack frame 1430A (e.g., callee RA+distance 1432A and callee stack frame data 1434A) during write operations.

The hardware (e.g., processor 102) can be configured such that it allows the callee function associated with the callee stack frame 1430 to only have ciphertext access to the caller stack frame data (e.g., 1422A). Ciphertext access to a given stack frame is intended to mean allowing access to the ciphertext contents of the given stack frame, but not allowing access to the RSP that enables decryption of the ciphertext. This effectively ensures that the actual stack-based arguments (e.g., 1424A) written using CALLEE_SP are correctly decrypted, whereas overflow accesses into the rest of the caller stack frame (e.g., 1422A) results in an incorrect decryption.

As shown in FIG. 14A, sidebars 1452A, 1454A, and 1456A indicate which data can be accessed by as plaintext (e.g., 1456A) by the callee function via the RSP, which data can be accessed as ciphertext (e.g., 1454A) by the callee function, and which data cannot be accessed (e.g., 1452A) by the callee function. Thus, the callee function can only access the plaintext of its own stack frame 1430A and the stack-based arguments 1424A of the caller stack frame 1420A. The caller stack frame data 1422A can be accessed by the callee function, but will not decrypt correctly, and the ancestor frames 1410A cannot be accessed by the callee function at all.

As shown in FIG. 14B, a stack 1400B is illustrated and is similar to stack 1400A. Like FIG. 14A, the example stack 1400B illustrated in FIG. 14B may be created when a SIMCALL is used to generate an output stack pointer that serves as a simulated callee stack pointer to enable a caller function to encrypt arguments it passes to a callee function before the callee function is invoked. The embodiment of FIG. 14B, however, includes encoding additional distance metadata into the return address to indicate argument size in order to also prevent ciphertext access to the caller stack frame data 1422A by the callee function. The additional distance metadata is indicated by RA distance_2 1405B pointing to the bottom of the stack-based arguments 1424B. Other parts of stack 1400B correspond to like parts of stack 1400A.

In the embodiment of FIG. 14B, when the hardware (e.g., processor 102) looks up the callee stack frame 1430B and how far to allow this access to happen, it could use the argument size based on the additional distance metadata encoded in the return address to determine the bounds of the chunk of memory to which access is allowed. The hardware could prevent even ciphertext access by the callee function to caller stack frame data 1422B. As indicated by sidebars 1452B and 1456B, the callee function can only access the plaintext of its own stack frame 1430B and the stack-based arguments 1424B of the caller stack frame 1420B. Unlike the embodiment in FIG. 14A, in the embodiment of FIG. 14B, the caller stack frame data 1422B cannot be accessed by the callee function at all.

Other elements of stack 1400B correspond to stack 1400A. For example, stack 1400B includes ancestor frames 1410B, caller stack frame 1420B (including caller stack frame data 1422B and stack-based arguments 1424B), and callee stack frame 1430B. The example callee stack frame 1430B includes callee RA (plus the distance to the base of the caller stack frame and the distance to the bottom of the arguments in the caller stack frame) 1432B and callee stack frame data 1434B.

As shown in FIGS. 14A and 14B, the callee return addresses (plus distance) 1432A and 1432B, respectively, are indicated as being "protected." Hardware can protect callee return addresses (plus distance) 1432A and 1432B in the same or similar manner as described with reference to the callee return address (plus distance) 1342 of callee stack frame 1340 in FIG. 13A.

In another embodiment, at the time of the call that encodes distance into the return address (e.g., 1432A, 1432B), or even if the distance is not encoded into the return address, the CALL instruction could re-encrypt the on-stack arguments based on the callee security context. This would eliminate the need for a separate SIMCALL instruction. Note that in this embodiment, the callee security context as determined by the RSP would use RSP.BASE (e.g., 1403A, 1403B) pointing at the return address. A benefit of this embodiment is that RSP.BASE still points to the return address, which is useful in unwinding.

Another embodiment is to place a SIMCALL instruction ahead of setting on-stack arguments and to specify within the SIMCALL instruction the size of the on-stack argument region. The size of the on-stack argument region is equivalent to the distance to the return address that would be installed by the subsequent CALL instruction. In that case, the SIMCALL instruction can update RSP.BASE (e.g., 1403A, 1403B) to point to the future return address and encrypt the on-stack arguments accordingly. This embodiment avoids the need for re-encrypting the arguments into the callee security context later, since the stored arguments will already be encrypted in the callee security context.

In one possible optimization, SIMCALL instruction variant could be provided that allows the intended change to the stack pointer base to be hard coded as an immediate into the instruction SIMCALL instruction itself, rather than being supplied as a register operand or being loaded from memory. This modification can provide some protection from exploitation for SIMCALL instructions occurring in the middle of normal program code.

Figure 14C:
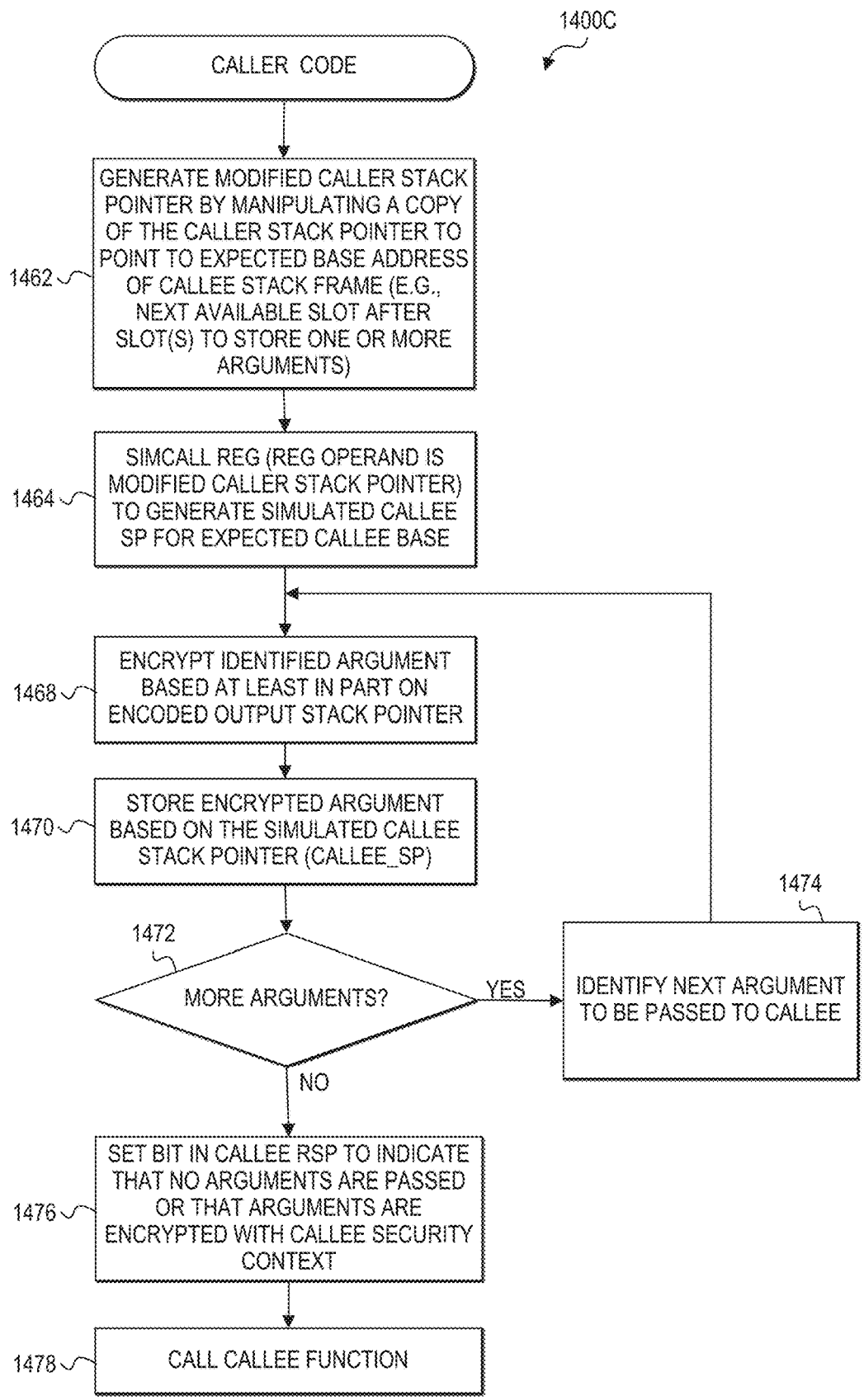
FIG. 14C is a flow diagram for passing arguments from a caller to a callee as illustrated in FIGS. 14A and 14B according to at least one embodiment.

FIG. 14C is a flow diagram illustrating a process 1400C for passing arguments from a caller to a callee as illustrated in FIGS. 14A and 14B according to at least one embodiment. A set of operations corresponds to activities of FIG. 14C. A program (e.g., application 134, executable file 832, etc.) or portions thereof, may utilize at least a portion of the set of operations. At least one of the operations of process 1400C performs a simulated call ("SIMCALL") instruction to simulate a normal call from a caller function that is cryptographically protected with one security context to a callee function that is to be cryptographically protected with another security context. A computing device 100 may comprise means such as processor 102, for performing the operations.

At 1462, a copy of the caller stack pointer in the RSP may be generated. A modified caller stack pointer may be generated by manipulating the copy of the caller stack pointer to point to an expected base address of a callee stack frame to be created when a callee function is invoked. In this embodiment, the expected base address of the callee stack frame to be created is the next available slot in the stack memory after the one or more slots needed to store one or more arguments to be passed from the caller function to the callee function. The modified caller stack pointer may be stored in a register corresponding to the REG operand used in a SIMCALL instruction. In other embodiments of the SIMCALL instruction, the modified caller stack pointer may be stored in memory (for a memory operand) or provided as an immediate operand. In addition, the modified caller stack pointer is used (e.g., by the compiler) to encrypt and store an expected unencoded return address at the expected base address of the callee stack frame to be created. The RSP is retained until the actual call instruction is executed (e.g., at 1478) and may be used to read local variables.

At 1464, the SIMCALL instruction is executed with the REG operand (e.g., a register, an immediate value, or memory). The SIMCALL instruction may be executed as illustrated in method 1200 of FIG. 12, with the modified caller stack pointer as the encoded input stack pointer associated with the REG operand of the SIMCALL instruction. The SIMCALL instruction uses the modified caller stack pointer that points to an unencoded return address, which may be encrypted based on the caller RSP, and which was previously written by the compiler. The modified caller stack pointer is used to load and decrypt the encrypted unencoded return address. The SIMCALL instruction generates a simulated callee stack pointer (or CALLEE_SP) based on the modified caller stack pointer. For example, the caller security context (e.g., base address of caller stack frame and possibly other metadata) that is encoded in the modified caller stack pointer is updated with the callee security context (e.g., base address of callee stack frame and possibly other metadata) as part of generating the CALLEE_SP. The CALLEE_SP points to the slot corresponding to the expected base address of the callee stack frame to be created. Example configurations of a simulated callee stack pointer include but are not limited to encoded pointer 404 of FIG. 4A and encoded pointer 460 of FIG. 4B. The SIMCALL instruction can use the CALLEE_SP to calculate a distance between the base address indicated by CALLEE_SP and the base address of the caller stack frame (e.g., current RSP base), encode distance metadata in the decrypted return address, encrypt the encoded return address based, at least in part, on the callee security context in the CALLEE_SP, and store the encrypted return address (e.g., 1432A, 1432B).

The CALLEE_SP in REG can be used to write arguments to the callee stack frame until the actual call is executed (e.g., at 1478) and the RSP is updated to contain the CALLEE_SP. The first argument of one or more arguments to be passed to the callee function is identified after the CALLEE_SP is generated. At 1468, the identified argument is encrypted based on the simulated callee stack pointer, as previously described herein for example, with reference to FIGS. 1 and 2A. In one example, a data tweak derived from the simulated callee stack pointer including at least a portion of the callee security context (e.g., encrypted or decrypted expected base address of the callee stack frame to be created) may be used to encrypt the first argument. A data key may also be used in the encryption in at least some embodiments. At 1470, the simulated callee stack pointer in REG may be used to store the encrypted argument to the appropriate next available slot in stack. It should be noted that, if a local variable in the caller stack frame is used as an argument, then the local variable may be loaded and decrypted using the caller stack pointer in the RSP. The simulated callee stack pointer may then be used to re-encrypt the local variable and store the re-encrypted local variable as one of the stack-based arguments 1424A. For example, the local variable stored in the caller stack frame may be encrypted based, at least in part, on a tweak derived from the caller security context (e.g., caller base address) and/or a data key. After the local variable is decrypted, the local variable may be re-encrypted based, at least in part, on a tweak derived from the callee security context (e.g., callee base address) and/or a data key.

At 1472, a determination is made as to whether more arguments are to be passed by the caller function. If it is determined that more arguments are to be passed, then at 1474, the next argument to be passed to the callee function is identified. Flow continues at 1468, to encrypt the identified argument and then store the encrypted argument at 1470.

When a determination is made at 1472, that no more arguments are to be passed to the callee function, then the caller stack pointer in the RSP points to the slot corresponding to the expected base address of the callee stack frame to be created when the callee function is invoked.

At 1476, during the execution of a caller function prior to calling a callee function, a bit may be set in the caller stack pointer (e.g., caller RSP). The bit may indicate that the caller stack frame either does not have any arguments to be passed or the arguments being passed are encrypted using the callee security context (e.g., from simulated callee stack pointer). Hardware can detect this set bit and, in response, not permit plaintext access to the caller stack frame data (e.g., 1422A, 1422B).

At 1478, a call instruction (e.g., CALL) may be executed to call the callee function. The CALL instruction generates an actual callee stack pointer to the base address of the callee stack frame, where the encoded return address that is encrypted based on the callee security context is stored. The callee stack pointer is encoded with the encrypted callee security context (e.g., encrypted base address of callee stack frame and possibly other metadata), and stored in the RSP (e.g., 1406A, 1406B). In some scenarios, instead of generating the callee stack pointer, the CALL instruction may be modified to store the simulated callee stack pointer in the RSP. During the execution of the callee function, the RSP, which contains the callee stack pointer (with an appropriate offset depending on how big the callee stack frame has grown, can be used to decrypt the arguments (e.g., 1424A, 1424B) passed by the caller stack frame.

In some embodiments, as shown in FIG. 14B, an additional size metadata indicating the size of the on-stack arguments (e.g., 1424B) may be encoded into the return address (e.g., 1432B) stored at the callee base address (e.g., 1404B). The SIMCALL instruction may be modified to accept another operand associated with the size of the arguments to be stored by the caller function. In another embodiment, the size of the arguments may be computed as the difference between the simulated callee stack pointer and the caller stack pointer in the stack pointer register. Additional distance (argument size) metadata encoded in the return address can be used to prevent the callee function from accessing the caller stack frame data (e.g., 1422B), even as ciphertext.

Figure 15A:
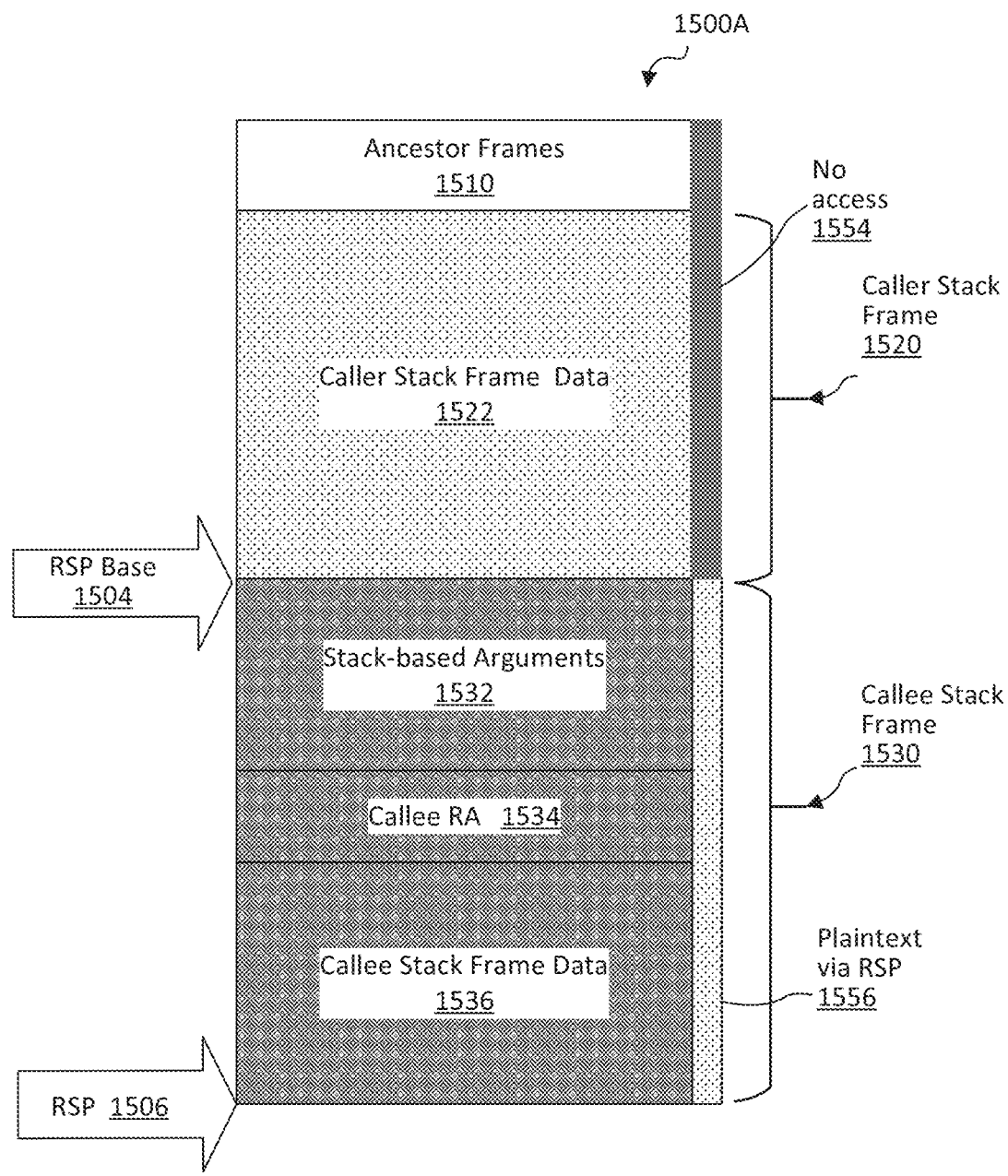
FIG. 15A illustrates an example stack using a call instruction to encrypt for a callee and set base to an argument start according to at least one embodiment.

FIG. 15A illustrates an example stack associated with using a first specialized call instruction to encrypt arguments passed to a callee and to set a base of an RSP for the callee's stack frame to the start of the arguments according to at least one embodiment. In this embodiment, a first specialized call ("SPCALL1") instruction encodes an RSP base (e.g., 1504) to point to the beginning of stack-based arguments (e.g., 1532) in a caller stack frame (e.g., 1530) passed by a caller function to callee stack frame (e.g., 1530) to be used by a corresponding callee function. Encoding the RSP base to point to the beginning of the arguments effectively extends the callee stack frame (e.g., 1530) to include the arguments. In this embodiment, all of the security context used to encrypt the contents of the callee stack frame (e.g., 1530), which includes stack-based arguments (e.g., 1532), is encoded in or otherwise derived from the RSP of the callee stack frame (e.g., 1530). Thus, no additional distance lookups are needed from memory to compute the addresses of the stack-based arguments. For legacy compatibility, the first specialized call instruction could be further extended to include an extra bit in the RSP to indicate that the RSP does not need plaintext or ciphertext access to the prior (caller) stack frame (e.g., 1420), while allowing other RSPs to retain legacy compatible plaintext access to a caller stack frame.

FIG. 15A illustrates an example stack 1500 that may be created when using a first specialized call instruction to encrypt stack-based arguments for a callee and to set the base address for the callee stack frame to an argument start according to at least one embodiment. When a caller function is invoked, a caller stack frame 1520 is allocated and caller stack frame data 1522 can be stored in the caller stack frame. If one or more other nested functions have been called prior to the caller function being called, then one or more ancestor frames 1510 corresponding respectively to the one or more other nested functions may also be provided in the stack 1500.

When the caller function calls a callee function, the first specialized call instruction may be used. The first specialized call instruction may take an additional offset to be applied to the callee stack base. When using the first specialized call instruction with stack-based arguments 1532, the SIMCALL instruction can be used to generate a simulated stack pointer (or CALLEE_SP) and to encrypt the arguments for the callee stack frame 1530. The first specialized call instruction, which generates an RSP for the callee stack frame 1530, can also set an encoded stack pointer in an RSP base 1504 to point to the start of the stack-based arguments 1532.

Setting the RSP base 1504 to point to the beginning of the stack-based arguments 1532 allows the RSP base to prevent access to the caller stack frame 1520. The hardware (e.g., 102) can be configured to prevent access to a prior caller stack frame (e.g., by detecting the extra bit in the RSP, as previously described). Accordingly, as indicated by sidebars 1554 and 1556, the callee function can only access the plaintext of its own stack frame 1530, but cannot access the ancestor frames 1510 and the caller stack frame 1530.

As previously described herein, both the SIMCALL instruction and the first specialized CALL instruction could use immediate values as offsets to avoid potential exploitation. In at least some embodiments, a callee return address 1534 may be encrypted differently from normal callee stack frame data 1536 and stack-based arguments 1532 to retain protection of the callee return address 1534. Alternatively, a shadow stack may be used to retain protection for the return address. These embodiments may be used as the hardware may not provide a check against the return address since the RSP base is no longer pointing to the return address.

Figure 15B:
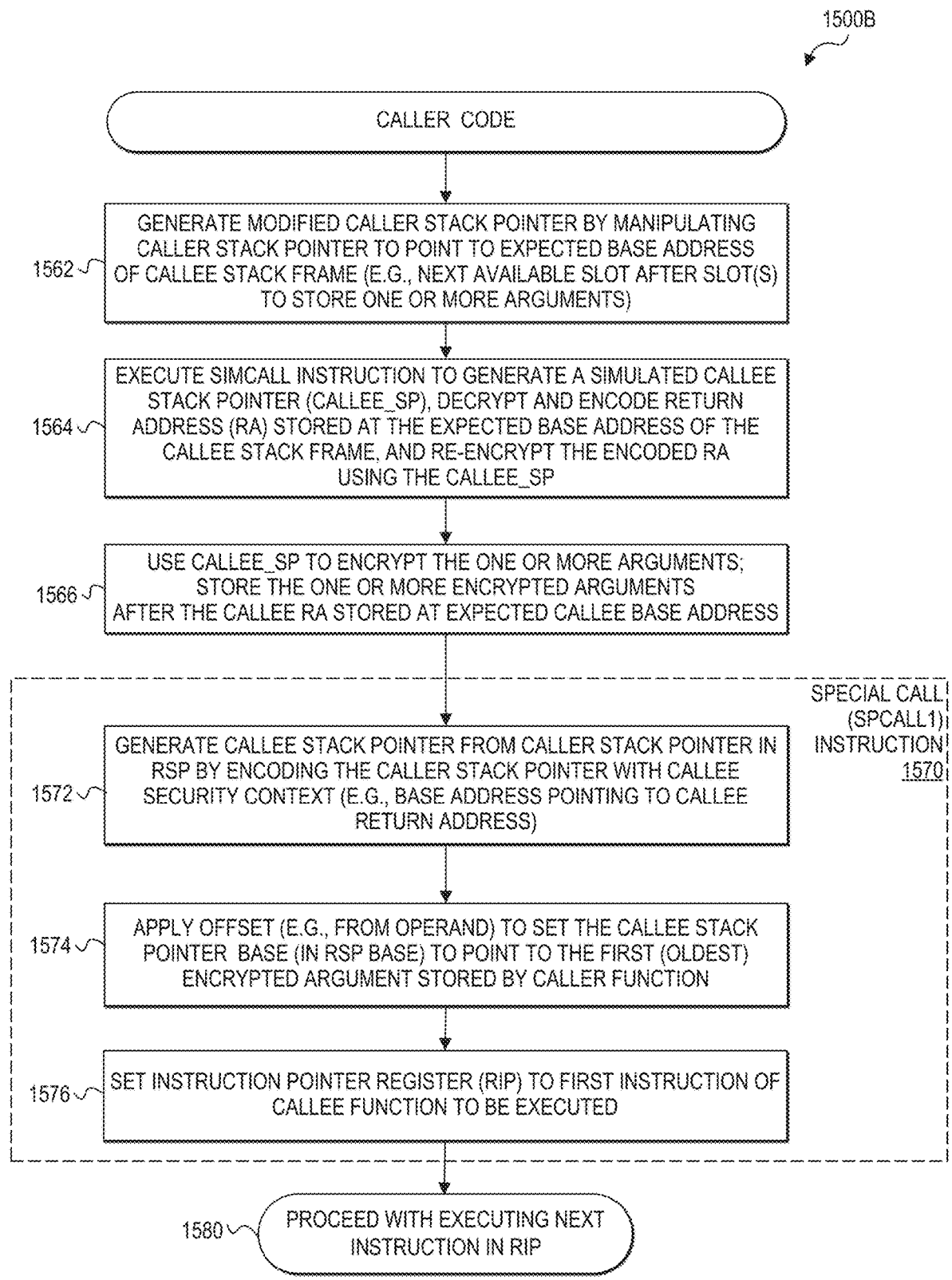
FIG. 15B is a flow diagram for passing arguments from a caller to a callee as illustrated in FIG. 15A according to at least one embodiment.

FIG. 15B is a flow diagram illustrating a process 1500B for passing arguments from a caller to a callee as illustrated in FIG. 15A according to at least one embodiment. A set of operations corresponds to activities of FIG. 15B. A program (e.g., application 134, executable file 832, etc.) or portions thereof, may utilize at least a portion of the set of operations. Process 1500B performs a simulated call ("SIMCALL") instruction to simulate a normal call from a caller function that is cryptographically protected with one security context to a callee function that is to be cryptographically protected with another security context. Process 1500B also performs a first specialized call ("SPCALL1") instruction to change the base address of the callee stack pointer to the beginning of the arguments 1532. A computing device 100 may comprise means such as processor 102, for performing the operations.

Initially, the caller code can generate a modified caller stack pointer at 1562, execute a SIMCALL instruction at 1564, and use a simulated callee stack pointer (e.g., CALLEE_SP) to encrypt and store one or more arguments at 1566. In at least one embodiment, these activities at 1562, 1564, and 1566 may be performed by activities that are the same or similar to activities at 1462, 1464, and 1468-1476, respectively, of process 1400C of FIG. 14C.

After the arguments are encrypted and pushed to stack, at 1570, a first specialized call (SPCALL1) instruction is executed. At 1572, a callee stack pointer is generated from the caller stack pointer in the RSP. For example, the ciphertext portion (e.g., caller security context) in the caller stack pointer in the RSP may be decrypted and then updated with callee security context that includes a base address pointing to callee return address (e.g., at 1534). The callee security context can then be encrypted to generate the (encoded) callee stack pointer in the RSP. In at least one embodiment, the (encoded) callee stack pointer in the RSP may be copied to the RSP base as the callee base stack pointer.

At 1574, an offset corresponding to an operand (e.g., immediate, memory, or register operand) of the SPCALL1 instruction is applied (e.g., using appropriate arithmetic) to the callee base stack pointer (in RSP base) to set the callee base stack pointer (e.g., in RSP base 1504) to point to beginning of the stack-based arguments (e.g., 1532). In one example, the offset can represent the size of the stack-based arguments.

At 1576, the instruction pointer register (RIP) may be set to the memory address (e.g., linear address) of the first instruction of the callee function that is to be executed. At 1580, execution of the instruction stored in the RIP can proceed.

Figures 16A, 16B:
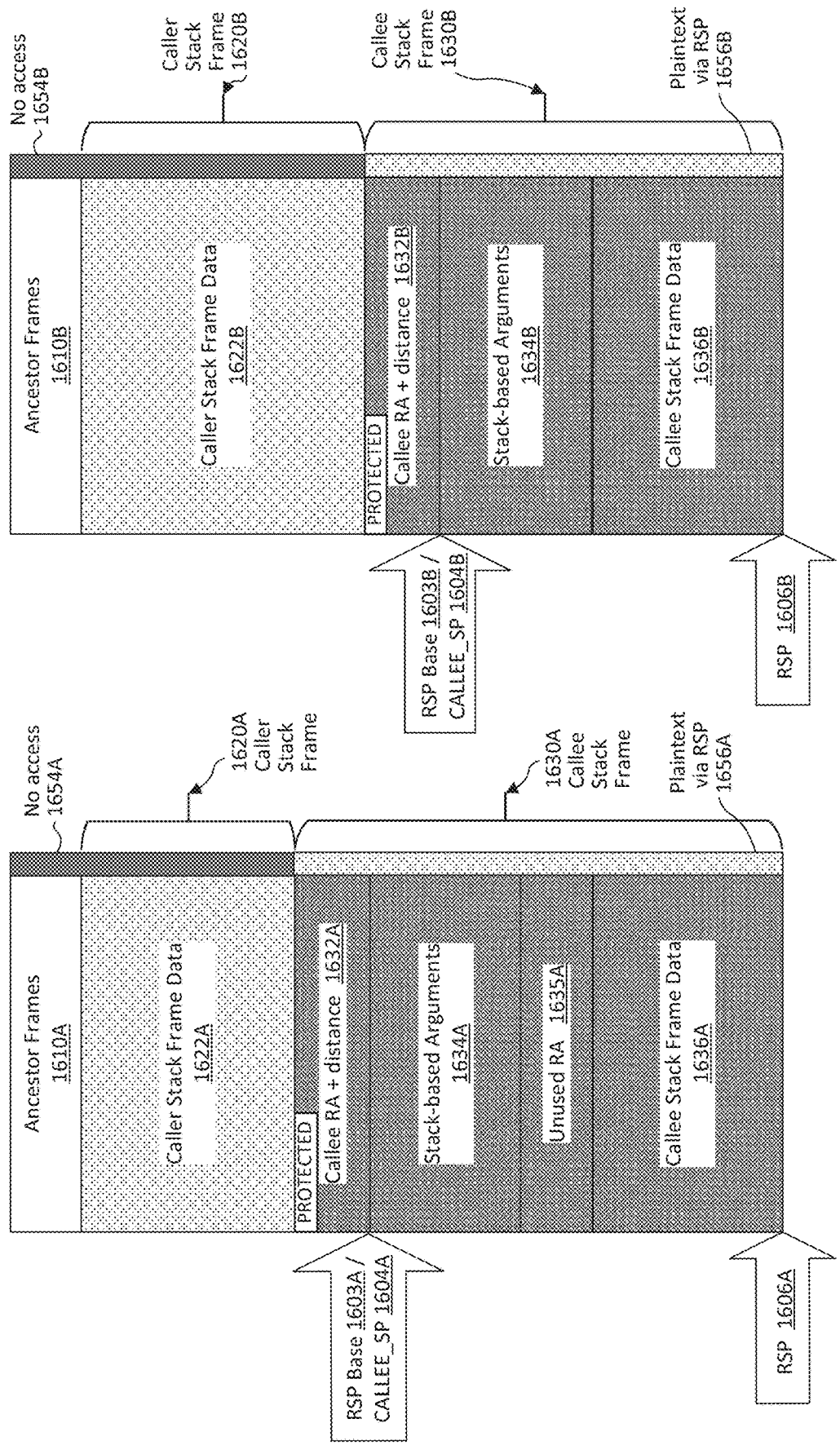
FIGS. 16A and 16B illustrate stacks using a call instruction to encrypt arguments for callee and set base plus return address before arguments according to at least one embodiment.

FIGS. 16A and 16B illustrate stacks associated with encrypting arguments passed to a callee function and setting a callee frame base address to store a return address that precedes the encrypted arguments in the stack according to at least one embodiment. In this embodiment, the SIMCALL instruction is executed by a caller function prior to a second specialized call ("SPCALL2") instruction to set an RSP base address for a callee stack frame (e.g., 1630A, 1630B) and to store a return address at the RSP base address. The CALLEE_SP points to a slot just prior to the start of arguments passed by the caller function to the callee function. This effectively extends the callee stack frame (e.g., 1630A, 1630B) to include stack-based arguments passed in a caller stack frame (e.g., 1620A, 1620B) by the caller function and allows access to the caller stack frame by the callee function to be prevented.

FIG. 16A illustrates an example stack 1600A that may be created when using a SIMCALL instruction and a second specialized call instruction to encrypt arguments passed to a callee and to set an alternate callee base address that is located before the arguments. When a caller function is invoked, a caller stack frame 1620A is allocated and caller stack frame data 1622A can be stored in the caller stack frame. If one or more other nested functions have been called prior to the caller function being called, then one or more ancestor frames 1610A corresponding respectively to the one or more other nested functions may also be provided in the stack 1600A.

To create callee stack frame 1630A, a SIMCALL instruction is executed before calling the callee function. In some embodiments, the unencoded return address to be stored in the callee stack frame to enable a return to the caller function, may be programmatically stored (and encrypted) on the stack before invoking the SIMCALL instruction. In this case, the SIMCALL instruction then uses the REG operand to load and decrypt the encrypted unencoded return address. The REG operand may contain a copy of the caller stack pointer in the RSP (or modified caller stack pointer if modification is needed) that points to the next slot in the stack (e.g., 1604A) after variables stored in the caller stack frame. In another implementation, an unencoded return address may be provided as an operand to the SIMCALL instruction. In this case, the unencoded return address may not need to be separately stored or be loaded or decrypted (e.g., if the unencoded return address is provided in a register operand) when SIMCALL is executed and can also be pushed on the stack.

The SIMCALL instruction uses the REG operand to generate a simulated stack pointer (or CALLEE_SP) for the callee stack frame by updating the caller security context in the REG operand with callee security context (e.g., alternate callee base address). The SIMCALL instruction uses encodes the return address 1632A with distance metadata representing a distance from the alternate callee base address to the caller base address, and encrypts the encoded return address based on at least a portion (e.g., callee security context) of the CALLEE_SP. The caller function can also use the CALLEE_SP to encrypt and store the on-stack arguments 1634A. Once all the arguments have been encrypted and stored, the caller stack pointer in the RSP can be modified to point to a slot in the stack immediately after the stack-based arguments. This slot corresponds to the original expected callee base address.

The caller function executes a specialized call instruction to generate an encoded callee stack pointer in the RSP by updating caller security context in the encoded caller stack pointer in the RSP with callee security context (e.g., base address pointing to callee RA+distance 1632A). The RSP base 1604A points to the callee return address (plus distance) 1632A.

The specialized CALL instruction still writes a return address into the slot immediately after the stack-based arguments 1634A. This slot is referenced as "unused RA 1635A" in stack 1600A of FIG. 16A. The unused RA slot may be maintained in the callee stack frame 1630A for software compatibility with routines that read the return address out of its usual location, but this entry is not used upon return. Instead, a RET instruction will use the alternate callee base address embedded in the current RSP 1606A to find the actual slot containing the callee RA (plus distance) 1632A and retrieve the callee RA. This approach separates caller stack frame data 1622A from the callee stack frame 1630A, and it also protects the callee return address, since the hardware prohibits direct access to the RSP base 1604A.

A specialized return instruction may also be used in embodiments where the return address is stored in a location preceding the stack-based arguments. When a return is executed by the callee function, the RSP 1606A is pointing to the unused RA 1635A. The specialized return instruction determines the RSP base 1604A embedded in the RSP 1606A to find the actual address of the callee RA (plus distance) 1632A. The return address (plus distance) 1632A is then read from the determined RSP base 1604A.

The stack 1600B shown in FIG. 16B illustrates an example stack 1600B that may be generated in an embodiment that functions in a similar manner as described with reference to FIG. 16A. However, the embodiment associated with FIG. 16B is modified to avoid an unused return address slot. In this embodiment, the callee function associated with the callee stack frame 1630B can be enlightened to use the "unused RA" slot for callee's stack frame data (e.g., 1636B). Thus, the callee stack frame data 1636B is stored in the callee stack frame 1630B immediately following the stack-based arguments 1634B. To achieve this embodiment, the program may be recompiled with appropriate code to enable the enlightenment of the callee function.

It should be noted that, with the exception of the unused RA 1645A in stack 1600A, the parts of stack 1600B correspond to stack 1600A. For example, stack 1600B may include ancestor frames 1610B, caller stack frame 1620B (including caller stack frame data 1622B), callee stack frame 1630B (including callee RA (plus distance) 1632B, stack-based arguments 1634B, and callee stack frame data 1636B), and RSP 1606B with RSP base 1604B pointing to the callee RA (plus distance) 1632B.

Setting the callee RSP base (e.g., 1604A, 1604B) to point to a slot prior to the beginning of the stack-based arguments (e.g., 1634A, 1634B) allows the callee RSP base to be used as a limit for both ciphertext access (e.g., in caller stack frame 1620A or 1620B) and plaintext access (e.g., in callee stack frame 1630A or 1630B). The hardware (e.g., 102) can be configured to prevent access to a prior caller stack frame (e.g., by detecting an extra bit in the RSP, as previously described, or any other suitable mechanism). Accordingly, as indicated by sidebars 1654A and 1656A in FIG. 16A, or 1654B and 1656B in FIG. 16B, the callee function can only access the plaintext of its own stack frame (e.g., 1630A, 1630B), but cannot access the ancestor frames (e.g., 1610A, 1610B) and the caller stack frame data (e.g., 1622A, 1622B).

As shown in FIGS. 16A and 16B, the callee return addresses (plus distance) 1632A and 1632B are indicated as being "protected." The callee return addresses (plus distance) 1632A and 1632B are located at the alternate callee base addresses 1604A and 1604B in the callee stack frames 1630A and 1630B, respectively. Since a callee stack pointer in an RSP 1606A or 1606B also contains the alternate base information of the callee stack frame 1630A or 1630B, regardless of where in the callee stack frame 1630A or 1630B the RSP 1606A or 1606B is pointed, the hardware can identify the alternate location of the return address (plus distance) 1632A or 1632B by examining the contents of the RSP 1606A or 1606B itself. Thus, when an access request is made for some data contained in the callee stack frame 1630A or 1630B, the RSP is used to calculate an offset to the address of the targeted data. The hardware can perform a check to ensure that the address of the targeted data being accessed is not the alternate storage location of the callee RA+distance 1632A or 1632B. The hardware allows only legitimate accesses to the alternate storage location of the callee RA+distance 1632A or 1632B, such as a RET instruction. Thus, the hardware can prevent a malicious actor from attempting to access and manipulate a return address.

Figure 16C:
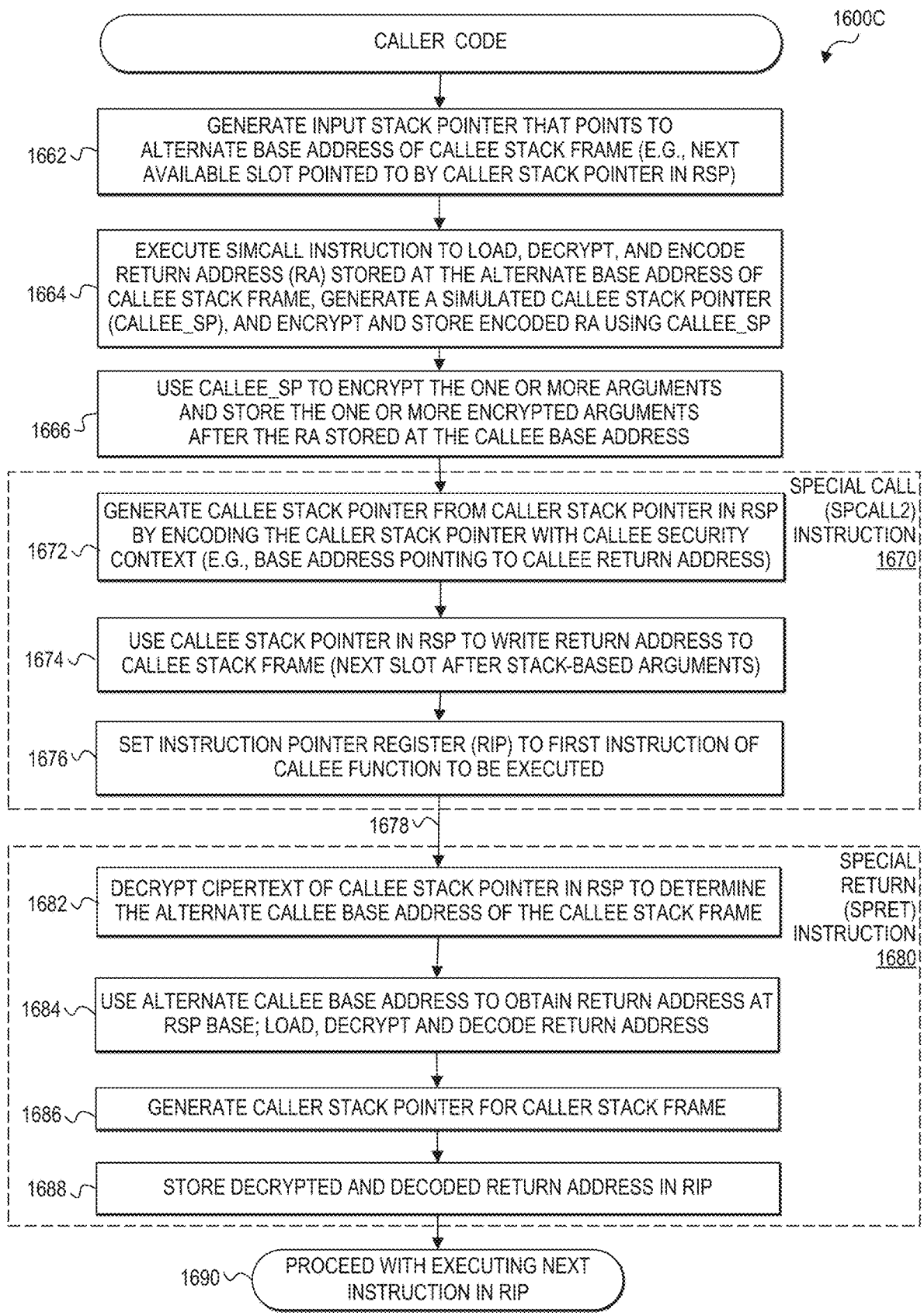
FIG. 16C is a flow diagram for passing arguments from a caller to a callee as illustrated in FIGS. 16A and 16B according to at least one embodiment.

FIG. 16C is a flow diagram illustrating a process 1600C for passing arguments from a caller to a callee as illustrated in FIGS. 16A and 16B according to at least one embodiment. A set of operations corresponds to activities of FIG. 16C. A program (e.g., application 134, executable file 832, etc.) or portions thereof, may utilize at least a portion of the set of operations. At least one of the operations of process 1600C performs a simulated call ("SIMCALL") instruction to simulate a normal call from a caller function that is cryptographically protected with one security context to a callee function that is to be cryptographically protected with another security context. Process 1600C also performs a second specialized call ("SPCALL2") instruction to change the base address of the callee stack pointer to an address in the caller stack frame that may be used to securely store a return address. A computing device 100 may comprise means such as processor 102, for performing the operations.

At 1662, an input stack pointer to be used in a SIMCALL instruction is obtained. The input stack pointer points to a slot corresponding to an alternate base address of a callee stack frame to be created when a callee function is invoked. In this embodiment, the alternate base address is the next available memory location in the stack, before any arguments are stored by the caller. Thus, the input stack pointer may be a copy of the caller stack pointer in the RSP, which points to the next available memory location in the stack. If needed, a copy of the caller stack pointer in the RSP may be modified to point to the alternate callee base address. The input stack pointer may be stored in a register corresponding to the REG operand used in a SIMCALL instruction. In other embodiments of the SIMCALL instruction, the input stack pointer may be stored in memory (for a memory operand) or provided as an immediate operand.

At 1664, the SIMCALL instruction is executed with the REG operand (e.g., a register, an immediate value, or memory). The SIMCALL instruction may be executed as illustrated in method 1200 of FIG. 12, with the input stack pointer associated with the REG operand of the SIMCALL instruction. In one implementation, an unencoded return address is encrypted and stored programmatically at the alternate callee base address based on the caller stack pointer in the RSP. The SIMCALL instruction uses the input stack pointer to load the encrypted return address stored at the alternate callee base address, and to decrypt the encrypted return address (e.g., based on caller security context encoded in the input stack point). In another implementation, the SIMCALL instruction may be modified to use a second operand (e.g., register, memory, or immediate) containing the unencoded return address. If provided as a register operand, the unencoded return address may not need to be loaded and decrypted, and instead can simply be encoded with the distance metadata.

The SIMCALL instruction generates a simulated callee stack pointer (or CALLEE_SP) based on the input stack pointer. For example, the caller security context (e.g., base address of caller stack frame and possibly other metadata) encoded in the input stack pointer is updated with the callee security context (e.g., alternate base address of callee stack frame and possibly other metadata) as part of generating the CALLEE_SP (e.g., 1604A, 1604B). The CALLEE_SP points to a slot corresponding to the expected base address of the callee stack frame to be created. Example configurations of a simulated callee stack pointer include but are not limited to encoded pointer 404 of FIG. 4A and encoded pointer 460 of FIG. 4B. The SIMCALL instruction can use the CALLEE_SP to calculate a distance between the base address indicated by CALLEE_SP and the base address of the caller stack frame (e.g., current RSP base), encode distance metadata in the decrypted return address, encrypt the encoded return address based, at least in part, on the callee security context in the CALLEE_SP, and store the encrypted return address (e.g., callee return address plus distance 1632A, 1632B).

At 1666, the caller function can use the CALLEE_SP to encrypt one or more arguments and to store the one or more encrypted arguments in the stack beginning with the next available slot in stack after the alternate base address of the callee stack frame (e.g., 1634A, 1634B) containing the callee return address When the last encrypted argument is of the stack-based arguments (1634A, 1634B) is stored, the CALLEE_SP points to the next available slot in stack below the stack-based arguments. In some implementations, the CALLEE_SP may be stored in REG register and thus, the REG register is used to encrypt and store the arguments. In other implementations, the CALLEE_SP may be stored in the RSP, and the original caller encoded stack pointer may be stored in another location (e.g., temporary register, other register, memory, etc.) to enable local variables in the caller stack frame to be accessed prior to the callee function being called.

After the arguments are encrypted and pushed to stack, at 1670, a second specialized call (SPCALL2) instruction is executed. The SPCALL2 instruction may use the caller stack pointer in the RSP to generate a callee stack pointer in the RSP. Before the SPCALL2 instruction is executed, the caller stack pointer in the RSP points to, or is modified to point to, a slot corresponding to the original expected base address of the callee stack frame, which is located just below the stack-based arguments (e.g., 1634A).

At 1672, a callee stack pointer may be set in the RSP either by using the CALLEE_SP or an offset operand to SPCALL2. For example, the ciphertext portion (e.g., caller security context) in the caller stack pointer in the RSP may be decrypted and then updated with callee security context that includes the alternate callee base address pointing to callee return address (e.g., 1632A). The callee security context can then be encrypted to generate the (encoded) callee stack pointer in the RSP, which is pointing to the next available slot where an unused return address 1635A is to be stored.

At 1674, the encoded callee stack pointer in the RSP can be used to encode an unencoded return address (e.g., with distance metadata to the base address of the caller stack frame), to encrypt the encoded return address, and store the encrypted return address to the callee stack frame in the original expected callee base address, which is the next slot after the stack-based arguments (e.g., 1634A). The encrypted and stored return address is indicated as an unused return address (e.g., 1635A). The unused RA may be used for software compatibility with routines that read the RA out of the usual location (e.g., immediately following the arguments). However, the unused RA is not used when the callee function returns control to the caller function.

At 1676, the instruction pointer register (RIP) may be set to the memory address of the first instruction of the callee function that is to be executed. At 1678, other operations may be performed by the callee function.

Once the callee function has completed, the callee stack pointer in the RSP points back to the unused RA (e.g., 1635A), and a specialized return ("SPRET") instruction 1680 may be executed to return control to the caller function. At 1682, the ciphertext portion (e.g., the callee security context) in the callee stack pointer in the RSP is decrypted to determine the alternate callee base address of the callee stack frame. The encrypted arguments may be popped until the callee stack pointer corresponds to the alternate callee base address.

At 1684, the alternate callee base address of the callee stack frame is used to obtain the callee return address (e.g., 1632A) stored at the RSP base (e.g., 1603A). The return address can be loaded and decrypted. From the decrypted return address, distance metadata indicating the distance between the alternate callee base address of the callee stack frame and a caller base address of the caller stack frame can be obtained and used to calculate caller base address.

At 1686, the caller stack pointer can be generated based on the callee stack pointer in the RSP. For example, the callee security context (e.g., alternate base address of callee stack frame and possibly other metadata) of the callee stack pointer can be updated with the caller security context (e.g., caller base address of caller stack frame and possibly other metadata). The encrypted return address at the alternate callee base address may be popped to cause the caller stack pointer in the RSP to create a next available slot for the caller stack frame.

At 1688, the decrypted and decoded return address (e.g., linear address) obtained from the alternate callee base address may be stored in the instruction pointer register, to pass control to the caller function. The instruction corresponding to the return address stored in the RIP can be executed at 1690.

To avoid having an unused RA slot (e.g., 1635A) in a callee stack frame, the callee function can be recompiled to cause callee function to use the unused RA slot for callee stack data, as shown in FIG. 16C. In this scenario, process 1600C could be changed to omit 1674 (writing the unused RA to the stack).

Figure 17:
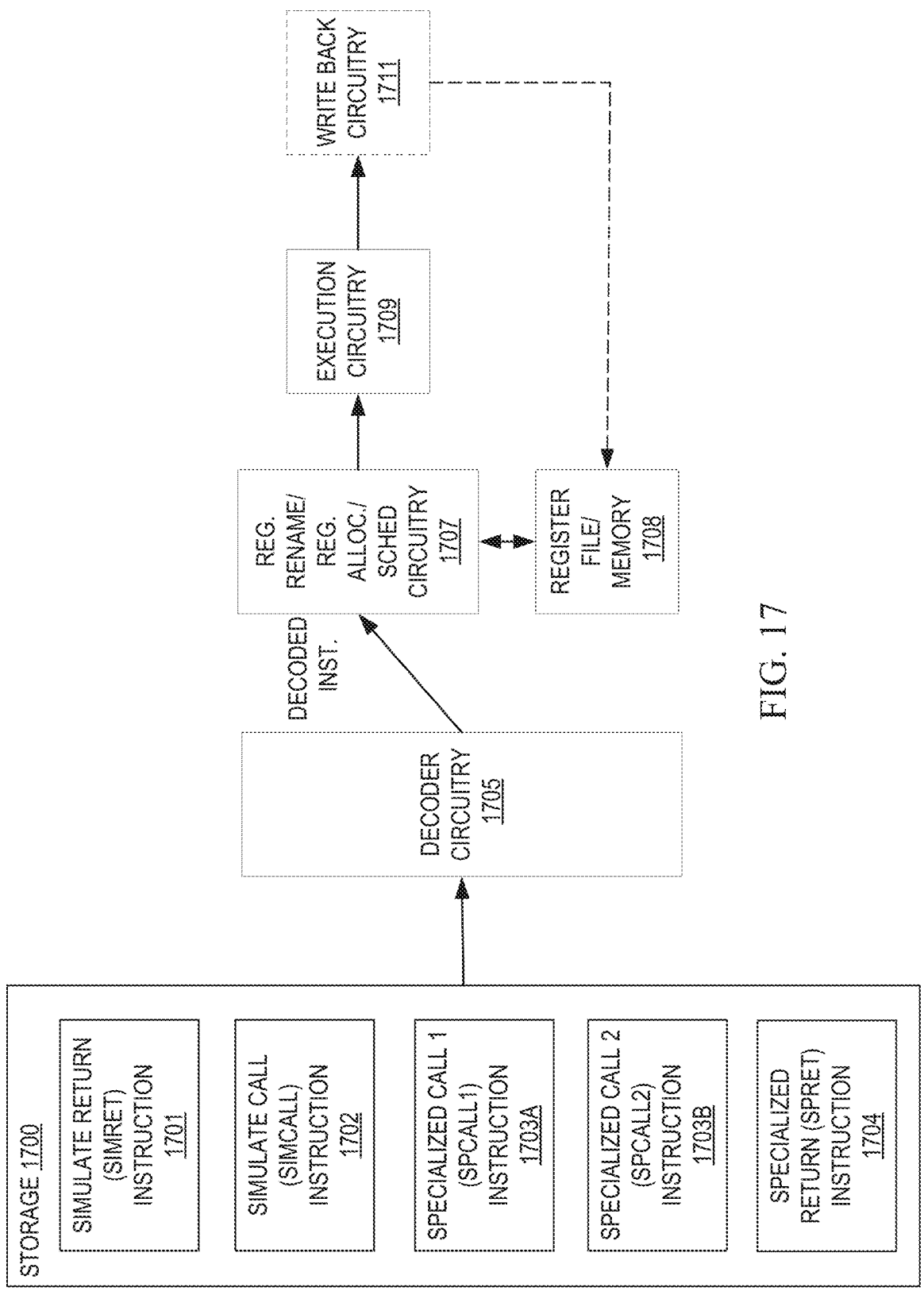
FIG. 17 illustrates example computing hardware to process an instruction according to one or more embodiments.

FIG. 17 illustrates examples of hardware to process instructions. The instructions may be FUNCTION instructions, such as SIMRET and SIMCALL instructions. As illustrated, storage 1700 stores a SIMRET instruction 1701, a SIMCALL instruction 1702, a first SPCALL1 instruction 1703A, a second SPCALL2 instruction 1703B, and a SPRET instruction 1704 to be executed.

Each instruction 1701-1704 is received by decoder circuitry 1705. For example, the decoder circuitry 1705 receives the instruction from fetch circuitry (not shown). The instruction may be in any suitable format, such as that described with reference to FIG. 27 below. In an example, the instruction includes fields for an opcode and a source operand (e.g., REG). In some examples, the sources operands are registers, and in other examples one or more are memory locations. In some examples, one or more of the sources may be an immediate operand. In some examples, the opcode of a simulate return instruction (e.g., SIMRET) 1701 details a simulated return from a callee to a caller to be performed. In some other examples, the opcode of a simulate call instruction (e.g., SIMCALL) 1702 details a simulated call from a caller to a callee to be performed. In some other examples, the opcode of a first specialized call instruction (e.g., SPCALL1) 1703A details a first specialized call from a caller to a callee to be performed. In some other examples, the opcode of a second specialized call instruction (e.g., SPCALL2) 1703B details a second specialized call from a caller to a callee to be performed. In some other examples, the opcode of a specialized return instruction (e.g., SPRET) 1704 details a specialized return from a callee to a caller to be performed.

More detailed examples of at least one instruction format for the instruction will be detailed later. The decoder circuitry 1705 decodes the instruction into one or more operations. In some examples, this decoding includes generating a plurality of micro-operations to be performed by execution circuitry (such as execution circuitry 1709). The decoder circuitry 1705 also decodes instruction prefixes.

In some examples, register renaming, register allocation, and/or scheduling circuitry 1707 provides functionality for one or more of: 1) renaming logical operand values to physical operand values (e.g., a register alias table in some examples), 2) allocating status bits and flags to the decoded instruction, and 3) scheduling the decoded instruction for execution by execution circuitry out of an instruction pool (e.g., using a reservation station in some examples).

Registers (register file) and/or memory 1708 store data as operands of the instruction to be operated on by execution circuitry 1709. Exemplary register types include packed data registers, general purpose registers (GPRs), and floating-point registers.

Execution circuitry 1709 executes the decoded instruction. Exemplary detailed execution circuitry includes execution cluster(s) 2460 shown in FIG. 24(B), and other execution circuitry detailed herein, etc. The execution of the decoded instruction causes the execution circuitry to simulate a return or simulate a call in stack memory in response to the occurrence of an exception.

In some examples, retirement/write back circuitry 1711 architecturally commits the destination register into the registers or memory 1708 and retires the instruction.

An example of a format for a simulate return instruction and for a simulate call instruction is OPCODE SRC1. In some examples, OPCODE is the opcode mnemonic of the instruction. DST is a field for the destination operand, such as packed data register or memory. SRC1 and SRC2 are fields for the source operands, such as packed data registers and/or memory. In some examples the simulate return instruction and the simulate call instruction can have different opcodes (e.g., SIMRET, SIMCALL) and the same source operand (e.g., REG). An example of a format for a first specialized call instruction and for a second specialized call instruction is OPCODE SRC1. The operand can specify the address of the first instruction to be executed in the called function. An example of a format for a specialized return instruction is OPCODE SRC1. The operand may be optional and if used, may specify the number of stack bytes to release (e.g., stack-based arguments).

Figure 18:
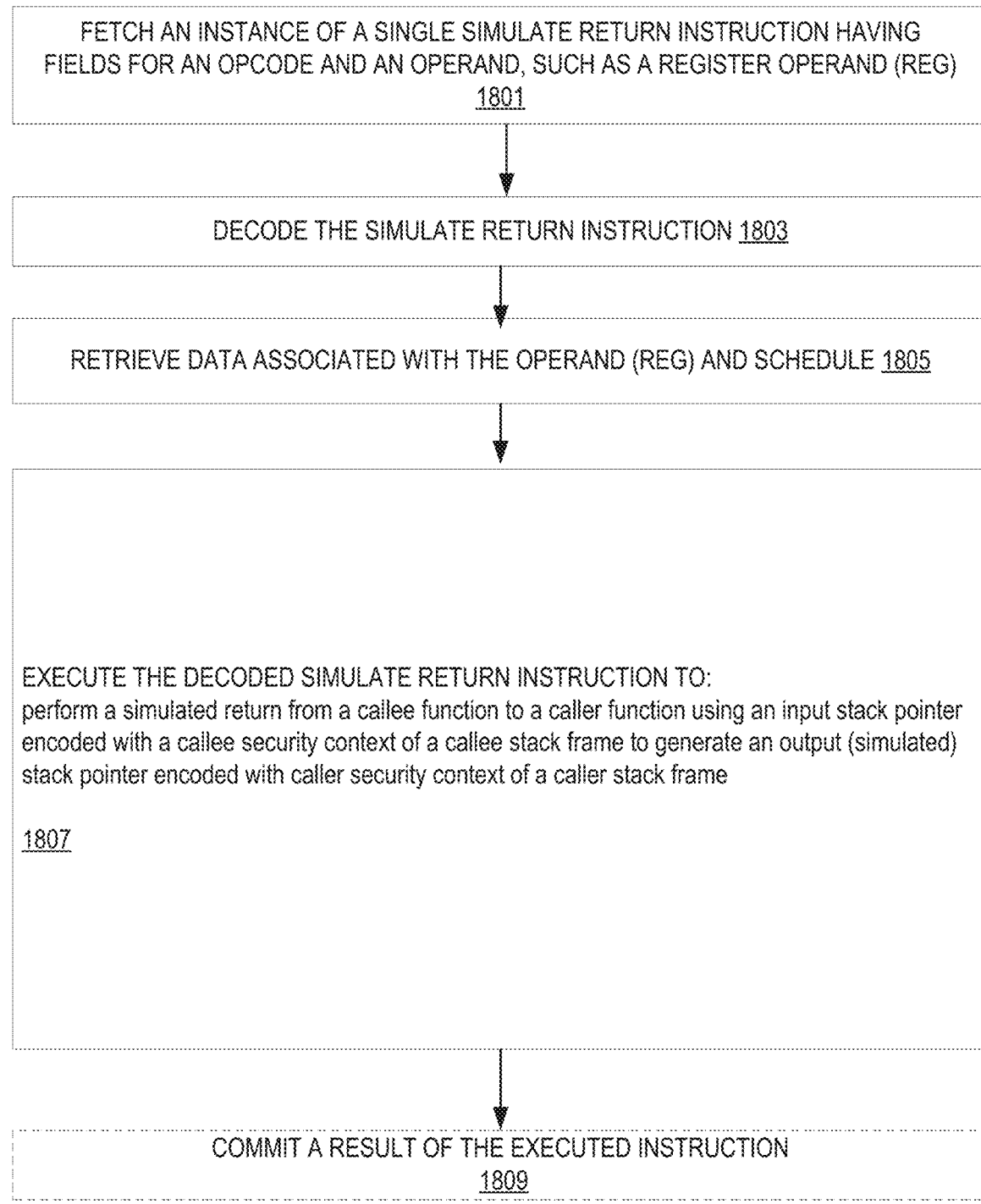
FIG. 18 illustrates an example method performed by a processor to process a simulate return (SIMRET) instruction according to at least one embodiment.

FIG. 18 illustrates an example method performed by a processor to process a simulate return instruction. For example, a processor core as shown in FIG. 24B, a pipeline as detailed below, a processor 102 as shown in FIG. 1, etc., performs this method.

At 1801, an instance of single instruction is fetched. For example, a simulate return instruction is fetched. The instruction includes fields for an opcode (e.g., SIMRET) and a source operand (e.g., REG) for an input stack pointer. In some examples, the instruction further includes a field for a writemask. In some examples, the instruction is fetched from an instruction cache. The opcode indicates operations to simulate a return instruction using a simulated execution state.

The fetched instruction is decoded at 1803. For example, the fetched simulate return instruction is decoded by decoder circuitry such as decoder circuitry 1705, decode circuitry 2440, or other decoder circuitry detailed herein.

Data values associated with the source operand (e.g., REG) of the decoded instruction are retrieved when the decoded instruction is scheduled at 1805. For example, when a source operand is a memory operand, the data from the indicated memory location is retrieved.

At 1807, the decoded instruction is executed by execution circuitry (hardware) such as execution circuitry 1709 shown in FIG. 17, execution cluster(s) 2460 shown in FIG. 24B, or other execution circuitry detailed herein. For the simulate return instruction, the execution causes execution circuitry to perform one or more operations described in connection with at least FIGS. 10 and 11. In various examples, the execution circuitry performs a simulated return from a callee function to a caller function based on an input stack pointer encoded with a callee security context of a callee stack frame associated with the callee function.

In some examples, the instruction is committed or retired at 1809.

FIG. 19 illustrates an example of a method to process a simulate return instruction using emulation or binary translation. For example, a processor core as shown in FIG. 24B, a processor 102 as shown in FIG. 1, a pipeline and/or emulation/translation layer perform aspects of this method.

An instance of a single instruction of a first instruction set architecture is fetched at 1901. The instance of the single instruction of the first instruction set architecture including fields for an opcode (e.g., SIMRET) and a source operand (e.g., REG) for an input stack pointer. In some examples, the instruction further includes a field for a writemask. In some examples, the instruction is fetched from an instruction cache. The opcode indicates operations to simulate a return instruction using a simulated execution state.

Figure 33:
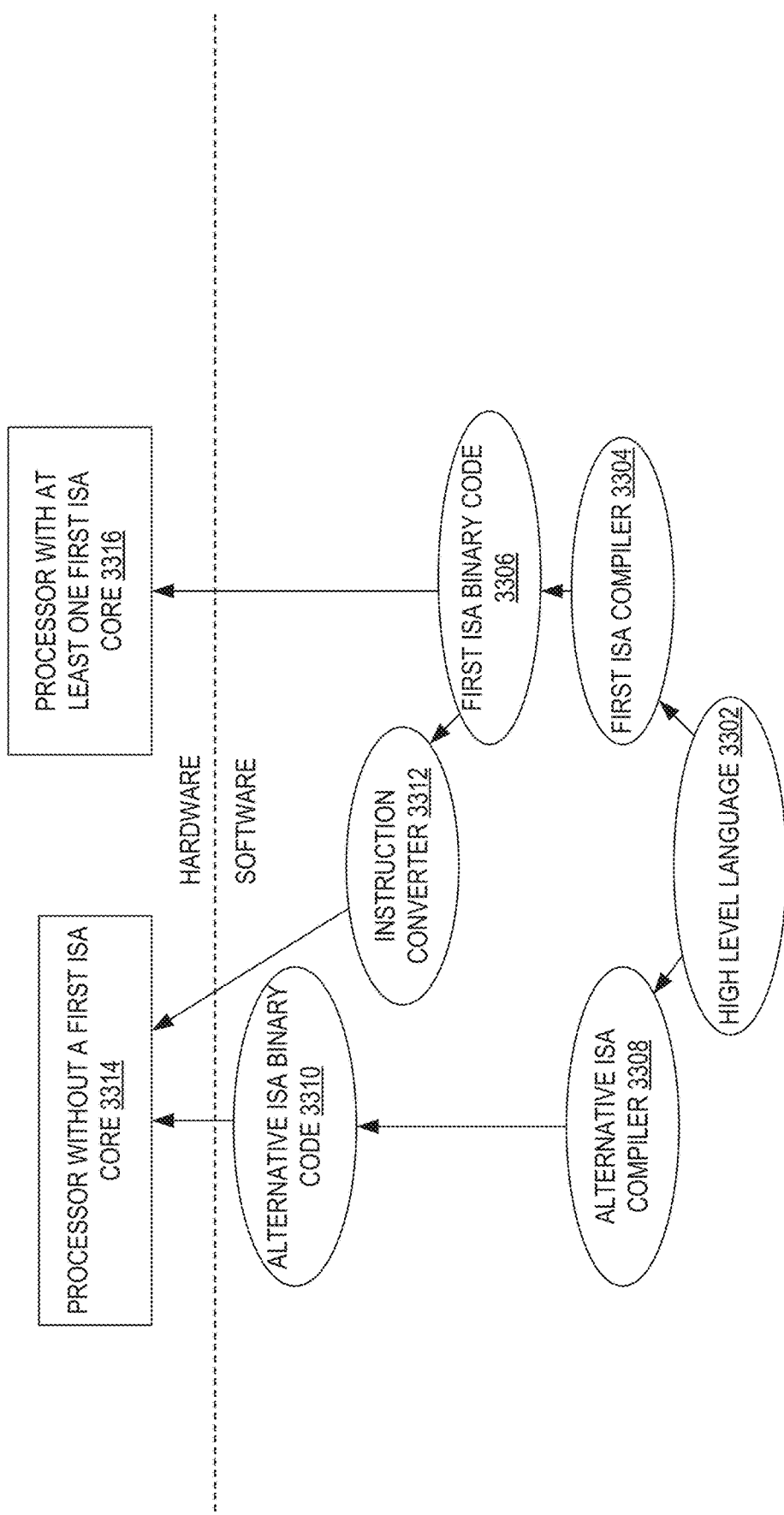
FIG. 33 is a block diagram illustrating the use of a software instruction converter to convert binary instructions in a source instruction set architecture to binary instructions in a target instruction set architecture according to examples.

The fetched single instruction of the first instruction set architecture is translated into one or more instructions of a second instruction set architecture at 1902. This translation is performed by a translation and/or emulation layer of software in some examples. In some examples, this translation is performed by an instruction converter 3312 as shown in FIG. 33. In some examples, the translation is performed by hardware translation circuitry.

The one or more translated instructions of the second instruction set architecture are decoded at 1903. For example, the translated instructions are decoded by decoder circuitry such as decoder circuitry 1705, decode circuitry 2440, or other decoder circuitry detailed herein. In some examples, the operations of translation and decoding at 1902 and 1903 are merged.

Data values associated with the source operand (e.g., REG) of the decoded one or more instructions of the second instruction set architecture are retrieved and the one or more instructions are scheduled at 1905. For example, when a source operand is a memory operand, the data from the indicated memory location is retrieved.

At 1907, the decoded instruction(s) of the second instruction set architecture is/are executed by execution circuitry (hardware) such as execution circuitry 1709 shown in FIG. 17, execution cluster(s) 2460 shown in FIG. 24B, or other execution circuitry detailed herein to perform the operation(s) indicated by the opcode of the single instruction of the first instruction set architecture. For the simulate return instruction, the execution causes execution circuitry to perform the operations described in connection with at least FIGS. 10 and 11. In various examples, the execution circuitry performs a simulated return from a callee function to a caller function based on an input stack pointer encoded with a callee security context of a callee stack frame associated with the callee function.

In some examples, the instruction is committed or retired at 1909.

Figure 20:
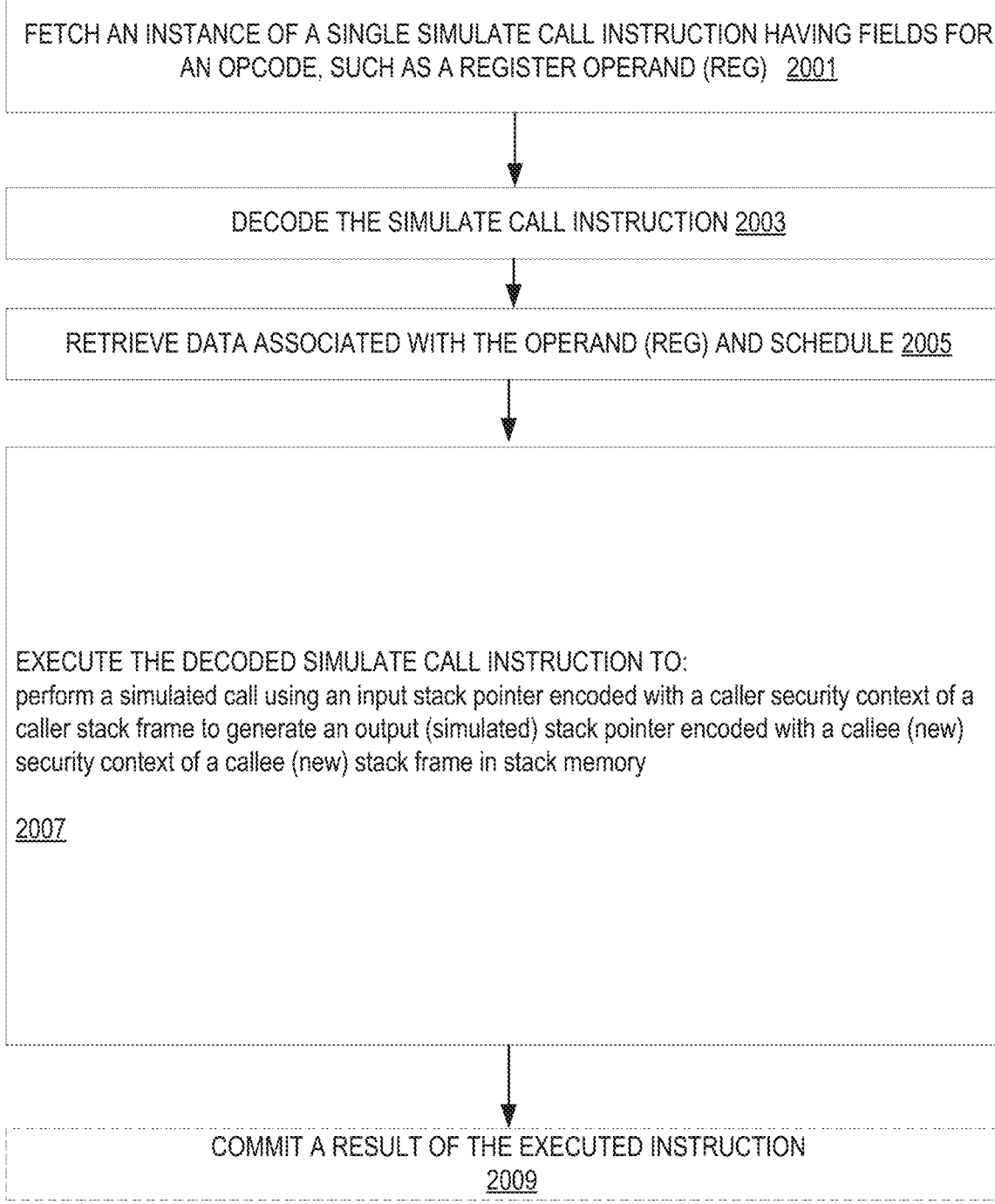
FIG. 20 illustrates an example method performed by a processor to process a simulate call (SIMCALL) instruction according to at least one embodiment.

FIG. 20 illustrates an example of method performed by a processor to process a simulate call instruction. For example, a processor core as shown in FIG. 24(B), a pipeline as detailed below, a processor 102 as shown in FIG. 1, etc., performs this method.

At 2001, an instance of single instruction is fetched. For example, a simulate call instruction is fetched. The instruction includes fields for an opcode (e.g., SIMCALL) and a source operand (e.g., REG) for an input stack pointer. In some examples, the instruction further includes a field for a writemask. In some examples, the instruction is fetched from an instruction cache. The opcode indicates operations to simulate a call instruction to perform.

The fetched instruction is decoded at 2003. For example, the fetched simulate call instruction is decoded by decoder circuitry such as decoder circuitry 1705, decode circuitry 2440, or other decoder circuitry detailed herein.

Data values associated with the source operand (e.g., REG) of the decoded instruction are retrieved when the decoded instruction is scheduled at 2005. For example, when a source operand is a memory operand, the data from the indicated memory location is retrieved.

At 2007, the decoded instruction is executed by execution circuitry (hardware) such as execution circuitry 1709 shown in FIG. 17, execution cluster(s) 2460 shown in FIG. 24B, or other execution circuitry detailed herein. For the simulate call instruction, the execution causes execution circuitry to perform the operations described in connection with at least FIGS. 10 and 12. In various examples, the execution circuitry uses an input stack pointer encoded with a caller security context of a caller stack frame to generate an output stack pointer encoded with a new security context of a new stack frame.

In some examples, the instruction is committed or retired at 2009.

Figure 21:
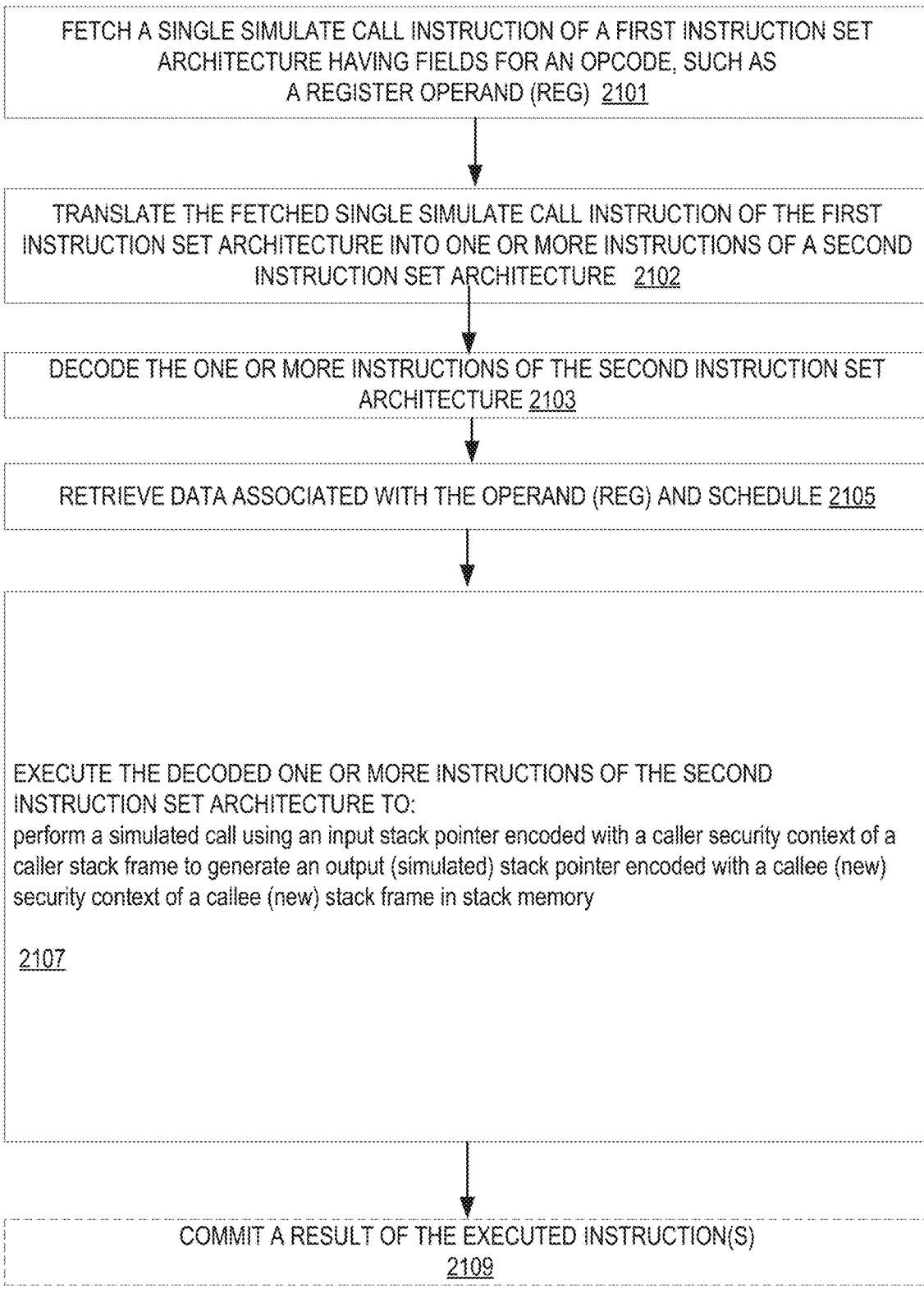
FIG. 21 illustrates an example method to process simulate call (SIMCALL) instruction using emulation or binary translation according to at least one embodiment.

FIG. 21 illustrates an example of a method to process a simulate call instruction using emulation or binary translation. For example, a processor core as shown in FIG. 24(B), a pipeline and/or emulation/translation layer perform aspects of this method.

An instance of a single instruction of a first instruction set architecture is fetched at 2101. The instance of the single instruction of the first instruction set architecture including fields for an opcode (e.g., SIMCALL) and a source operand (e.g., REG) for an input stack pointer. In some examples, the instruction further includes a field for a writemask. In some examples, the instruction is fetched from an instruction cache. The opcode indicates operations to simulate a call instruction to perform.

The fetched single instruction of the first instruction set architecture is translated into one or more instructions of a second instruction set architecture at 1902. This translation is performed by a translation and/or emulation layer of software in some examples. In some examples, this translation is performed by an instruction converter 3312 as shown in FIG. 33. In some examples, the translation is performed by hardware translation circuitry.

The one or more translated instructions of the second instruction set architecture are decoded at 2103. For example, the translated instructions are decoded by decoder circuitry such as decoder circuitry 1705, decode circuitry 2440, or other decoder circuitry detailed herein. In some examples, the operations of translation and decoding at 2102 and 2103 are merged.

Data values associated with the source operand (e.g., REG) of the decoded one or more instructions of the second instruction set architecture are retrieved and the one or more instructions are scheduled at 2105. For example, when a source operand is a memory operand, the data from the indicated memory location is retrieved.

At 2107, the decoded instruction(s) of the second instruction set architecture is/are executed by execution circuitry (hardware) such as execution circuitry 1709 shown in FIG. 17, execution cluster(s) 2460 shown in FIG. 24B, or other execution circuitry detailed herein to perform the operation(s) indicated by the opcode of the single instruction of the first instruction set architecture. For the simulate call instruction, the execution causes execution circuitry to perform the operations described in connection with at least FIGS. 10 and 12. In various examples, the execution circuitry uses an input stack pointer encoded with a caller security context of a caller stack frame to generate an output stack pointer encoded with a new security context of a new stack frame.

In some examples, the instruction is committed or retired at 2109.

Exemplary Computer Architectures.

Detailed below are describes of exemplary computer architectures. Other system designs and configurations known in the arts for laptop, desktop, and handheld personal computers (PC)s, personal digital assistants, engineering workstations, servers, disaggregated servers, network devices, network hubs, switches, routers, embedded processors, digital signal processors (DSPs), graphics devices, video game devices, set-top boxes, micro controllers, cell phones, portable media players, hand-held devices, and various other electronic devices, are also suitable. In general, a variety of systems or electronic devices capable of incorporating a processor and/or other execution logic as disclosed herein are generally suitable.

Figure 22:
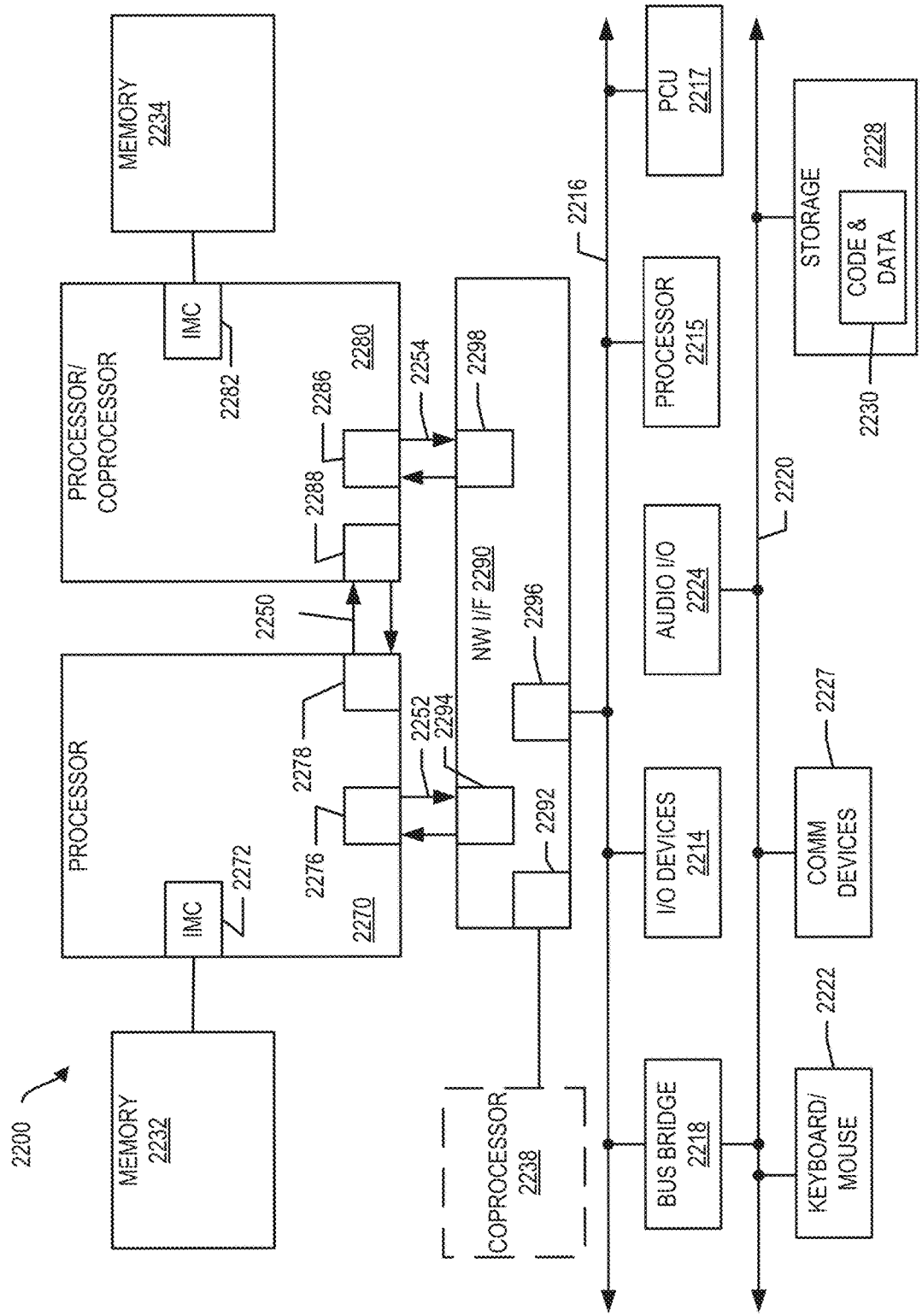
FIG. 22 illustrates an example system.

FIG. 22 illustrates an exemplary system. Multiprocessor system 2200 is a point-to-point interconnect system and includes a plurality of processors including a first processor 2270 and a second processor 2280 coupled via a point-to-point interconnect 2250. In some examples, the first processor 2270 and the second processor 2280 are homogeneous. In some examples, first processor 2270 and the second processor 2280 are heterogenous. Though the exemplary system 2200 is shown to have two processors, the system may have three or more processors, or may be a single processor system.

Processors 2270 and 2280 are shown including integrated memory controller (IMC) circuitry 2272 and 2282, respectively. Processor 2270 also includes as part of its interconnect controller point-to-point (P-P) interfaces 2276 and 2278; similarly, second processor 2280 includes P-P interfaces 2286 and 2288. Processors 2270, 2280 may exchange information via the point-to-point (P-P) interconnect 2250 using P-P interface circuits 2278, 2288. IMCs 2272 and 2282 couple the processors 2270, 2280 to respective memories, namely a memory 2232 and a memory 2234, which may be portions of main memory locally attached to the respective processors.

Processors 2270, 2280 may each exchange information with a chipset 2290 via individual P-P interconnects 2252, 2254 using point to point interface circuits 2276, 2294, 2286, 2298. Chipset 2290 may optionally exchange information with a coprocessor 2238 via an interface 2292. In some examples, the coprocessor 2238 is a special-purpose processor, such as, for example, a high-throughput processor, a network or communication processor, compression engine, graphics processor, general purpose graphics processing unit (GPGPU), neural-network processing unit (NPU), embedded processor, or the like.

A shared cache (not shown) may be included in either processor 2270, 2280 or outside of both processors, yet connected with the processors via P-P interconnect, such that either or both processors' local cache information may be stored in the shared cache if a processor is placed into a low power mode.

Chipset 2290 may be coupled to a first interconnect 2216 via an interface 2296. In some examples, first interconnect 2216 may be a Peripheral Component Interconnect (PCI) interconnect, or an interconnect such as a PCI Express interconnect or another I/O interconnect. In some examples, one of the interconnects couples to a power control unit (PCU) 2217, which may include circuitry, software, and/or firmware to perform power management operations with regard to the processors 2270, 2280 and/or co-processor 2238. PCU 2217 provides control information to a voltage regulator (not shown) to cause the voltage regulator to generate the appropriate regulated voltage. PCU 2217 also provides control information to control the operating voltage generated. In various examples, PCU 2217 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 2217 is illustrated as being present as logic separate from the processor 2270 and/or processor 2280. In other cases, PCU 2217 may execute on a given one or more of cores (not shown) of processor 2270 or 2280. In some cases, PCU 2217 may be implemented as a microcontroller (dedicated or general-purpose) or other control logic configured to execute its own dedicated power management code, sometimes referred to as P-code. In yet other examples, power management operations to be performed by PCU 2217 may be implemented externally to a processor, such as by way of a separate power management integrated circuit (PMIC) or another component external to the processor. In yet other examples, power management operations to be performed by PCU 2217 may be implemented within BIOS or other system software.

Various I/O devices 2214 may be coupled to first interconnect 2216, along with a bus bridge 2218 which couples first interconnect 2216 to a second interconnect 2220. In some examples, one or more additional processor(s) 2215, such as coprocessors, high-throughput many integrated core (MIC) processors, GPGPUs, accelerators (such as graphics accelerators or digital signal processing (DSP) units), field programmable gate arrays (FPGAs), or any other processor, are coupled to first interconnect 2216. In some examples, second interconnect 2220 may be a low pin count (LPC) interconnect. Various devices may be coupled to second interconnect 2220 including, for example, a keyboard and/or mouse 2222, communication devices 2227 and a storage circuitry 2228. Storage circuitry 2228 may be one or more non-transitory machine-readable storage media as described below, such as a disk drive or other mass storage device which may include instructions/code and data 2230 and may implement the storage 1703 in some examples. Further, an audio I/O 2224 may be coupled to second interconnect 2220. Note that other architectures than the point-to-point architecture described above are possible. For example, instead of the point-to-point architecture, a system such as multiprocessor system 2200 may implement a multi-drop interconnect or other such architecture.

Exemplary Core Architectures, Processors, and Computer Architectures.

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may include on the same die as the described CPU (sometimes referred to as the application core(s) or application processor(s)), the above described coprocessor, and additional functionality. Exemplary core architectures are described next, followed by descriptions of exemplary processors and computer architectures.

Figure 23:
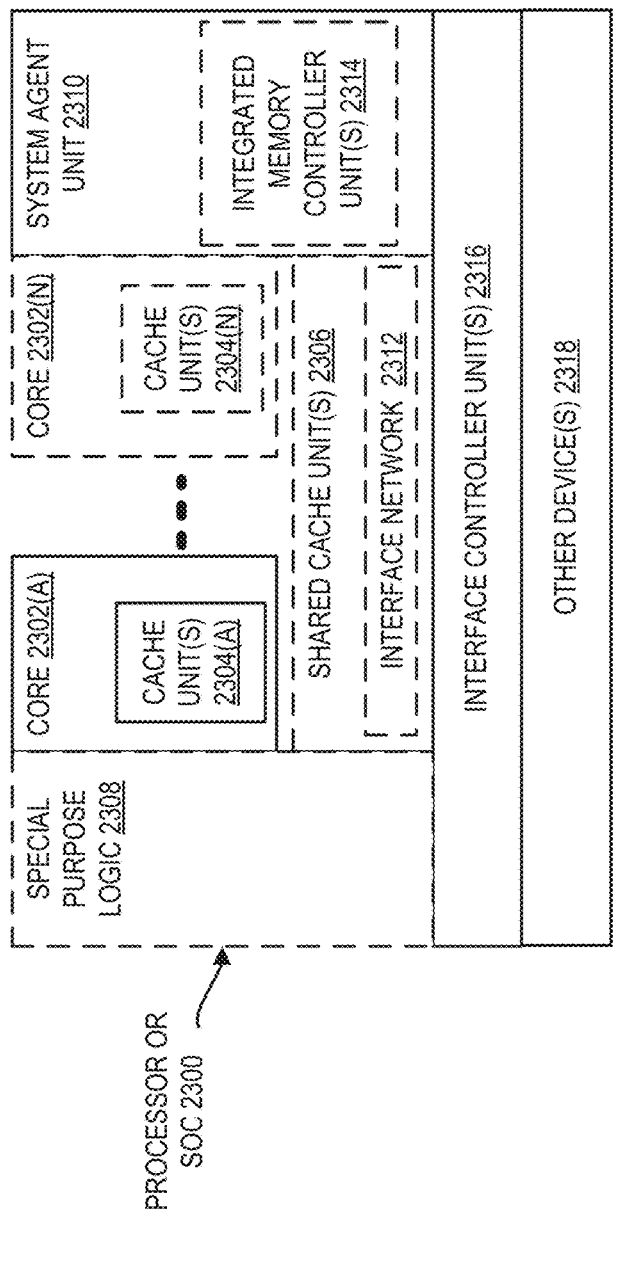
FIG. 23 illustrates a block diagram of an example processor that may have more than one core and an integrated memory controller.

FIG. 23 illustrates a block diagram of an example processor 2300 that may have more than one core and an integrated memory controller. The solid lined boxes illustrate a processor 2300 with a single core 2302A, a system agent unit circuitry 2310, a set of one or more interconnect controller unit(s) circuitry 2316, while the optional addition of the dashed lined boxes illustrates an alternative processor 2300 with multiple cores 2302(A)-(N), a set of one or more integrated memory controller unit(s) circuitry 2314 in the system agent unit circuitry 2310, and special purpose logic 2308, as well as a set of one or more interconnect controller units circuitry 2316. Note that the processor 2300 may be one of the processors 2270 or 2280, or co-processor 2238 or 2215 of FIG. 22.

Thus, different implementations of the processor 2300 may include: 1) a CPU with the special purpose logic 2308 being integrated graphics and/or scientific (throughput) logic (which may include one or more cores, not shown), and the cores 2302(A)-(N) being one or more general purpose cores (e.g., general purpose in-order cores, general purpose out-of-order cores, or a combination of the two); 2) a coprocessor with the cores 2302(A)-(N) being a large number of special purpose cores intended primarily for graphics and/or scientific (throughput); and 3) a coprocessor with the cores 2302(A)-(N) being a large number of general purpose in-order cores. Thus, the processor 2300 may be a general-purpose processor, coprocessor or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 2300 may be a part of and/or may be implemented on one or more substrates using any of a number of process technologies, such as, for example, complementary metal oxide semiconductor (CMOS), bipolar CMOS (BiCMOS), P-type metal oxide semiconductor (PMOS), or N-type metal oxide semiconductor (NMOS).

A memory hierarchy includes one or more levels of cache unit(s) circuitry 2304(A)-(N) within the cores 2302(A)-(N), a set of one or more shared cache unit(s) circuitry 2306, and external memory (not shown) coupled to the set of integrated memory controller unit(s) circuitry 2314. The set of one or more shared cache unit(s) circuitry 2306 may include one or more mid-level caches, such as level 2 (L2), level 3 (L3), level 4 (L4), or other levels of cache, such as a last level cache (LLC), and/or combinations thereof. While in some examples ring-based interconnect network circuitry 2312 interconnects the special purpose logic 2308 (e.g., integrated graphics logic), the set of shared cache unit(s) circuitry 2306, and the system agent unit circuitry 2310, alternative examples use any number of well-known techniques for interconnecting such units. In some examples, coherency is maintained between one or more of the shared cache unit(s) circuitry 2306 and cores 2302(A)-(N).

In some examples, one or more of the cores 2302(A)-(N) are capable of multi-threading. The system agent unit circuitry 2310 includes those components coordinating and operating cores 2302(A)-(N). The system agent unit circuitry 2310 may include, for example, power control unit (PCU) circuitry and/or display unit circuitry (not shown). The PCU may be or may include logic and components needed for regulating the power state of the cores 2302(A)-(N) and/or the special purpose logic 2308 (e.g., integrated graphics logic). The display unit circuitry is for driving one or more externally connected displays.

The cores 2302(A)-(N) may be homogenous in terms of instruction set architecture (ISA). Alternatively, the cores 2302(A)-(N) may be heterogeneous in terms of ISA; that is, a subset of the cores 2302(A)-(N) may be capable of executing an ISA, while other cores may be capable of executing only a subset of that ISA or another ISA.

Exemplary Core Architectures—In-Order and Out-of-Order Core Block Diagram.

Figure 24A:
FIG. 24A is a block diagram illustrating both an exemplary in-order pipeline and an exemplary register renaming, out-of-order issue/execution pipeline according to examples.
Figure 24B:
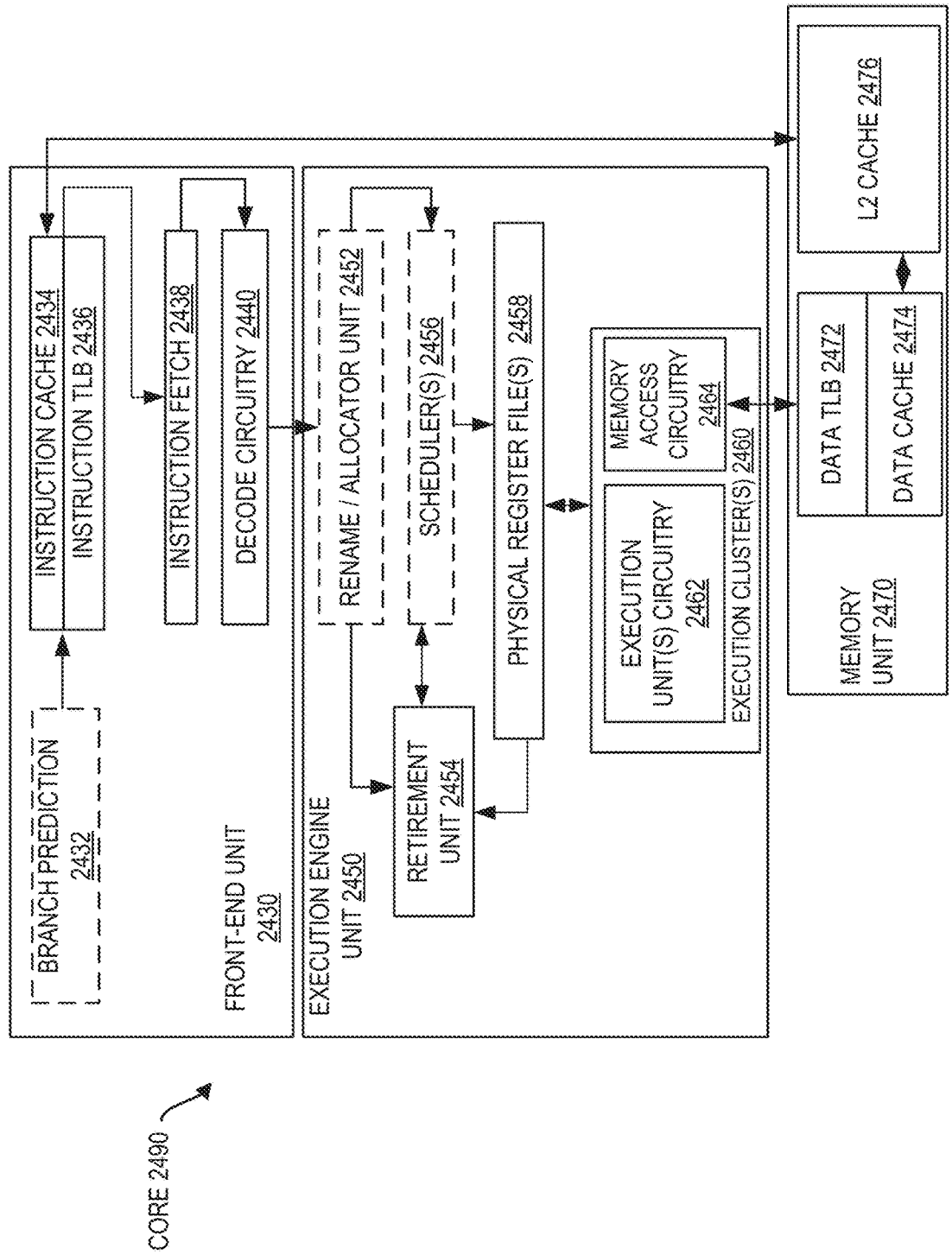
FIG. 24B is a block diagram illustrating both an exemplary example of an in-order architecture core and an exemplary register renaming, out-of-order issue/execution architecture core to be included in a processor according to examples.

FIG. 24(A) is a block diagram illustrating both an exemplary in-order pipeline and an exemplary register renaming, out-of-order issue/execution pipeline according to examples. FIG. 24(B) is a block diagram illustrating both an exemplary example of an in-order architecture core and an exemplary register renaming, out-of-order issue/execution architecture core to be included in a processor according to examples. The solid lined boxes in FIGS. 24(A)-(B) illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 24(A), a processor pipeline 2400 includes a fetch stage 2402, an optional length decoding stage 2404, a decode stage 2406, an optional allocation (Alloc) stage 2408, an optional renaming stage 2410, a schedule (also known as a dispatch or issue) stage 2412, an optional register read/memory read stage 2414, an execute stage 2416, a write back/memory write stage 2418, an optional exception handling stage 2422, and an optional commit stage 2424. One or more operations can be performed in each of these processor pipeline stages. For example, during the fetch stage 2402, one or more instructions are fetched from instruction memory, and during the decode stage 2406, the one or more fetched instructions may be decoded, addresses (e.g., load store unit (LSU) addresses) using forwarded register ports may be generated, and branch forwarding (e.g., immediate offset or a link register (LR)) may be performed. In one example, the decode stage 2406 and the register read/memory read stage 2414 may be combined into one pipeline stage. In one example, during the execute stage 2416, the decoded instructions may be executed, LSU address/data pipelining to an Advanced Microcontroller Bus (AMB) interface may be performed, multiply and add operations may be performed, arithmetic operations with branch results may be performed, etc.

By way of example, the exemplary register renaming, out-of-order issue/execution architecture core of FIG. 24(B) may implement the pipeline 2400 as follows: 1) the instruction fetch circuitry 2438 performs the fetch and length decoding stages 2402 and 2404; 2) the decode circuitry 2440 performs the decode stage 2406; 3) the rename/allocator unit circuitry 2452 performs the allocation stage 2408 and renaming stage 2410; 4) the scheduler(s) circuitry 2456 performs the schedule stage 2412; 5) the physical register file(s) circuitry 2458 and the memory unit circuitry 2470 perform the register read/memory read stage 2414; the execution cluster(s) 2460 perform the execute stage 2416; 6) the memory unit circuitry 2470 and the physical register file(s) circuitry 2458 perform the write back/memory write stage 2418; 7) various circuitry may be involved in the exception handling stage 2422; and 8) the retirement unit circuitry 2454 and the physical register file(s) circuitry 2458 perform the commit stage 2424.

FIG. 24(B) shows a processor core 2490 including front-end unit circuitry 2430 coupled to an execution engine unit circuitry 2450, and both are coupled to a memory unit circuitry 2470. The core 2490 may be a reduced instruction set architecture computing (RISC) core, a complex instruction set architecture computing (CISC) core, a very long instruction word (VLIW) core, or a hybrid or alternative core type. As yet another option, the core 2490 may be a special-purpose core, such as, for example, a network or communication core, compression engine, coprocessor core, general purpose computing graphics processing unit (GPGPU) core, graphics core, or the like.

The front end unit circuitry 2430 may include branch prediction circuitry 2432 coupled to an instruction cache circuitry 2434, which is coupled to an instruction translation lookaside buffer (TLB) 2436, which is coupled to instruction fetch circuitry 2438, which is coupled to decode circuitry 2440. In one example, the instruction cache circuitry 2434 is included in the memory unit circuitry 2470 rather than the front-end circuitry 2430. The decode circuitry 2440 (or decoder) may decode instructions, and generate as an output one or more micro-operations, micro-code entry points, microinstructions, other instructions, or other control signals, which are decoded from, or which otherwise reflect, or are derived from, the original instructions. The decode circuitry 2440 may further include an address generation unit (AGU, not shown) circuitry. In one example, the AGU generates an LSU address using forwarded register ports, and may further perform branch forwarding (e.g., immediate offset branch forwarding, LR register branch forwarding, etc.). The decode circuitry 2440 may be implemented using various different mechanisms. Examples of suitable mechanisms include, but are not limited to, look-up tables, hardware implementations, programmable logic arrays (PLAs), microcode read only memories (ROMs), etc. In one example, the core 2490 includes a microcode ROM (not shown) or other medium that stores microcode for certain macroinstructions (e.g., in decode circuitry 2440 or otherwise within the front end circuitry 2430). In one example, the decode circuitry 2440 includes a micro-operation (micro-op) or operation cache (not shown) to hold/cache decoded operations, micro-tags, or micro-operations generated during the decode or other stages of the processor pipeline 2400. The decode circuitry 2440 may be coupled to rename/allocator unit circuitry 2452 in the execution engine circuitry 2450.

The execution engine circuitry 2450 includes the rename/allocator unit circuitry 2452 coupled to a retirement unit circuitry 2454 and a set of one or more scheduler(s) circuitry 2456. The scheduler(s) circuitry 2456 represents any number of different schedulers, including reservations stations, central instruction window, etc. In some examples, the scheduler(s) circuitry 2456 can include arithmetic logic unit (ALU) scheduler/scheduling circuitry, ALU queues, arithmetic generation unit (AGU) scheduler/scheduling circuitry, AGU queues, etc. The scheduler(s) circuitry 2456 is coupled to the physical register file(s) circuitry 2458. Each of the physical register file(s) circuitry 2458 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) circuitry 2458 includes vector registers unit circuitry, writemask registers unit circuitry, and scalar register unit circuitry. These register units may provide architectural vector registers, vector mask registers, general-purpose registers, etc. The physical register file(s) circuitry 2458 is coupled to the retirement unit circuitry 2454 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 2454 and the physical register file(s) circuitry 2458 are coupled to the execution cluster(s) 2460. The execution cluster(s) 2460 includes a set of one or more execution unit(s) circuitry 2462 and a set of one or more memory access circuitry 2464. The execution unit(s) circuitry 2462 may perform various arithmetic, logic, floating-point or other types of operations (e.g., shifts, addition, subtraction, multiplication) and on various types of data (e.g., scalar integer, scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 2456, physical register file(s) circuitry 2458, and execution cluster(s) 2460 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) circuitry, and/or execution cluster—and in the case of a separate memory access pipeline, certain examples are implemented in which only the execution cluster of this pipeline has the memory access unit(s) circuitry 2464). It should also be understood that where separate pipelines are used, one or more of these pipelines may be out-of-order issue/execution and the rest in-order.

In some examples, the execution engine unit circuitry 2450 may perform load store unit (LSU) address/data pipelining to an Advanced Microcontroller Bus (AMB) interface (not shown), and address phase and writeback, data phase load, store, and branches.

The set of memory access circuitry 2464 is coupled to the memory unit circuitry 2470, which includes data TLB circuitry 2472 coupled to a data cache circuitry 2474 coupled to a level 2 (L2) cache circuitry 2476. In one exemplary example, the memory access circuitry 2464 may include a load unit circuitry, a store address unit circuit, and a store data unit circuitry, each of which is coupled to the data TLB circuitry 2472 in the memory unit circuitry 2470. The instruction cache circuitry 2434 is further coupled to the level 2 (L2) cache circuitry 2476 in the memory unit circuitry 2470. In one example, the instruction cache 2434 and the data cache 2474 are combined into a single instruction and data cache (not shown) in L2 cache circuitry 2476, a level 3 (L3) cache circuitry (not shown), and/or main memory. The L2 cache circuitry 2476 is coupled to one or more other levels of cache and eventually to a main memory.

The core 2490 may support one or more instructions sets (e.g., the x86 instruction set architecture (optionally with some extensions that have been added with newer versions); the MIPS instruction set architecture; the ARM instruction set architecture (optionally with optional additional extensions such as NEON)), including the instruction(s) described herein. In one example, the core 2490 includes logic to support a packed data instruction set architecture extension (e.g., AVX1, AVX2), thereby allowing the operations used by many multimedia applications to be performed using packed data.

Exemplary Execution Unit(s) Circuitry.

Figure 25:
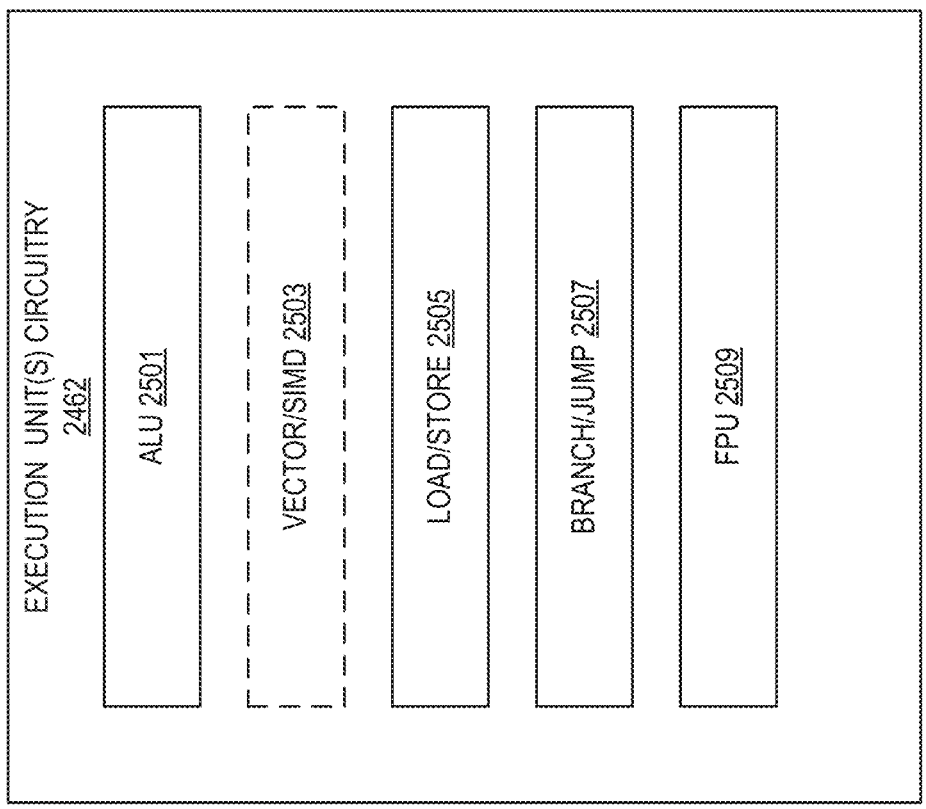
FIG. 25 illustrates examples of execution unit(s) circuitry.

FIG. 25 illustrates examples of execution unit(s) circuitry, such as execution unit(s) circuitry 2462 of FIG. 24(B). As illustrated, execution unit(s) circuitry 2462 may include one or more ALU circuits 2501, optional vector/single instruction multiple data (SIMD) circuits 2503, load/store circuits 2505, branch/jump circuits 2507, and/or Floating-point unit (FPU) circuits 2509. ALU circuits 2501 perform integer arithmetic and/or Boolean operations. Vector/SIMD circuits 2503 perform vector/SIMD operations on packed data (such as SIMD/vector registers). Load/store circuits 2505 execute load and store instructions to load data from memory into registers or store from registers to memory. Load/store circuits 2505 may also generate addresses. Branch/jump circuits 2507 cause a branch or jump to a memory address depending on the instruction. FPU circuits 2509 perform floating-point arithmetic. The width of the execution unit(s) circuitry 2462 varies depending upon the example and can range from 16-bit to 1,024-bit, for example. In some examples, two or more smaller execution units are logically combined to form a larger execution unit (e.g., two 128-bit execution units are logically combined to form a 256-bit execution unit).

Exemplary Register Architecture

Figure 26:
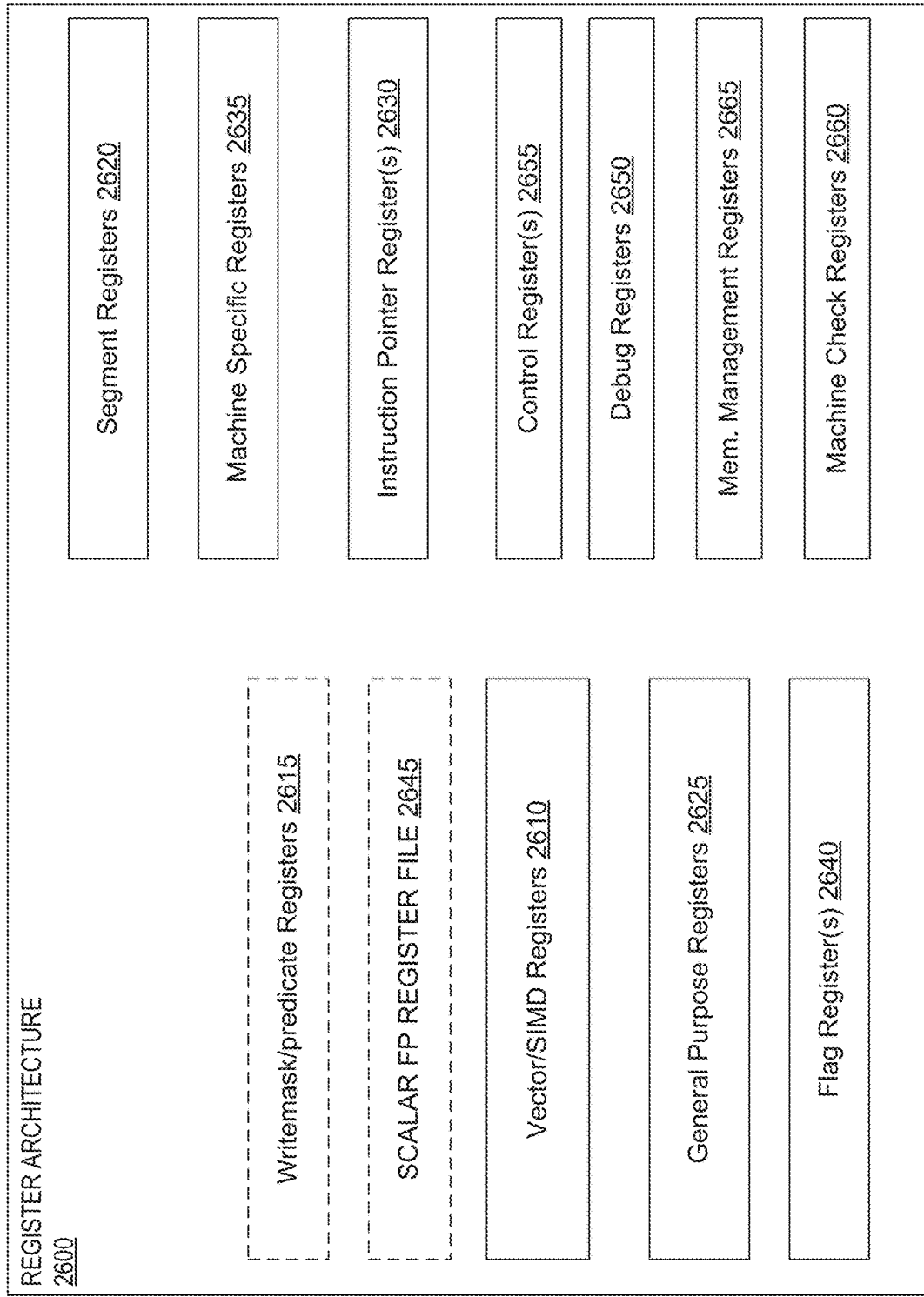
FIG. 26 is a block diagram of a register architecture according to some examples.

FIG. 26 is a block diagram of a register architecture 2600 according to some examples. As illustrated, the register architecture 2600 includes vector/SIMD registers 2610 that vary from 128-bit to 1,024 bits width. In some examples, the vector/SIMD registers 2610 are physically 512-bits and, depending upon the mapping, only some of the lower bits are used. For example, in some examples, the vector/SIMD registers 2610 are ZMM registers which are 512 bits: the lower 256 bits are used for YMM registers and the lower 128 bits are used for XMM registers. As such, there is an overlay of registers. In some examples, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the example.

In some examples, the register architecture 2600 includes writemask/predicate registers 2615. For example, in some examples, there are 8 writemask/predicate registers (sometimes called k0 through k7) that are each 16-bit, 32-bit, 64-bit, or 128-bit in size. Writemask/predicate registers 2615 may allow for merging (e.g., allowing any set of elements in the destination to be protected from updates during the execution of any operation) and/or zeroing (e.g., zeroing vector masks allow any set of elements in the destination to be zeroed during the execution of any operation). In some examples, each data element position in a given writemask/predicate register 2615 corresponds to a data element position of the destination. In other examples, the writemask/predicate registers 2615 are scalable and consists of a set number of enable bits for a given vector element (e.g., 8 enable bits per 64-bit vector element).

The register architecture 2600 includes a plurality of general-purpose registers 2625. These registers may be 16-bit, 32-bit, 64-bit, etc. and can be used for scalar operations. In some examples, these registers are referenced by the names RAX, RBX, RCX, RDX, RBP, RSI, RDI, RSP, and R8 through R15.

In some examples, the register architecture 2600 includes scalar floating-point (FP) register 2645 which is used for scalar floating-point operations on 32/64/80-bit floating-point data using the x87 instruction set architecture extension or as MMX registers to perform operations on 64-bit packed integer data, as well as to hold operands for some operations performed between the MMX and XMM registers.

One or more flag registers 2640 (e.g., EFLAGS, RFLAGS, etc.) store status and control information for arithmetic, compare, and system operations. For example, the one or more flag registers 2640 may store condition code information such as carry, parity, auxiliary carry, zero, sign, and overflow. In some examples, the one or more flag registers 2640 are called program status and control registers.

Segment registers 2620 contain segment points for use in accessing memory. In some examples, these registers are referenced by the names CS, DS, SS, ES, FS, and GS.

Machine specific registers (MSRs) 2635 control and report on processor performance. Most MSRs 2635 handle system-related functions and are not accessible to an application program. Machine check registers 2660 consist of control, status, and error reporting MSRs that are used to detect and report on hardware errors.

One or more instruction pointer register(s) 2630 store an instruction pointer value. Control register(s) 2655 (e.g., CR0-CR4) determine the operating mode of a processor (e.g., processor 2270, 2280, 2238, 2215, and/or 2300) and the characteristics of a currently executing task. Debug registers 2650 control and allow for the monitoring of a processor or core's debugging operations.

Memory (mem) management registers 2665 specify the locations of data structures used in protected mode memory management. These registers may include a GDTR, IDRT, task register, and a LDTR register.

Alternative examples may use wider or narrower registers. Additionally, alternative examples may use more, less, or different register files and registers. The register architecture 2600 may, for example, be used in register file/memory 1708, or physical register file(s) circuitry 2458.

Instruction set architectures.

An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down through the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. In addition, though the description below is made in the context of x86 ISA, it is within the knowledge of one skilled in the art to apply the teachings of the present disclosure in another ISA.

Exemplary Instruction Formats.

Examples of the instruction(s) described herein may be embodied in different formats. Additionally, exemplary systems, architectures, and pipelines are detailed below. Examples of the instruction(s) may be executed on such systems, architectures, and pipelines, but are not limited to those detailed.

Figure 27:
FIG. 27 illustrates examples of an instruction format.

FIG. 27 illustrates examples of an instruction format. As illustrated, an instruction may include multiple components including, but not limited to, one or more fields for: one or more prefixes 2701, an opcode 2703, addressing information 2705 (e.g., register identifiers, memory addressing information, etc.), a displacement value 2707, and/or an immediate value 2709. Note that some instructions utilize some or all of the fields of the format whereas others may only use the field for the opcode 2703. In some examples, the order illustrated is the order in which these fields are to be encoded, however, it should be appreciated that in other examples these fields may be encoded in a different order, combined, etc.

The prefix(es) field(s) 2701, when used, modifies an instruction. In some examples, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 2703 is used to at least partially define the operation to be performed upon a decoding of the instruction. In some examples, a primary opcode encoded in the opcode field 2703 is one, two, or three bytes in length. In other examples, a primary opcode can be a different length. An additional 3-bit opcode field is sometimes encoded in another field.

Figure 28:
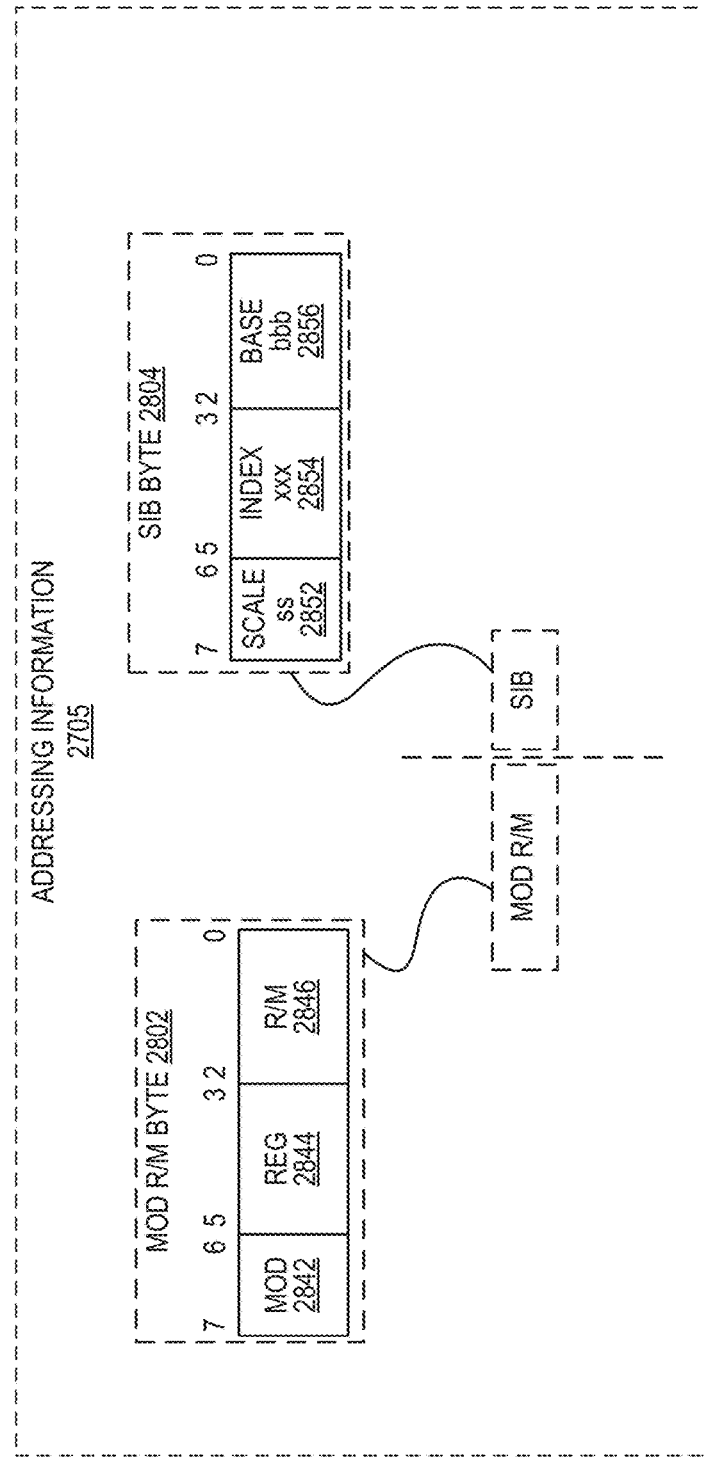
FIG. 28 illustrates examples of an addressing field.

The addressing field 2705 is used to address one or more operands of the instruction, such as a location in memory or one or more registers. FIG. 28 illustrates examples of the addressing field 2705. In this illustration, an optional ModR/M byte 2802 and an optional Scale, Index, Base (SIB) byte 2804 are shown. The ModR/M byte 2802 and the SIB byte 2804 are used to encode up to two operands of an instruction, each of which is a direct register or effective memory address. Note that each of these fields are optional in that not all instructions include one or more of these fields. The MOD R/M byte 2802 includes a MOD field 2842, a register (reg) field 2844, and R/M field 2846.

The content of the MOD field 2842 distinguishes between memory access and non-memory access modes. In some examples, when the MOD field 2842 has a binary value of 11 (11 b), a register-direct addressing mode is utilized, and otherwise register-indirect addressing is used.

The register field 2844 may encode either the destination register operand or a source register operand, or may encode an opcode extension and not be used to encode any instruction operand. The content of register index field 2844, directly or through address generation, specifies the locations of a source or destination operand (either in a register or in memory). In some examples, the register field 2844 is supplemented with an additional bit from a prefix (e.g., prefix 2701) to allow for greater addressing.

The R/M field 2846 may be used to encode an instruction operand that references a memory address or may be used to encode either the destination register operand or a source register operand. Note the R/M field 2846 may be combined with the MOD field 2842 to dictate an addressing mode in some examples.

The SIB byte 2804 includes a scale field 2852, an index field 2854, and a base field 2856 to be used in the generation of an address. The scale field 2852 indicates scaling factor. The index field 2854 specifies an index register to use. In some examples, the index field 2854 is supplemented with an additional bit from a prefix (e.g., prefix 2701) to allow for greater addressing. The base field 2856 specifies a base register to use. In some examples, the base field 2856 is supplemented with an additional bit from a prefix (e.g., prefix 2701) to allow for greater addressing. In practice, the content of the scale field 2852 allows for the scaling of the content of the index field 2854 for memory address generation (e.g., for address generation that uses $2^{scale}$*index+base).

Some addressing forms utilize a displacement value to generate a memory address. For example, a memory address may be generated according to $2^{scale}$*index+base+displacement, index*scale+displacement, r/m+displacement, instruction pointer (RIP/EIP)+displacement, register+displacement, etc. The displacement may be a 1-byte, 2-byte, 4-byte, etc. value. In some examples, a displacement 2707 provides this value. Additionally, in some examples, a displacement factor usage is encoded in the MOD field of the addressing field 2705 that indicates a compressed displacement scheme for which a displacement value is calculated and stored in the displacement field 2707.

In some examples, an immediate field 2709 specifies an immediate value for the instruction. An immediate value may be encoded as a 1-byte value, a 2-byte value, a 4-byte value, etc.

Figure 29:
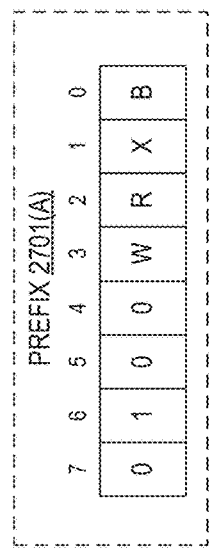
FIG. 29 illustrates examples of a first prefix.

FIG. 29 illustrates examples of a first prefix 2701(A). In some examples, the first prefix 2701(A) is an example of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 2701(A) may specify up to three registers using 3-bit fields depending on the format: 1) using the reg field 2844 and the R/M field 2846 of the Mod R/M byte 2802; 2) using the Mod R/M byte 2802 with the SIB byte 2804 including using the reg field 2844 and the base field 2856 and index field 2854; or 3) using the register field of an opcode.

In the first prefix 2701(A), bit positions 7:4 are set as 0100. Bit position 3 (W) can be used to determine the operand size but may not solely determine operand width. As such, when W=0, the operand size is determined by a code segment descriptor (CS.D) and when W=1, the operand size is 64-bit.

Note that the addition of another bit allows for 16 ($2^4$) registers to be addressed, whereas the MOD R/M reg field 2844 and MOD R/M R/M field 2846 alone can each only address 8 registers.

In the first prefix 2701(A), bit position 2 (R) may be an extension of the MOD R/M reg field 2844 and may be used to modify the ModR/M reg field 2844 when that field encodes a general-purpose register, a 64-bit packed data register (e.g., a SSE register), or a control or debug register. R is ignored when Mod R/M byte 2802 specifies other registers or defines an extended opcode.

Bit position 1 (X) may modify the SIB byte index field 2854.

Bit position 0 (B) may modify the base in the Mod R/M R/M field 2846 or the SIB byte base field 2856; or it may modify the opcode register field used for accessing general purpose registers (e.g., general purpose registers 2625).

Figure 30A:
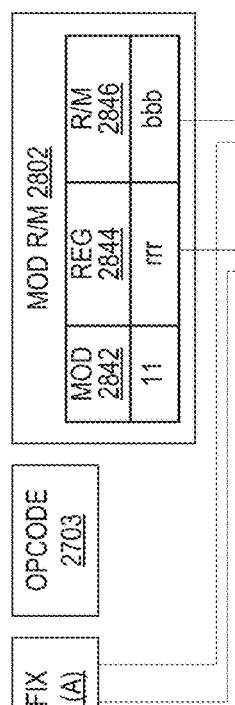
FIGS. 30A-D illustrate examples of how the R, X, and B fields of the first prefix in FIG. 29 are used.
Figure 30B:
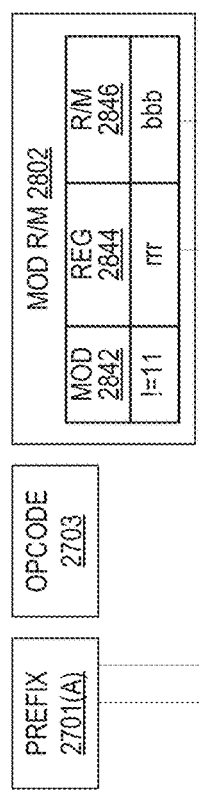
Figure 30D:
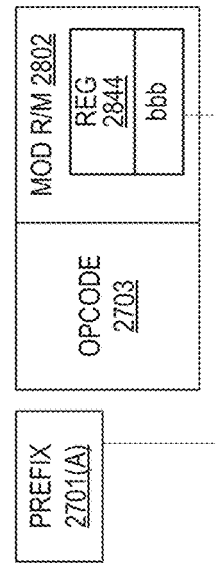
Figure 30C:
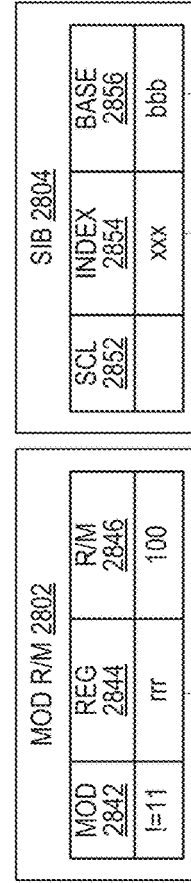

FIGS. 30(A)-(D) illustrate examples of how the R, X, and B fields of the first prefix 2701(A) are used. FIG. 30(A) illustrates R and B from the first prefix 2701(A) being used to extend the reg field 2844 and R/M field 2846 of the MOD R/M byte 2802 when the SIB byte 2804 is not used for memory addressing. FIG. 30(B) illustrates R and B from the first prefix 2701(A) being used to extend the reg field 2844 and R/M field 2846 of the MOD R/M byte 2802 when the SIB byte 2804 is not used (register-register addressing). FIG. 30(C) illustrates R, X, and B from the first prefix 2701(A) being used to extend the reg field 2844 of the MOD R/M byte 2802 and the index field 2854 and base field 2856 when the SIB byte 2804 being used for memory addressing. FIG. 30(D) illustrates B from the first prefix 2701(A) being used to extend the reg field 2844 of the MOD R/M byte 2802 when a register is encoded in the opcode 2703.

FIGS. 31(A)-(B) illustrate examples of a second prefix 2701(B). In some examples, the second prefix 2701(B) is an example of a VEX prefix. The second prefix 2701(B) encoding allows instructions to have more than two operands, and allows SIMD vector registers (e.g., vector/SIMD registers 2610) to be longer than 64-bits (e.g., 128-bit and 256-bit). The use of the second prefix 2701(B) provides for three-operand (or more) syntax. For example, previous two-operand instructions performed operations such as A=A+B, which overwrites a source operand. The use of the second prefix 2701(B) enables operands to perform nondestructive operations such as A=B+C.

In some examples, the second prefix 2701(B) comes in two forms—a two-byte form and a three-byte form. The two-byte second prefix 2701(B) is used mainly for 128-bit, scalar, and some 256-bit instructions; while the three-byte second prefix 2701(B) provides a compact replacement of the first prefix 2701(A) and 3-byte opcode instructions.

FIG. 31(A) illustrates examples of a two-byte form of the second prefix 2701(B). In one example, a format field 3101 (byte 0 3103) contains the value C5H. In one example, byte 1 3105 includes a "R" value in bit[7]. This value is the complement of the "R" value of the first prefix 2701(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 2846 to encode the instruction operand that references a memory address or encode either the destination register operand or a source register operand.

Instructions that use this prefix may use the Mod R/M reg field 2844 to encode either the destination register operand or a source register operand, be treated as an opcode extension and not used to encode any instruction operand.

For instruction syntax that support four operands, vvvv, the Mod R/M R/M field 2846 and the Mod R/M reg field 2844 encode three of the four operands. Bits[7:4] of the immediate 2709 are then used to encode the third source register operand.

FIG. 31(B) illustrates examples of a three-byte form of the second prefix 2701(B). In one example, a format field 3111 (byte 0 3113) contains the value C4H. Byte 1 3115 includes in bits[7:5] "R," "X," and "B" which are the complements of the same values of the first prefix 2701(A). Bits[4:0] of byte 1 3115 (shown as mmmmm) include content to encode, as need, one or more implied leading opcode bytes. For example, 00001 implies a 0FH leading opcode, 00010 implies a 0F38H leading opcode, 00011 implies a leading 0F3AH opcode, etc.

Bit[7] of byte 2 3117 is used similar to W of the first prefix 2701(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 2846 to encode the instruction operand that references a memory address or encode either the destination register operand or a source register operand.

Instructions that use this prefix may use the Mod R/M reg field 2844 to encode either the destination register operand or a source register operand, be treated as an opcode extension and not used to encode any instruction operand.

For instruction syntax that support four operands, vvvv, the Mod R/M R/M field 2846, and the Mod R/M reg field 2844 encode three of the four operands. Bits[7:4] of the immediate 2709 are then used to encode the third source register operand.

Figure 32:
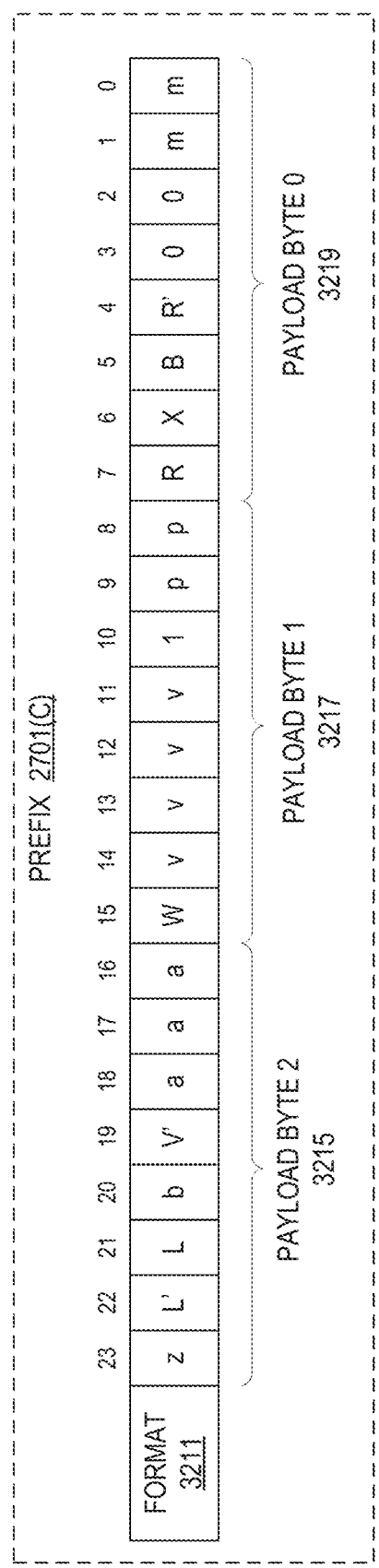
FIG. 32 illustrates examples of a third prefix.

FIG. 32 illustrates examples of a third prefix 2701(C). In some examples, the first prefix 2701(A) is an example of an EVEX prefix. The third prefix 2701(C) is a four-byte prefix.

The third prefix 2701(C) can encode 32 vector registers (e.g., 128-bit, 256-bit, and 512-bit registers) in 64-bit mode. In some examples, instructions that utilize a writemask/opmask (see discussion of registers in a previous figure, such as FIG. 26) or predication utilize this prefix. Opmask register allow for conditional processing or selection control. Opmask instructions, whose source/destination operands are opmask registers and treat the content of an opmask register as a single value, are encoded using the second prefix 2701(B).

The third prefix 2701(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 2701(C) is a format field 3211 that has a value, in one example, of 62H. Subsequent bytes are referred to as payload bytes 3215-3219 and collectively form a 24-bit value of P[23:0] providing specific capability in the form of one or more fields (detailed herein).

In some examples, P[1:0] of payload byte 3219 are identical to the low two mmmmm bits. P[3:2] are reserved in some examples. Bit P[4] (R') allows access to the high 16 vector register set when combined with P[7] and the ModR/M reg field 2844. P[6] can also provide access to a high 16 vector register when SIB-type addressing is not needed. P[7:5] consist of an R, X, and B which are operand specifier modifier bits for vector register, general purpose register, memory addressing and allow access to the next set of 8 registers beyond the low 8 registers when combined with the ModR/M register field 2844 and ModR/M R/M field 2846. P[9:8] provide opcode extensionality equivalent to some legacy prefixes (e.g., 00=no prefix, 01=66H, 10=F3H, and 11=F2H). P[10] in some examples is a fixed value of 1. P[14:11], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

P[15] is similar to W of the first prefix 2701(A) and second prefix 2711(B) and may serve as an opcode extension bit or operand size promotion.

P[18:16] specify the index of a register in the opmask (writemask) registers (e.g., writemask/predicate registers 2615). In one example, the specific value aaa=000 has a special behavior implying no opmask is used for the particular instruction (this may be implemented in a variety of ways including the use of a opmask hardwired to all ones or hardware that bypasses the masking hardware). When merging, vector masks allow any set of elements in the destination to be protected from updates during the execution of any operation (specified by the base operation and the augmentation operation); in other one example, preserving the old value of each element of the destination where the corresponding mask bit has a 0. In contrast, when zeroing vector masks allow any set of elements in the destination to be zeroed during the execution of any operation (specified by the base operation and the augmentation operation); in one example, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While examples are described in which the opmask field's content selects one of a number of opmask registers that contains the opmask to be used (and thus the opmask field's content indirectly identifies that masking to be performed), alternative examples instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22: 21]). P[23] indicates support for merging-writemasking (e.g., when set to 0) or support for zeroing and merging-writemasking (e.g., when set to 1).

Exemplary examples of encoding of registers in instructions using the third prefix 2701(C) are detailed in the following tables.

TABLE 1

32-Register Support in 64-bit Mode

|  | 4 | 3 | [2:0] | REG.TYPE | COMMON USAGES |
|---|---|---|---|---|---|
| REG | R' | R | ModR/M reg | GPR, Vector | Destination or Source |
| VVVV | V' |  | vvvv | GPR, Vector | 2nd Source or Destination |
| RM | X | B | ModR/M R/M | GPR, Vector | 1st Source or Destination |
| BASE | 0 | B | ModR/M R/M | GPR | Memory addressing |
| INDEX | 0 | X | SIB.index | GPR | Memory addressing |
| VIDX | V' | X | SIB.index | Vector | VSIB memory addressing |

TABLE 2

Encoding Register Specifiers in 32-bit Mode

|  | [2:0] | REG.TYPE | COMMON USAGES |
|---|---|---|---|
| REG | ModR/M reg | GPR, Vector | Destination or Source |
| VVVV | vvvv | GPR, Vector | $2^{nd}$ Source or Destination |
| RM | ModR/M R/M | GPR, Vector | $1^{st}$ Source or Destination |
| BASE | ModR/M R/M | GPR | Memory addressing |
| INDEX | SIB.index | GPR | Memory addressing |
| VIDX | SIB.index | Vector | VSIB memory addressing |

TABLE 3

Opmask Register Specifier Encoding

|  | [2:0] | REG.TYPE | COMMON USAGES |
|---|---|---|---|
| REG | ModR/M Reg | k0-k7 | Source |
| VVVV | vvvv | k0-k7 | $2^{nd}$ Source |
| RM | ModR/M R/M | k0-k7 | $1^{st}$ Source |
| {k1} | aaa | k0-k7 | Opmask |

Program code may be applied to input information to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), a field programmable gate array (FPGA), a microprocessor, or any combination thereof.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Examples of the mechanisms disclosed herein may be implemented in hardware, software, firmware, or a combination of such implementation approaches. Examples may be implemented as computer programs or program code executing on programmable systems comprising at least one processor, a storage system (including volatile and non-volatile memory and/or storage elements), at least one input device, and at least one output device.

One or more aspects of at least one example may be implemented by representative instructions stored on a machine-readable storage medium which represents various logic within the processor, which when read by a machine causes the machine to fabricate logic to perform the techniques described herein. Such representations, known as "IP cores" may be stored on a tangible, machine-readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, examples also include non-transitory, tangible machine-readable media containing instructions or containing design data, such as Hardware Description Language (HDL), which defines structures, circuits, apparatuses, processors and/or system features described herein. Such examples may also be referred to as program products. Emulation (Including Binary Translation, Code Morphing, Etc.).

In some cases, an instruction converter may be used to convert an instruction from a source instruction set architecture to a target instruction set architecture. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 33 illustrates a block diagram contrasting the use of a software instruction converter to convert binary instructions in a source instruction set architecture to binary instructions in a target instruction set architecture according to examples. In the illustrated example, the instruction converter is a software instruction converter, although alternatively the instruction converter may be implemented in software, firmware, hardware, or various combinations thereof. FIG. 33 shows a program in a high-level language 3302 may be compiled using a first ISA compiler 3304 to generate first ISA binary code 3306 that may be natively executed by a processor with at least one first instruction set architecture core 3316. The processor with at least one first ISA instruction set architecture core 3316 represents any processor that can perform substantially the same functions as an Intel® processor with at least one first ISA instruction set architecture core by compatibly executing or otherwise processing (1) a substantial portion of the instruction set architecture of the first ISA instruction set architecture core or (2) object code versions of applications or other software targeted to run on an Intel processor with at least one first ISA instruction set architecture core, in order to achieve substantially the same result as a processor with at least one first ISA instruction set architecture core. The first ISA compiler 3304 represents a compiler that is operable to generate first ISA binary code 3306 (e.g., object code) that can, with or without additional linkage processing, be executed on the processor with at least one first ISA instruction set architecture core 3316. Similarly, FIG. 33 shows the program in the high-level language 3302 may be compiled using an alternative instruction set architecture compiler 3308 to generate alternative instruction set architecture binary code 3310 that may be natively executed by a processor without a first ISA instruction set architecture core 3314. The instruction converter 3312 is used to convert the first ISA binary code 3306 into code that may be natively executed by the processor without a first ISA instruction set architecture core 3314. This converted code is not necessarily to be the same as the alternative instruction set architecture binary code 3310; however, the converted code will accomplish the general operation and be made up of instructions from the alternative instruction set architecture. Thus, the instruction converter 3312 represents software, firmware, hardware, or a combination thereof that, through emulation, simulation or any other process, allows a processor or other electronic device that does not have a first ISA instruction set architecture processor or core to execute the first ISA binary code 3306.

With regard to this specification generally, unless expressly stated to the contrary, use of the phrases 'at least one of' and 'one or more of' refers to any combination of the named elements, conditions, activities, messages, entries, paging structures, or devices. For example, 'at least one of X, Y, and Z' and 'one or more of X, Y, and Z' is intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z.

Additionally, unless expressly stated to the contrary, the terms 'first', 'second', 'third', etc., are intended to distinguish the particular items (e.g., element, condition, module, activity, operation, claim element, messages, protocols, interfaces, devices etc.) they modify, but are not intended to indicate any type of order, rank, importance, temporal sequence, or hierarchy. For example, 'first X' and 'second X' are intended to designate two separate X elements that are not necessarily limited by any order, rank, importance, temporal sequence, or hierarchy of the two elements, unless specifically stated to the contrary.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of "embodiment" and other exemplarily language does not necessarily refer to the same embodiment or the same example, but may refer to different and distinct embodiments, as well as potentially the same embodiment.

Embodiments of the mechanisms disclosed herein may be implemented in hardware, software, firmware, or a combination of such implementation approaches. Embodiments of this disclosure may be implemented, at least partially, as computer programs or program code executing on programmable systems comprising at least one processor, a storage system (including volatile and non-volatile memory and/or storage elements), at least one input device, and at least one output device.

The architectures presented herein are provided by way of example only and are intended to be non-exclusive and non-limiting. Furthermore, the various parts disclosed are intended to be logical divisions only and need not necessarily represent physically separate hardware and/or software components. Certain computing systems may provide memory elements in a single physical memory device, and in other cases, memory elements may be functionally distributed across many physical devices. In the case of virtual machine managers or hypervisors, all or part of a function may be provided in the form of software or firmware running over a virtualization layer to provide the disclosed logical function.

It is also important to note that the operations in the preceding flowcharts and diagrams illustrating interactions, illustrate only some of the possible activities that may be executed by, or within, computing device 100 using the approaches disclosed herein for providing explicitly updating security context in stack pointers for exception handling and tight bounding of on-stack arguments. Some of these operations may be deleted or removed where appropriate, or these operations may be modified or changed considerably without departing from the scope of the present disclosure. In addition, the timing of these operations may be altered considerably. For example, the timing and/or sequence of certain operations may be changed relative to other operations to be performed before, after, or in parallel to the other operations, or based on any suitable combination thereof. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

OTHER NOTES AND EXAMPLES

The following examples pertain to embodiments in accordance with this specification. Example AA1 provides an apparatus that includes: a processor to be coupled to a memory comprising code stored therein that includes a plurality of instructions, the processor to execute a first instruction to perform a first simulated return in a program from a callee function to a caller function based on a first input stack pointer encoded with a first security context of a callee stack frame, and to perform the first simulated return is to include generating a first simulated stack pointer to the caller stack frame. In Example AA1, the processor is to execute the first instruction further to, in response to identifying an exception handler in the caller function, execute a second instruction to perform a simulated call based on a second input stack pointer encoded with a second security context of the caller stack frame, and to perform the simulated call is to include generating a second simulated stack pointer to a new stack frame containing an encrypted instruction pointer associated with the exception handler, the second simulated stack pointer to be encoded with a new security context of the new stack frame.

Example AA2 provides a system including memory circuitry to store code including a plurality of instructions, and a processor coupled to the memory circuitry, and the processor to execute a first instruction to perform a first simulated return in a program from a callee function to a caller function based on a first input stack pointer encoded with a first security context of a callee stack frame, and to perform the first simulated return is to include generating a first simulated stack pointer to the caller stack frame. In Example AA2, the processor is to execute the first instruction further to, in response to identifying an exception handler in the caller function, execute a second instruction to perform a simulated call based on a second input stack pointer encoded with a second security context of the caller stack frame, and to perform the simulated call is to include generating a second simulated stack pointer to a new stack frame containing an encrypted instruction pointer associated with the exception handler, the second simulated stack pointer to be encoded with a new security context of the new stack frame.

Example AA3 comprises the subject matter of any one of Examples AA1-AA2, and the first instruction is to be executed in response to an exception occurring in a last called function of a plurality of functions called in the program.

Example AA4 comprises the subject matter of any one of Examples AA1-AA3, and the first input stack pointer is to be obtained from a register entry in an unwind context of an unwinder data structure, the register entry to include a first value of a stack pointer register, the first value pointing to an end of the caller stack frame and encoded with the first security context of the callee stack frame.

Example AA5 comprises the subject matter of Example AA4, and the first security context includes a first base address of the callee stack frame.

Example AA6 comprises the subject matter of any one of Examples AA1-AA5, and the second input stack pointer is to point to a base of the new stack frame.

Example AA7 comprises the subject matter of Example AA6, and to perform the first simulated return is to include loading the encrypted return address from the callee stack frame based on the first base address obtained from the first security context encoded in the first input stack pointer, and generating a decrypted return address by decrypting the encrypted return address based, at least in part, on a first data tweak associated with the first security context in the first input stack pointer.

Example AA8 comprises the subject matter of Example AA7, and the first data tweak includes data that represents at least a portion of the first security context.

Example AA9 comprises the subject matter of any one of Examples AA7-AA8, and the generating the first simulated stack pointer for the caller stack frame is to further include updating the first security context encoded in the first input stack pointer to the second security context of the caller stack frame, and encrypting at least a portion of the second security context.

Example AA10 comprises the subject matter of Example AA9, and the first security context includes first data representing a first base address of the callee stack frame, and the second security context includes second data representing a second base address of the caller stack frame.

Example AA11 comprises the subject matter of any one of Examples AA9-AA10, and the updating the first security context encoded in the first input stack pointer is to include extracting distance metadata from the decrypted return address, and using the distance metadata to modify a first base address of the callee stack frame in the first security context to a second base address of the caller stack frame.

Example AA12 comprises the subject matter of any one of Examples AA1-AA11, and to perform the simulated call is to further include generating the encrypted instruction pointer by encrypting an unencrypted instruction pointer associated with the exception handler based, at least in part, on a fourth data tweak associated with the new security context encoded in the second simulated stack pointer, and storing the encrypted instruction pointer at a third base address in the new stack frame using the second simulated stack pointer.

Example AA13 comprises the subject matter of Example AA12, and to perform the simulated call is to further include, prior to encrypting the unencrypted instruction pointer loading a previously encrypted instruction pointer from the third base address in the new stack frame using the second input stack pointer, and generating the unencrypted instruction pointer by decrypting the previously encrypted instruction pointer based, at least in part on the fourth data tweak associated with the second security context encoded in the second input stack pointer.

Example AA14 comprises the subject matter of any one of Examples AA1-AA13, and the generating the second simulated stack pointer is to include updating the second security context in the second input stack pointer to the new security context of the new stack frame, and encrypting at least a portion of the new security context.

Example AA15 comprises the subject matter of any one of Examples AA1-AA14, and the new security context includes third data representing a third base address of the new stack frame.

Example AA16 comprises the subject matter of any one of Examples AA1-AA15, and the processor is further to execute a third instruction based on the second simulated stack pointer to return control to the caller function to execute the exception handler.

Example AA17 comprises the subject matter of any one of Examples AA1-AA16, and further comprises decoder circuitry to decode the first instruction before the first instruction is executed, the first instruction to include a first field for an identifier of a first source operand and a second field for an opcode, the first source operand corresponding to the first input stack pointer, and execution circuitry to, subsequent to decoding the first instruction, execute the first instruction according to the opcode to perform the first simulated return in the program from the callee function to the caller function based on the first input stack pointer.

Example AA18 comprises the subject matter of any one of Examples AA1-AA17, and the processor is to execute the code further to prior to executing the second instruction, modify an offset of the first simulated stack pointer to generate a modified first simulated stack pointer to point to a new base of the new stack frame, generate a first encrypted instruction pointer by encrypting an instruction pointer associated with the exception handler based, at least in part, on a third data tweak associated with the second security context encoded in the modified first simulated stack pointer, store the first encrypted instruction pointer at a new base of the new stack frame, and update an unwind context in an unwinder data structure with the modified first simulated stack pointer.

Example AA19 comprises the subject matter of Example AA18, and the second input stack pointer is to be obtained from the modified first simulated stack pointer.

Example AC1 provides at least one machine-readable storage medium comprising instructions and the instructions when executed by one or more processors perform operations comprising performing a simulated return in a program from a callee function to a caller function to generate a first simulated stack pointer to a caller stack frame associated with the caller function, and the simulated return is to be performed based on a first input stack pointer that includes a first security context of the callee stack frame associated with the callee function, and, in response to identifying an exception handler in the caller function, performing a simulated call based on a second input stack pointer to generate a second simulated stack pointer that includes a new security context of a new stack frame containing an encrypted instruction pointer associated with the exception handler, the second input stack pointer to include a second security context of the caller stack frame.

Example AC2 comprises the subject matter of Example AC1, and the simulated return is to be performed in response to an exception occurring in a last called function of a plurality of functions called in the program.

Example AC3 comprises the subject matter of any one of Examples AC1-AC2, and the first input stack pointer is obtained a register entry in an unwind context of an unwinder data structure, the register entry to include a first value of a stack pointer register, the first value pointing to an end of the caller stack frame and encoded with the first security context of the callee stack frame.

Example AC4 comprises the subject matter of Example AC3, and the first security context includes a first base address of the callee stack frame.

Example AC5 comprises the subject matter of any one of Examples AC1-AC4, and the second input stack pointer is to point to a base of the new stack frame.

Example AC6 comprises the subject matter of any one of Examples AC4-AC5, and the performing the first simulated return is to include loading the encrypted return address from the callee stack frame using a linear address obtained from the first input stack pointer, and generating a decrypted return address by decrypting the encrypted return address based, at least in part, on a first data tweak associated with the first security context in the first input stack pointer.

Example AC7 comprises the subject matter of Example AC6, and the first data tweak includes data that represents at least a portion of the first security context.

Example AC8 comprises the subject matter of any one of Examples AC6-AC7, and to generate the first simulated stack pointer for the caller stack frame is to further include updating the first security context encoded in the first input stack pointer to the second security context of the caller stack frame, and encrypting at least a portion of the second security context.

Example AC9 comprises the subject matter of Example AC8, and the first security context includes first data representing a first base address of the callee stack frame, and the second security context includes second data representing a second base address of the caller stack frame.

Example AC10 comprises the subject matter of any one of Examples AC8-AC9, and the updating the first security context encoded in the first input stack pointer is to include extracting distance metadata from the decrypted return address, and using the distance metadata to modify a first base address of the callee stack frame in the first security context to a second base address of the caller stack frame.

Example AC11 comprises the subject matter of any one of Examples AC1-AC10, and the performing the simulated call is to further include generating the encrypted instruction pointer by encrypting an unencrypted instruction pointer associated with the exception handler based, at least in part, on a fourth data tweak associated with the new security context encoded in the second simulated stack pointer, and storing the encrypted instruction pointer at a third base address in the new stack frame using the second simulated stack pointer.

Example AC12 comprises the subject matter of Example AC11, and the performing the simulated call is to further include, prior to encrypting the unencrypted instruction pointer loading a previously encrypted instruction pointer from the third base address in the new stack frame using the second input stack pointer, and generating the unencrypted instruction pointer by decrypting the previously encrypted instruction pointer based, at least in part on the fourth data tweak associated with the second security context encoded in the second input stack pointer.

Example AC13 comprises the subject matter of any one of Examples AC1-AC12, and to generate the second simulated stack pointer is to include updating the second security context in the second input stack pointer to the new security context of the new stack frame, and encrypting at least a portion of the new security context.

Example AC14 comprises the subject matter of any one of Examples AC1-AC13, and the new security context includes third data representing a third base address of the new stack frame.

Example AC15 comprises the subject matter of any one of Examples AC1-AC14, and the instructions, when executed by the one or more processors, perform further operations comprising executing a third instruction based on the second simulated stack pointer to return control to the caller function to execute the exception handler.

Example AC16 comprises the subject matter of any one of Examples AC1-AC15, and the instructions, when executed by the one or more processors, perform further operations comprising subsequent to the simulated call, update an unwind context in an unwinder data structure based on an instruction pointer associated with the exception handler.

Example AC17 comprises the subject matter of any one of Examples AC1-AC16, and the instructions, when executed by the one or more processors, perform further operations comprising prior to performing the simulated call, modifying an offset of the first simulated stack pointer to generate a modified first simulated stack pointer to point to a new base of the new stack frame, generating a prior encrypted instruction pointer by encrypting an unencrypted instruction pointer associated with the exception handler based, at least in part, on a third data tweak associated with the second security context encoded in the modified first simulated stack pointer, storing the prior encrypted instruction pointer at a new base of the new stack frame, and updating an unwind context in an unwinder data structure with the modified first simulated stack pointer.

Example AC18 comprises the subject matter of Example AC17, and the second input stack pointer is to be obtained from the modified first simulated stack pointer.

Example AM1 provides a method comprising performing, by execution circuitry of a processor, a first simulated return in a program from a callee function to a caller function to generate a first simulated stack pointer to a caller stack frame associated with the caller function, and the simulated return is performed based on a first input stack pointer that includes a first security context of the callee stack frame associated with the callee function, and, in response to identifying an exception handler in the caller function, performing a simulated call based on a second input stack pointer to generate a second simulated stack pointer that includes a new security context of a new stack frame containing an encrypted instruction pointer associated with the exception handler, and the second input stack pointer includes a second security context of the caller stack frame.

Example AM2 comprises the subject matter of Example AM1, and the simulated return is performed in response to an exception occurring in a last called function of a plurality of functions called in the program.

Example AM3 comprises the subject matter of any one of Examples AM1-AM2, and the first input stack pointer is obtained from a register entry in an unwind context of an unwinder data structure, the register entry to include a first value of a stack pointer register, the first value pointing to an end of the caller stack frame and encoded with the first security context of the callee stack frame.

Example AM4 comprises the subject matter of Example AM3, and the first security context includes a first base address of the callee stack frame.

Example AM5 comprises the subject matter of any one of Examples AM1-AM4, and the second input stack pointer is to point to a base of the new stack frame.

Example AM6 comprises the subject matter of Example AM5, and the performing the first simulated return includes loading the encrypted return address from the callee stack frame based on the first base address obtained from the first security context encoded in the first input stack pointer, and generating a decrypted return address by decrypting the encrypted return address based, at least in part, on a first data tweak associated with the first security context in the first input stack pointer.

Example AM7 comprises the subject matter of Example AM6, and the first data tweak includes data that represents at least a portion of the first security context.

Example AM8 comprises the subject matter of any one of Examples AM6-AM7, and to generate the first simulated stack pointer for the caller stack frame further includes updating the first security context encoded in the first input stack pointer to the second security context of the caller stack frame, and encrypting at least a portion of the second security context.

Example AM9 comprises the subject matter of Example AM8, and the first security context includes first data representing a first base address of the callee stack frame, and the second security context includes second data representing a second base address of the caller stack frame.

Example AM10 comprises the subject matter of any one of Examples AM8-AM9, and the updating the first security context encoded in the first input stack pointer includes extracting distance metadata from the decrypted return address, and using the distance metadata to modify a first base address of the callee stack frame in the first security context to a second base address of the caller stack frame.

Example AM11 comprises the subject matter of any one of Examples AM1-AM10, and the performing the simulated call further includes generating the encrypted instruction pointer by encrypting an unencrypted instruction pointer associated with the exception handler based, at least in part, on a fourth data tweak associated with the new security context encoded in the second simulated stack pointer, and storing the encrypted instruction pointer at a third base address in the new stack frame using the second simulated stack pointer.

Example AM12 comprises the subject matter of Example AM11, and the performing the simulated call further includes, prior to encrypting the unencrypted instruction pointer: loading a previously encrypted instruction pointer from the third base address in the new stack frame using the second input stack pointer, and generating the unencrypted instruction pointer by decrypting the previously encrypted instruction pointer based, at least in part on the fourth data tweak associated with the second security context encoded in the second input stack pointer.

Example AM13 comprises the subject matter of any one of Examples AM1-AM12, and to generate the second simulated stack pointer includes updating the second security context in the second input stack pointer to the new security context of the new stack frame, and encrypting at least a portion of the new security context.

Example AM14 comprises the subject matter of any one of Examples AM1-AM13, and the new security context includes third data representing a third base address of the new stack frame.

Example AM15 comprises the subject matter of any one of Examples AM1-AM14, and further comprises executing a third instruction based on the second simulated stack pointer to return control to the caller function to execute the exception handler.

Example AM16 comprises the subject matter of any one of Examples AM1-AM15, and further comprises subsequent to the simulated call, update an unwind context in an unwinder data structure based on the encrypted instruction pointer associated with the exception handler.

Example AM17 comprises the subject matter of any one of Examples AM1-AM16, and further comprises prior to performing the simulated call, modifying an offset of the first simulated stack pointer to generate a modified first simulated stack pointer to point to a new base of the new stack frame, generating a prior encrypted instruction pointer by encrypting an unencrypted instruction pointer associated with the exception handler based, at least in part, on a third data tweak associated with the second security context encoded in the modified first simulated stack pointer, storing the prior encrypted instruction pointer at a new base of the new stack frame, and updating an unwind context in an unwinder data structure with the modified first simulated stack pointer.

Example AM18 comprises the subject matter of Example AM17, and the second input stack pointer is obtained from the modified first simulated stack pointer.

Example BA1 provides an apparatus that includes decoder circuitry to decode a first instruction, the first instruction to include a first field for an identifier of an operand and a second field for an opcode, the opcode to indicate that execution circuitry is to perform a simulated call using the operand to generate an output stack pointer encoded with a new security context for a new stack frame in stack memory. The apparatus of Example BA1 further includes execution circuitry to execute the decoded first instruction according to the opcode to perform a simulated call using the operand to generate an output stack pointer encoded with a new security context of a new stack frame in a stack memory, the operand comprising an input stack pointer encoded with a caller security context of a caller stack frame in the stack memory.

Example BA2 provides a system that includes a memory to store a stack for a program, and a processor, and the processor includes decoder circuitry to decode a first instruction, the first instruction to include a first field for an identifier of an operand and a second field for an opcode, the opcode to indicate that execution circuitry is to perform a simulated call using the operand to generate an output stack pointer encoded with a new security context for a new stack frame in stack memory. The processor of Example BA2 further includes execution circuitry to execute the decoded first instruction according to the opcode to perform a simulated call using the operand to generate an output stack pointer encoded with a new security context of a new stack frame in a stack memory, the operand comprising an input stack pointer encoded with a caller security context of a caller stack frame in the stack memory.

Example BA3 comprises the subject matter of any one of Examples BA1-BA2, and the caller security context is encrypted in a first ciphertext portion of the input stack pointer, and the new security context is encrypted in a second ciphertext portion of the output stack pointer.

Example BA4 comprises the subject matter of any one of Examples BA1-BA3, and the caller security context comprises one or more caller metadata items specific to the caller stack frame, and the new security context comprises one or more new metadata items specific to the new stack frame.

Example BA5 comprises the subject matter of any one of Examples BA1-BA4, and the caller security context comprises a caller base address of the caller stack frame, and the new security context comprises a new base address for the new stack frame.

Example BA6 comprises the subject matter of Example BA5, and the execution circuitry is to execute the decoded first instruction according to the opcode further to decrypt a first ciphertext portion of the input stack pointer to obtain a decrypted input stack pointer, generate an updated stack pointer by updating the caller security context in the decrypted input stack pointer with the new security context, and generate the output stack pointer by encrypting at least a portion of the new security context encoded in the updated stack pointer.

Example BA7 comprises the subject matter of Example BA6, and the updating the caller security context in the decrypted input stack pointer with the new security context is to include modifying the caller base address of the caller security context in the decrypted input stack pointer to correspond to a new base in the stack memory indicated by an offset in the input stack pointer.

Example BA8 comprises the subject matter of any one of Examples BA1-BA7, and the execution circuitry is to execute the decoded first instruction according to the opcode further to load an encrypted return address stored at a new base address in the stack memory corresponding to the input stack pointer, generate a decrypted return address by decrypting the encrypted return address based, at least in part, on a first data tweak associated with the caller security context encoded in the input stack pointer, calculate a distance between the new base address and a caller base address in the caller security context of the input stack pointer, and encode the decrypted return address with distance metadata representing the distance.

Example BA9 comprises the subject matter of any one of Examples BA1-BA7, and the execution circuitry is to execute the decoded first instruction according to the opcode further to load an encrypted instruction pointer stored at a new base address in the stack memory corresponding to the input stack pointer, generate a decrypted instruction pointer by decrypting the encrypted instruction pointer based, at least in part, on a first data tweak associated with the caller security context encoded in the input stack pointer, and encrypt the decrypted instruction pointer based, at least in part, on a second data tweak associated with the new security context encoded in the output stack pointer.

Example BA10 comprises the subject matter of any one of Examples BA1-BA9, and the output stack pointer is to correspond to one of a first base address in the new stack frame containing an encrypted instruction pointer associated with an exception handler in a caller function associated with the caller stack frame, a second base address for the new stack frame containing an encrypted return address to a next instruction in the caller function to be executed, or an alternate base address for the new stack frame, the alternate base address to precede one or more arguments passed by the caller function.

Example BA11 comprises the subject matter of Example BA10, and the execution circuitry is to execute the decoded first instruction according to the opcode further to encrypt an unencrypted return address encoded with distance metadata indicating a distance to a caller base address, and the unencrypted return address is to be encrypted based, at least in part, on a data tweak associated with the new security context encoded in the output stack pointer.

Example BM1 provides a method that includes performing, by execution circuitry of a processor, a simulated call based on an input stack pointer encoded with a caller security context of a caller stack frame in stack memory to generate an output stack pointer encoded with a new security context of a new stack frame, and the input stack pointer points to a base of the callee stack frame and the output stack pointer points to the base of the callee stack frame.

Example BM2 comprises the subject matter of Example BM1, and the caller security context is encrypted in a first ciphertext portion of the input stack pointer, and the new security context is encrypted in a second ciphertext portion of the output stack pointer.

Example BM3 comprises the subject matter of any one of Examples BM1-BM2, and the caller security context comprises one or more caller metadata items specific to the caller stack frame, and the new security context comprises one or more new metadata items specific to the new stack frame.

Example BM4 comprises the subject matter of any one of Examples BM1-BM3, and the caller security context comprises a caller base address of the caller stack frame, and the new security context comprises a new base address for the new stack frame.

Example BM5 comprises the subject matter of Example BM4, and further comprises decrypting a first ciphertext portion of the input stack pointer to obtain a decrypted input stack pointer, generating an updated stack pointer by updating the caller security context in the decrypted input stack pointer with the new security context, and generating the output stack pointer by encrypting at least a portion of the new security context encoded in the updated stack pointer.

Example BM6 comprises the subject matter of Example BM5, and the updating the caller security context in the decrypted input stack pointer with the new security context is to includes modifying the caller base address of the caller security context in the decrypted input stack pointer to correspond to a new base in the stack memory indicated by an offset in the input stack pointer.

Example BM7 comprises the subject matter of any one of Examples BM1-BM6, and further comprises loading an encrypted return address stored at a new base address in the stack memory corresponding to the input stack pointer, generating a decrypted return address by decrypting the encrypted return address based, at least in part, on a first data tweak associated with the caller security context encoded in the input stack pointer, calculating a distance between the new base address and a caller base address in the caller security context of the input stack pointer, and encoding the decrypted return address with distance metadata representing the distance.

Example BM8 comprises the subject matter of any one of Examples BM1-BM6, and further comprises loading an encrypted instruction pointer stored at a new base address in the stack memory corresponding to the input stack pointer, generating a decrypted instruction pointer by decrypting the encrypted instruction pointer based, at least in part, on a first data tweak associated with the caller security context encoded in the input stack pointer, and encrypting the decrypted instruction pointer based, at least in part, on a second data tweak associated with the with new security context encoded in the output stack pointer.

Example BM9 comprises the subject matter of any one of Examples BM1-BM8, and the output stack pointer corresponds to one of a first base address for the new stack frame containing an encrypted instruction pointer associated with an exception handler in a caller function associated with the caller stack frame, a second base address for the new stack frame containing an encrypted return address to a next instruction in the caller function to be executed, or an alternate base address for the new stack frame, the alternate base address to precede one or more arguments passed by the caller function.

Example BM10 comprises the subject matter of Example BM9, and further comprises encrypting an unencrypted return address encoded with distance metadata indicating a distance to a caller base address, and the unencrypted return address is to be encrypted based, at least in part, on a data tweak associated with the new security context encoded in the output stack pointer.

Example CA1 provides an apparatus that comprises a processor to be coupled to memory circuitry to store code, and the processor is to execute one or more instructions in a caller function of a program to: generate a simulated callee stack pointer using a caller stack pointer referencing a memory address of a callee stack frame to be created in a stack memory and associated with a callee function when the callee function is invoked by the caller function, encrypt one or more arguments to generate one or more encrypted arguments, respectively, to be passed by the caller function to the callee function, and the one or more arguments are to be encrypted based, at least in part, on the simulated callee stack pointer. The Example CA1 further includes the caller function of the program to store the one or more encrypted arguments in the stack memory.

Example CA2 provides an apparatus that comprises memory circuitry to store code, and a processor coupled to the memory circuitry, and the processor is to execute one or more instructions in a caller function of a program to: generate a simulated callee stack pointer using a caller stack pointer referencing a memory address of a callee stack frame to be created in a stack memory and associated with a callee function when the callee function is invoked by the caller function, encrypt one or more arguments to generate one or more encrypted arguments, respectively, to be passed by the caller function to the callee function, and the one or more arguments are to be encrypted based, at least in part, on the simulated callee stack pointer. The Example CA2 further includes the caller function of the program to store the one or more encrypted arguments in the stack memory.

Example CA3 comprises the subject matter of any one of Examples CA1-CA2, and the memory address is an expected base address of the callee stack frame.

Example CA4 comprises the subject matter of Example CA3, and the simulated callee stack pointer includes callee security context, and the caller stack pointer includes a caller security context.

Example CA5 comprises the subject matter of any one of Examples CA3-CA4, and to encrypt the one or more arguments is to include deriving a first data tweak at least in part from a callee security context included in the simulated callee stack pointer, and performing a cryptographic algorithm based, at least in part, on the first data tweak.

Example CA6 comprises the subject matter of Example CA5, and the callee security context includes data representing the expected base address of the callee stack frame to be created in the stack memory.

Example CA7 comprises the subject matter of any one of Examples CA5-CA6, and one or more variables stored in a caller stack frame associated with the caller function are encrypted based, at least in part, on a second data tweak derived, at least in part, from a caller security context encoded in the caller stack pointer in a stack pointer register.

Example CA8 comprises the subject matter of any one of Examples CA3-CA7, and the processor is to execute the one or more instructions in the caller function of the program further to generate the simulated callee stack pointer to the expected base address of the callee stack frame by modifying a caller security context encoded in the caller stack pointer stored in a stack pointer register to a callee security context of the callee stack frame.

Example CA9 comprises the subject matter of any one of Examples CA3-CA8, and the processor is to execute the one or more instructions in the caller function of the program further to invoke the callee function and to invoke the callee function is to include generating a callee stack pointer in a stack pointer register, and generating the callee stack pointer is to include replacing a caller security context included in the caller stack pointer in the stack pointer register to a callee security context, and encrypting the callee security context.

Example CA10 comprises the subject matter of any one of Examples CA3-CA9, and the expected base address of the callee stack frame to be created in the stack memory is located in a next available slot of the stack memory following one or more slots in the stack memory to store the one or more encrypted arguments.

Example CA11 comprises the subject matter of Example CA10, and the processor is to execute the one or more instructions in the caller function of the program further to determine a first distance between a base address of a caller stack frame and the expected base address of the callee stack frame to be created, encode a return address with first distance metadata representing the first distance and with the return address referencing a next instruction to be executed in the caller function subsequent to the caller function invoking the callee function, generate an encrypted return address by encrypting the encoded return address based, at least in part, on a callee security context included in the simulated callee stack pointer, and store the encrypted return address based on the simulated callee stack pointer.

Example CA12 comprises the subject matter of Example CA11, and the processor is to execute the one or more instructions in the caller function of the program further to determine a size of the one or more arguments to be stored in the stack memory prior to invoking the callee function, and the return address is to be further encoded with second distance metadata representing the size of the one or more arguments to be stored in the stack memory preceding the expected base address of the callee stack frame.

Example CA13 comprises the subject matter of Example CA12, and the processor is further to, subsequent to invoking the callee function, determine, based on the second distance metadata in the return address, bounds of a chunk of the stack memory to which access by the callee function is allowed, and prevent the callee function from accessing a portion of the caller stack frame located outside the bounds of the chunk of the stack memory to which access by the callee function is allowed.

Example CA14 comprises the subject matter of any one of Examples CA10-CA13, and the processor is further to, subsequent to invoking the callee function, allow the callee function to access a caller stack frame, and the callee function is to successfully decrypt the one or more encrypted arguments stored in the caller stack frame based, at least in part, on a callee security context encoded in a callee stack pointer of the callee stack frame, and the callee function is to be prevented from successfully decrypting other encrypted data elements stored in the caller stack frame.

Example CA15 comprises the subject matter of any one of Examples CA1-CA5, and the memory address is an alternate base address of the callee stack frame.

Example CA16 comprises the subject matter of Example CA15, and the alternate base address of the callee stack frame to be created in the stack memory is located in a next available slot in the stack memory referenced by the caller stack pointer in a stack pointer register prior to the one or more encrypted arguments to be stored in the stack memory.

Example CA17 comprises the subject matter of Example CA16, and the processor is to execute the one or more instructions in the caller function of the program further to generate an encrypted return address by encrypting an encoded return address based, at least in part, on a callee security context included in the simulated callee stack pointer, and store the encrypted return address based on the simulated callee stack pointer.

Example CA18 comprises the subject matter of Example CA17, and the one or more encrypted arguments are to be stored after the encrypted return address in the stack memory.

Example CA19 comprises the subject matter of Example CA18, and the processor is to execute the one or more instructions in the caller function of the program further to invoke the callee function, and to invoke the callee function is to include generating a callee stack pointer encoded with the callee security context in the stack pointer register to reference a next available slot in the callee stack frame after the one or more encrypted arguments, and storing a second encrypted return address in the callee stack frame based on the callee stack pointer.

Example CA20 comprises the subject matter of any one of Examples CA17-CA19, and the processor is to execute the a return instruction in the callee function of the program to return control to the caller function, and to return control to the caller function is to include: loading the encrypted return address from the alternate base address of the callee stack frame, decrypting the encrypted return address to obtain the encoded return address, using distance metadata in the encoded return address to determine a caller base address of a caller stack frame associated with the caller function, generating the caller stack pointer by updating the callee security context in the callee stack pointer in the stack pointer register with a caller security context, and popping the encrypted return address at the alternate base address in the callee stack frame.

Example CA21 comprises the subject matter of Example CA20, and to return control to the caller function is to further include, prior to loading the encrypted return address, decrypting a ciphertext portion of the callee stack pointer in the stack pointer register to determine the alternate base address of the callee stack frame.

Example CM1 provides a method comprising: generating, by a processor, a simulated callee stack pointer using a caller stack pointer referencing a memory address of a callee stack frame to be created in a stack memory and associated with a callee function when the callee function is invoked by a caller function, encrypting one or more arguments to generate one or more encrypted arguments, respectively, to be passed by the caller function to the callee function and with the one or more arguments to be encrypted based, at least in part, on the simulated callee stack pointer, and storing the one or more encrypted arguments in the stack memory.

Example CM2 comprises the subject matter of Example CM1, and the memory address is an expected base address of the callee stack frame.

Example CM3 comprises the subject matter of Example CM2, and the simulated callee stack pointer includes callee security context, and the caller stack pointer includes a caller security context.

Example CM4 comprises the subject matter of any one of Examples CM2-CM3, and the encrypting the one or more arguments further includes deriving a first data tweak at least in part from a callee security context included in the simulated callee stack pointer, and performing a cryptographic algorithm based, at least in part, on the first data tweak.

Example CM5 comprises the subject matter of Example CM4, and the callee security context includes data representing the expected base address of the callee stack frame to be created in the stack memory.

Example CM6 comprises the subject matter of any one of Examples CM4-CM5, and one or more variables stored in a caller stack frame associated with the caller function are encrypted based, at least in part, on a second data tweak derived, at least in part, from a caller security context encoded in the caller stack pointer in a stack pointer register.

Example CM7 comprises the subject matter of any one of Examples CM2-CM6, and further comprises generating the simulated callee stack pointer to the expected base address of the callee stack frame by modifying a caller security context encoded in the caller stack pointer stored in a stack pointer register to a callee security context of the callee stack frame.

Example CM8 comprises the subject matter of any one of Examples CM2-CM7, and further comprises executing a first instruction to invoke the callee function and generating a callee stack pointer in a stack pointer register, and the generating is to include replacing a caller security context included in the caller stack pointer in the stack pointer register to a callee security context, and encrypting the callee security context.

Example CM9 comprises the subject matter of any one of Examples CM2-CM8, and the expected base address of the callee stack frame to be created in the stack memory is located in a next available slot of the stack memory following one or more slots in the stack memory to store the one or more encrypted arguments.

Example CM10 comprises the subject matter of Example CM9, and further comprises determining a first distance between a base address of a caller stack frame and the expected base address of the callee stack frame to be created, encoding a return address with first distance metadata representing the first distance and with the return address referencing a next instruction to be executed in the caller function subsequent to the caller function invoking the callee function, generating an encrypted return address by encrypting the encoded return address based, at least in part, on a callee security context included in the simulated callee stack pointer, and storing the encrypted return address based on the simulated callee stack pointer.

Example CM11 comprises the subject matter of Example CM10, and further comprises determining a size of the one or more arguments to be stored in the stack memory prior to invoking the callee function, and the return address is to be further encoded with second distance metadata representing the size of the one or more arguments to be stored in the stack memory preceding the expected base address of the callee stack frame.

Example CM12 comprises the subject matter of Example CM11, and further comprises, subsequent to invoking the callee function, determining, by the processor and based on the second distance metadata in the return address, bounds of a chunk of the stack memory to which access by the callee function is allowed, and preventing, by the processor, the callee function from accessing a portion of the caller stack frame located outside the bounds of the chunk of the stack memory to which access by the callee function is allowed.

Example CM13 comprises the subject matter of any one of Examples CM9-CM12, and further comprises, subsequent to invoking the callee function, allowing, by the processor, the callee function to access a caller stack frame, and the callee function is to successfully decrypt the one or more encrypted arguments stored in the caller stack frame based, at least in part, on a callee security context encoded in a callee stack pointer of the callee stack frame, and the callee function is to be prevented from successfully decrypting other encrypted data elements stored in the caller stack frame.

Example CM14 comprises the subject matter of any one of Examples CM1-CM4, and the memory address is an alternate base address of the callee stack frame.

Example CM15 comprises the subject matter of Example CM14, and the alternate base address of the callee stack frame to be created in the stack memory is located in a next available slot in the stack memory referenced by the caller stack pointer in a stack pointer register prior to the one or more encrypted arguments to be stored in the stack memory.

Example CM16 comprises the subject matter of Example CM15, and further comprises generating an encrypted return address by encrypting an encoded return address based, at least in part, on a callee security context included in the simulated callee stack pointer, and storing the encrypted return address based on the simulated callee stack pointer.

Example CM17 comprises the subject matter of Example CM16, and the one or more encrypted arguments are to be stored after the encrypted return address in the stack memory.

Example CM18 comprises the subject matter of Example CM17, and further comprises invoking the callee function, and the invoking the callee function includes generating a callee stack pointer encoded with the callee security context in the stack pointer register to reference a next available slot in the callee stack frame after the one or more encrypted arguments, and storing a second encrypted return address in the callee stack frame based on the callee stack pointer.

Example CM19 comprises the subject matter of any one of Examples CM16-CM18, and further comprises returning control to the caller function, and the returning control to the caller function includes loading the encrypted return address from the alternate base address of the callee stack frame, decrypting the encrypted return address to obtain the encoded return address, using distance metadata in the encoded return address to determine a caller base address of a caller stack frame associated with the caller function, generating the caller stack pointer by updating the callee security context in the callee stack pointer in the stack pointer register with a caller security context, and popping the encrypted return address at the alternate base address in the callee stack frame.

Example CM20 comprises the subject matter of Example CM19, and the returning control to the caller function further includes, prior to loading the encrypted return address, decrypting a ciphertext portion of the callee stack pointer in the stack pointer register to determine the alternate base address of the callee stack frame.

Example DA1 provides an apparatus including a processor to be coupled to memory circuitry to store a plurality of executable instructions generated from program code based, at least in part, on an execution of a compiler, and the processor is to: execute a first instrumented instruction inserted by the compiler into a caller function of the program code, and when executed by the processor, the first instrumented instruction is to pass control to a pseudo function defined between a pseudo function name inserted by the compiler into the caller function and a second instrumented instruction inserted by the compiler into the caller function. The processor of Example DA1 is further to execute a first uninstrumented instruction within the pseudo function to pass the control to a callee function, and subsequent to the callee function returning the control to the pseudo function, execute the second instrumented instruction inserted by the compiler to return control to the caller function.

Example DA2 provides a system including memory circuitry to store a plurality of executable instructions generated from program code based at least in part on an execution of a compiler to compile the program code, and a processor coupled to the memory circuitry, and the processor is to: execute a first instrumented instruction inserted by the compiler into a caller function of the program code, and when executed by the processor, the first instrumented instruction is to pass control to a pseudo function defined between a pseudo function name inserted by the compiler into the caller function and a second instrumented instruction inserted by the compiler into the caller function. The processor of Example DA2 is further to execute a first uninstrumented instruction within the pseudo function to pass the control to a callee function, and subsequent to the callee function returning the control to the pseudo function, execute the second instrumented instruction inserted by the compiler to return control to the caller function.

Example DA3 comprises the subject matter of any one of Examples DA1-DA2, and the processor is further to, subsequent to the second instrumented instruction being executed to return control to the caller function, execute a third instrumented instruction in the caller function to bypass the pseudo function.

Example DA4 comprises the subject matter of any one of Examples DA1-DA3, and the pseudo function is defined to include the first uninstrumented instruction to pass control to the callee function and a second uninstrumented instruction to encrypt an argument based, at least in part, on a data tweak associated with a first security context encoded in a pseudo stack frame pointer.

Example DA5 comprises the subject matter of Example DA4, and the first security context is to include data that represents a base address of a pseudo stack frame to be created in a stack memory for the pseudo function.

Example DA6 comprises the subject matter of Example DA5, and the processor is further to prevent the callee function from accessing a caller stack frame associated with the caller function, and allow the callee function to access the pseudo stack frame.

Example DA7 comprises the subject matter of any one of Examples DA1-DA6, and the callee function is to successfully decrypt one or more encrypted arguments in the pseudo stack frame.

Example DM1 provides a method comprising: passing control, in executable code being executed by a processor, by a first instrumented instruction in a caller function of the executable code to a pseudo function of the executable code, the pseudo function defined by a pseudo function name inserted by a compiler into the caller function and a second instrumented instruction inserted by the compiler into the caller function, passing control by a first uninstrumented instruction in the pseudo function to a callee function in the executable code, and receiving control by a third instrumented instruction in the pseudo function from the callee function, and returning control by the second instrumented instruction in the pseudo function to the caller function.

Example DM2 comprises the subject matter of Example DM1, and further comprises subsequent to the second instrumented instruction being executed to return control to the caller function, bypassing the pseudo function by a fourth instrumented instruction in the caller function.

Example DM3 comprises the subject matter of any one of Examples DM1-DM2, and further comprises encrypting, by a second uninstrumented instruction in the pseudo function, an argument of the caller function to be passed to the callee function based, at least in part, on a data tweak associated with a first security context encoded in a pseudo stack frame pointer.

Example DM4 comprises the subject matter of Example DM3, and the first security context is to include data that represents a base address of a pseudo stack frame to be created in a stack memory for the pseudo function.

Example DM5 comprises the subject matter of Example DM4, and further comprises preventing, by the processor, the callee function from accessing a caller stack frame associated with the caller function, and allowing, by the processor, the callee function to access the pseudo stack frame.

Example DM6 comprises the subject matter of any one of Examples DM1-DM5, and the callee function is to successfully decrypt one or more encrypted arguments in the pseudo stack frame.

Example X1 provides an apparatus, the apparatus comprising means for performing the method of any one Example of Examples AM1-AM18, Examples BM1-BM10, Examples CM1-CM20, or Examples DM1-DM6.

Example X2 comprises the subject matter of Example X1 can optionally include that the means for performing the method comprises at least one processor and at least one memory element.

Example X3 comprises the subject matter of Example X2 can optionally include that the at least one memory element comprises machine-readable instructions that when executed, cause the apparatus to perform the method of any one Example of Examples AM1-AM18, Examples BM1-BM10, Examples CM1-CM20, or Examples DM1-DM6.

Example X4 comprises the subject matter of any one of Examples X1-X3 can optionally include that the apparatus is one of a computing system, a processing element, or a system-on-a-chip.

Example X5 provides at least one machine-readable storage medium comprising instructions, where the instructions when executed realize an apparatus, realize a system, or implement a method as in any one Example of Examples AA1-AA19, Examples AM1-AM18, Examples BA1-BA11, Examples BM1-BM10, Examples CA1-CA21, Examples CM1-CM20, Examples DA1-DA7, or Examples DM1-DM6.

The invention claimed is:
1. An apparatus comprising:
 a processor to be coupled to a memory to store code, the processor to:
  execute a first instruction to perform a first simulated return in a program from a callee function to a caller function based on a first input stack pointer encoded with a first security context of a callee stack frame, wherein the first simulated return is to simulate a normal return from the callee function that is cryp- tographically protected, wherein to perform the first simulated return is to include:
  generating a first simulated stack pointer to a caller stack frame; and
  in response to identifying an exception handler in the caller function, execute a second instruction to perform a simulated call based on a second input stack pointer encoded with a second security context of the caller stack frame, wherein the simulated call is to simulate a normal call from the caller function that is cryptographically protected, wherein to perform the simulated call is to include:
    generating a second simulated stack pointer to a new stack frame containing an encrypted instruction pointer associated with the exception handler, the second simulated stack pointer to be encoded with a new security context of the new stack frame.

2. The apparatus of claim 1, wherein the first instruction is to be executed in response to an exception occurring in a last called function of a plurality of functions called in the program.

3. The apparatus of claim 1, wherein the first input stack pointer is to be obtained from a register entry in an unwind context of an unwinder data structure, the register entry to include a first value of a stack pointer register, the first value pointing to an end of the caller stack frame and encoded with the first security context of the callee stack frame.

4. The apparatus of claim 3, wherein the first security context includes a first base address of the callee stack frame.

5. The apparatus of claim 4, wherein the first base address of the callee stack frame contains an encrypted return address, and wherein the second input stack pointer is to point to a location in the new stack frame.

6. The apparatus of claim 5, wherein to perform the first simulated return is to include:
  loading the encrypted return address from the callee stack frame based on the first base address obtained from the first security context encoded in the first input stack pointer; and
  generating a decrypted return address by decrypting the encrypted return address based, at least in part, on a first data tweak associated with the first security context in the first input stack pointer.

7. The apparatus of claim 6, wherein the first data tweak includes data that represents at least a portion of the first security context.

8. The apparatus of claim 6, wherein the generating the first simulated stack pointer for the caller stack frame is to further include:
  updating the first security context encoded in the first input stack pointer to the second security context of the caller stack frame; and
  encrypting at least a portion of the second security context.

9. The apparatus of claim 8, wherein the second security context includes second data representing a second base address of the caller stack frame.

10. The apparatus of claim 8, wherein the updating the first security context encoded in the first input stack pointer is to include:
  extracting first distance metadata from the decrypted return address; and
  using the first distance metadata to modify a first base address of the callee stack frame in the first security context to a second base address of the caller stack frame.

11. The apparatus of claim 1, wherein to perform the simulated call is to further include:
  generating a valid return address by encrypting an unencrypted instruction pointer associated with the exception handler based, at least in part, on a fourth data tweak associated with the new security context, wherein the unencrypted instruction pointer is to be generated by decrypting the encrypted instruction pointer; and
  storing the valid return address at a third base address in the new stack frame using the second simulated stack pointer.

12. The apparatus of claim 11, wherein generating the valid return address is to include:
  encoding second distance metadata in the unencrypted instruction pointer, the second distance metadata indicating a distance between a second base address of the caller stack frame and the third base address of the new stack frame.

13. The apparatus of claim 1, wherein the generating the second simulated stack pointer is to include:
  updating the second security context in the second input stack pointer to the new security context of the new stack frame; and
  encrypting at least a portion of the new security context.

14. The apparatus of claim 1, wherein the new security context includes third data representing a third base address of the new stack frame.

15. The apparatus of claim 1, further comprising:
  decoder circuitry to decode the first instruction before the first instruction is executed, the first instruction to include a first field for an identifier of a first source operand and a second field for an opcode, the first source operand corresponding to the first input stack pointer; and
  execution circuitry to, subsequent to decoding the first instruction, execute the first instruction according to the opcode to perform the first simulated return in the program from the callee function to the caller function based on the first input stack pointer.

16. At least one non-transitory machine-readable storage medium comprising instructions, wherein the instructions when executed by one or more processors perform operations comprising:
  performing a simulated return in a program from a callee function to a caller function based on a first input stack pointer that includes a first security context of a callee stack frame associated with the callee function, wherein the simulated return is to simulate a normal return from the callee function that is cryptographically protected, wherein performing the simulated return is to include generating a first simulated stack pointer to a caller stack frame associated with the caller function; and
  in response to identifying an exception handler in the caller function, performing a simulated call based on a second input stack pointer, wherein the simulated call is to simulate a normal call from the caller function that is cryptographically protected, wherein performing the simulated call is to include generating a second simulated stack pointer that includes a new security context of a new stack frame containing an encrypted instruction pointer associated with the exception handler, the second input stack pointer to include a second security context of the caller stack frame.

17. The at least one non-transitory machine-readable storage medium of claim 16, wherein the second input stack pointer is to point to a location in the new stack frame.

18. The at least one non-transitory machine-readable storage medium of claim 16, wherein to generate the second simulated stack pointer is to include:
updating the second security context in the second input stack pointer to the new security context of the new stack frame; and
encrypting at least a portion of the new security context.

19. An apparatus comprising:
decoder circuitry to decode a first instruction, the first instruction to include a first field for an identifier of an operand and a second field for an opcode, the opcode to indicate that execution circuitry is to perform a simulated call using the operand to simulate a normal call from a caller function that is cryptographically protected, wherein to perform the simulated call is to include generating an output stack pointer encoded with a new security context for a new stack frame in stack memory; and
execution circuitry to execute the decoded first instruction according to the opcode to perform a simulated call using the operand to simulate a normal call from a caller function that is cryptographically protected, wherein to perform the simulated call is to include generating an output stack pointer encoded with a new security context of a new stack frame in a stack memory, the operand comprising an input stack pointer encoded with a caller security context of a caller stack frame in the stack memory.

20. The apparatus of claim 19, wherein the caller security context is encrypted in a first ciphertext portion of the input stack pointer, wherein the new security context is encrypted in a second ciphertext portion of the output stack pointer.

21. The apparatus of claim 19, wherein the caller security context comprises one or more caller metadata items specific to the caller stack frame, wherein the new security context comprises one or more new metadata items specific to the new stack frame.

22. The apparatus of claim 19, wherein the caller security context comprises a caller base address of the caller stack frame, wherein the new security context comprises a new base address for the new stack frame.

23. The apparatus of claim 22, wherein the execution circuitry is to execute the decoded first instruction according to the opcode further to:
decrypt a first ciphertext portion of the input stack pointer to obtain a decrypted input stack pointer;
generate an updated stack pointer by updating the caller security context in the decrypted input stack pointer with the new security context; and
generate the output stack pointer by encrypting at least a portion of the new security context encoded in the updated stack pointer.

24. The apparatus of claim 19, wherein the execution circuitry is to execute the decoded first instruction according to the opcode further to:
load an encrypted return address stored at a new location in the stack memory corresponding to the input stack pointer encoded with the caller security context;
generate a decrypted return address by decrypting the encrypted return address based, at least in part, on the input stack pointer encoded with the caller security context;
calculate a distance between a first address of the new location and a caller base address in the caller security context of the input stack pointer encoded with the caller security context; encoding the decrypted return address with distance metadata representing the distance; and
generate a valid return address by encrypting the decrypted return address encoded with the distance metadata.

25. The apparatus of claim 19, wherein the output stack pointer encoded with the new security context of the new stack frame is to reference one of:
a first memory address in the new stack frame containing an encrypted address associated with an exception handler in a caller function associated with the caller stack frame;
a second base address for the new stack frame containing an encrypted return address to a next instruction in the caller function to be executed; or
an alternate base address for the new stack frame, the alternate base address to precede one or more arguments passed by the caller function.

* * * * *